(12) United States Patent
Hayashi et al.

(10) Patent No.: US 6,207,253 B1
(45) Date of Patent: *Mar. 27, 2001

(54) ACICULAR HEMATITE PARTICLES AND MAGNETIC RECORDING MEDIUM

(75) Inventors: Kazuyuki Hayashi, Hiroshima; Yasuyuki Tanaka, Onoda; Keisuke Iwasaki; Hiroko Morii, both of Hiroshima, all of (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/220,356

(22) Filed: Dec. 24, 1998

(30) Foreign Application Priority Data

Dec. 26, 1997 (JP) .................................................. 9-369364
Jan. 12, 1998 (JP) ................................................. 10-018143
Apr. 10, 1998 (JP) ................................................. 10-116046

(51) Int. Cl.$^7$ ........................................................ B32B 5/16
(52) U.S. Cl. ........................ 428/149; 428/328; 428/329; 428/331; 428/403; 428/404; 428/694 BA; 428/694 BS; 428/694 BN
(58) Field of Search .................................. 428/402, 403, 428/404, 143, 149, 328, 329, 331, 694 BA, 694 BS, 694 BN

(56) References Cited

U.S. PATENT DOCUMENTS

| | | | |
|---|---|---|---|
| 3,843,773 | * 10/1974 | Pingaud | 423/634 |
| 4,033,891 | * 7/1977 | Matsui et al. | 252/62.56 |
| 5,133,805 | * 7/1992 | Kurata et al. | 106/456 |
| 5,137,783 | * 8/1992 | Tanihara et al. | 428/407 |
| 5,156,922 | * 10/1992 | Mishima et al. | 428/570 |
| 5,411,801 | * 5/1995 | Honmyo | 428/402 |
| 5,443,666 | * 8/1995 | Kiatamura et al. | 148/513 |
| 5,512,194 | * 4/1996 | Ogasawara et al. | 252/62.56 |
| 5,660,927 | * 8/1997 | Arase et al. | 428/328 |
| 5,750,250 | * 5/1998 | Hayashi et al. | 428/328 |
| 5,922,464 | * 7/1999 | Hayashi et al. | 428/403 |

FOREIGN PATENT DOCUMENTS

| | | |
|---|---|---|
| 0 597 694 A1 | 5/1994 | (EP) . |
| 0 769 775 A1 | 4/1997 | (EP) . |
| 63-153201 | 6/1988 | (JP) . |

* cited by examiner

*Primary Examiner*—H. Thi Le
(74) *Attorney, Agent, or Firm*—Nixon & Vanderhye

(57) ABSTRACT

Acicular hematite particles of the present invention comprise an average major axis diameter of 0.004 to 0.295 μm, a geometrical standard deviation of minor axis diameter of not more than 1.35 and a pH value of not less than 8, and containing not more than 300 ppm of soluble sodium salt, calculated as Na and not more than 150 ppm of soluble sulfate, calculated as $SO_4$.

Such acicular hematite particles are suitable as non-magnetic particles for a non-magnetic undercoat layer of a magnetic recording medium which exhibits a low light transmittance, an excellent smooth surface and a high strength, and can be prevented from being deteriorated in magnetic properties due to the corrosion of magnetic acicular metal particles containing iron as a main component which are dispersed in a magnetic recording layer thereof.

30 Claims, No Drawings

ACICULAR HEMATITE PARTICLES AND MAGNETIC RECORDING MEDIUM

BACKGROUND OF THE INVENTION:

The present invention relates to acicular hematite particles and a magnetic recording medium, and more particularly, to acicular hematite particles suitable as non-magnetic particles for a non-magnetic undercoat layer of a magnetic recording medium which exhibits a low light transmittance, an excellent smooth surface and a high strength, and can be prevented from being deteriorated in magnetic properties due to the corrosion of magnetic acicular metal particles containing iron as a main component which are dispersed in a magnetic recording layer thereof; a non-magnetic substrate for a magnetic recording medium provided with a non-magnetic undercoat layer containing the acicular hematite particles; and a magnetic recording medium comprising the non-magnetic substrate and a magnetic recording layer containing magnetic acicular metal particles containing iron as a main component.

With a development of miniaturized, lightweight video or audio magnetic recording and reproducing apparatuses for long-time recording, magnetic recording media such as a magnetic tape and magnetic disk have been increasingly and strongly required to have a higher performance, namely, a higher recording density, higher output characteristic, in particular, an improved frequency characteristic and a lower noise level.

Various attempts have been made at both enhancing the properties of magnetic particles and reducing the thickness of a magnetic recording layer in order to improve these properties of a magnetic recording medium.

The enhancement of the properties of magnetic particles is firstly described.

The required properties of magnetic particles in order to satisfy the above-described demands on a magnetic recording medium are a high coercive force and a large saturation magnetization.

As magnetic particles suitable for high-output and high-density recording, magnetic acicular metal particles containing iron as a main component, which are obtained by heat-treating acicular goethite particles or acicular hematite particles in a reducing gas, are widely known.

Although magnetic acicular metal particles containing iron as a main component have a high coercive force and a large saturation magnetization, since the magnetic acicular metal particles containing iron as a main component used for a magnetic recording medium are very fine particles having a particle size of not more than 1 $\mu$m, particularly, 0.01 to 0.3 $\mu$m, they easily corrode and the magnetic characteristics thereof are deteriorated, especially, the saturation magnetization and the coercive force are decreased.

Therefore, in order to maintain the characteristics of a magnetic recording medium which uses magnetic acicular metal particles containing iron as a main component as magnetic particles, over a long period, it is strongly demanded to suppress the corrosion of magnetic acicular metal particles containing iron as a main component as much as possible.

A reduction in the thickness of a magnetic recording layer is described. Video tapes have recently been required more and more to have a higher picture quality, and the frequencies of carrier signals recorded in recent video tapes are higher than those recorded in conventional video tapes. In other words, the signals in the short-wave region have come to be used, and as a result, the magnetization depth from the surface of a magnetic tape has come to be remarkably small.

With respect to short wavelength signals, a reduction in the thickness of a magnetic recording layer is also strongly demanded in order to improve the high output characteristics, especially, the S/N ratio of a magnetic recording medium. This fact is described, for example, on page 312 of *Development of Magnetic Materials and Technique for High Dispersion of Magnetic Powder*, published by Sogo Gijutsu Center Co., Ltd. (1982), ". . . the conditions for high-density recording in a coated-layer type tape are that the noise level is low with respect to signals having a short wavelength and that the high output characteristics are maintained. To satisfy these conditions, it is necessary that the tape has large coercive force Hc and residual magnetization Br, . . . and the coating film has a smaller thickness. . . . ".

Development of a thinner film for a magnetic recording layer has caused some problems.

Firstly, it is necessary to make a magnetic recording layer smooth and to eliminate the non-uniformity of thickness. As well known, in order to obtain a smooth magnetic recording layer having a uniform thickness, the surface of the base film must also be smooth. This fact is described on pages 180 and 181 of *Materials for Synthetic Technology-Causes of Friction and Abrasion of Magnetic Tape and Head Running System and Measures for Solving the Problem* (hereinunder referred to as "*Materials for Synthetic Technology*" (1987), published by the Publishing Department of Technology Information Center,". . . the surface roughness of a hardened magnetic coating film depends on the surface roughness of the base film (back surface roughness) so largely as to be approximately proportional, . . . , since the magnetic coating film is formed on the base film, the more smooth the surface of the base film is, the more uniform and larger head output is obtained and the more the S/N ratio is improved."

Secondly, there has been caused a problem in the strength of a base film with a tendency of the reduction in the thickness of the base film in response to the demand for a thinner magnetic coating film. This fact is described, for example, on page 77 of the above-described *Development of Magnetic Materials and Technique for High Dispersion of Magnetic Powder*, ". . . Higher recording density is a large problem assigned t the present magnetic tape. This is important in order to shorten the length of the tape so as to miniaturize the size of a cassette and to enable long-time recording. For this purpose, it is necessary to reduce the thickness of a base film . . . With the tendency of reduction in the film thickness, the stiffness of the tape also reduces to such an extent as to make smooth travel in a recorder difficult. Therefore, improvement of the stiffness of a video tape both in the machine direction and in the transverse direction is now strongly demanded. . . . "

There is no end to a demand for a higher performance in recent magnetic recording media. Since the above-described reduction in the thickness of a magnetic recording layer and a base film lowers the durability of the magnetic recording medium, an improvement of the durability of the magnetic recording medium is in strong demand.

This fact is described in Japanese Patent Application Laid-Open (KOKAI) No. 5-298679, ". . . With the recent development in magnetic recording, a high picture quality and a high sound quality have been required more and more in recording. The signal recording property is, therefore, improved. Especially, finer and higher-density ferromagnetic particles have come to be used. It is further required to make the surface of a magnetic tape smooth so as to reduce noise and raise the C/N . . . However, the coefficient of friction between the magnetic recording layer and an apparatus during the travel of the magnetic recording tape increases, so that there is a tendency of the magnetic recording layer of the magnetic recording medium being damaged or exfoliated even in a short time. Especially, in a videotape, since the magnetic recording medium travels at a high speed in contact with the video head, the ferromagnetic particles are apt to be dropped from the magnetic recording layer, thereby causing clogging on the magnetic head. Therefore, an improvement in the running durability of the magnetic recording layer of a magnetic recording medium is expected . . ."

The end portion of a magnetic recording medium such as a magnetic tape, especially, a video tape is judged by detecting a portion of the magnetic recording medium at which the light transmittance is large by a video deck. If the light transmittance of the whole part of a magnetic recording layer is made large by the production of a thinner magnetic recording medium or the ultrafine magnetic particles dispersed in the magnetic recording layer, it is difficult to detect the portion having a large light transmittance by a video deck. For reducing the light transmittance of the whole part of a magnetic recording layer, carbon black or the like is added to the magnetic recording layer. It is, therefore, essential to add carbon black or the like to a magnetic recording layer in the present video tapes.

However, addition of a large amount of non-magnetic particles such as carbon black impairs not only the enhancement of the magnetic recording density but also the development of a thinner magnetic recording layer. In order to reduce the magnetization depth from the surface of the magnetic tape and to produce a thinner magnetic recording layer, it is strongly demanded to reduce, as much as possible, the quantity of non-magnetic particles such as carbon black which are added to a magnetic recording layer.

It is, therefore, strongly demanded that the light transmittance of a magnetic recording layer should be small even if the carbon black or the like which is added to the magnetic recording layer is reduced to a small amount. From this point of view, improvements in the magnetic recording medium are now in strong demand.

There has, also, been pointed out such a problem that the magnetic acicular metal particles containing iron as a main component dispersed in the magnetic recording layer are corroded in a passage of time after the production thereof, so that magnetic properties of the magnetic recording medium are considerably deteriorated.

Various efforts have been made to improve the substrate for a magnetic recording layer with a demand for a thinner magnetic recording layer and a thinner base film. A magnetic recording medium having at least one undercoat layer (hereinunder referred to "non-magnetic undercoat layer") comprising a binder resin and non-magnetic particles such as hematite particles which are dispersed therein, on a base film has been proposed and put to practical use (Japanese Patent Publication (KOKOKU) No. 6-93297 (1994), Japanese Patent Application Laid-Open (KOKAI) Nos. 62-159338 (1987), 63-187418 (1988), 4-167225 (1992), 4-325915 (1992), 5-73882 (1993), 5-182177 (1993), 5-347017 (1993), 6-60362 (1994), etc.)

The above-described magnetic recording media composed of a base film and a non-magnetic undercoat layer composed of a binder resin and non-magnetic particles dispersed therein and formed on the base film, have a small light transmittance and a high strength, but the durability and the surface smoothness thereof are inconveniently poor.

This fact is described in Japanese Patent Application Laid-Open (KOKAI) No. 5-182177 (1993), ". . . Although the problem of surface roughness is solved by providing a magnetic recording layer as an upper layer after forming a thick non-magnetic undercoat layer on the base film, the problem of the abrasion of a head and the problem of durability are not solved and still remain. This is considered to be caused because a thermoset resin is usually used as a binder of the non-magnetic undercoat layer, so that the magnetic recording layer is brought into contact with a head or other members without any cushioning owing to the hardened non-magnetic undercoat layer, and a magnetic recording medium having such a non-magnetic undercoat layer has a considerably poor flexibility."

Therefore, it has been strongly required to improve surface smoothness of the non-magnetic undercoat layer. Hitherto, it has been attempted to enhance a dispersibility of acicular hematite particles as non-magnetic particles by directing attention to the particle size distribution of major axis diameters of the particles (Japanese Patent Application Laid-open (KOKAI) No. 9-170003(1997), and the like).

That is, in the above Japanese Patent Application Laid-open (KOKAI) No. 9-170003(1997), there has been described a method of heat-treating acicular goethite particles or acicular hematite particles produced by heat-dehydrating the acicular goethite particles, at a temperature of not less than 550° C., thereby obtaining high-density acicular hematite particles having a good geometrical standard deviation of a major axis diameter. However, as shown in Comparative Examples hereinafter, the obtained acicular hematite particles are deteriorated in a geometrical standard deviation of the minor axis diameter, so that the dispersibility of the particles is still unsatisfactory.

Accordingly, with a recent tendency of reducing the thickness of the magnetic recording layer and non-magnetic base film, there have been most demanded acicular hematite particles having a uniform particle size, which are suitable as non-magnetic particles for a non-magnetic undercoat layer having a smooth surface and a high mechanical; and a magnetic recording medium provided with a non-magnetic undercoat layer containing the acicular hematite particles, which exhibits a low light transmittance, an excellent smooth surface, a high mechanical strength and an excellent durability, and which can be prevented from being deteriorated in magnetic properties due to the corrosion of magnetic acicular metal particles containing iron as a main component contained in a magnetic recording layer. However, such acicular hematite particles and magnetic recording medium capable of satisfying these requirements have not been obtained yet.

Further, in recent years, for purposes of short-wavelength recording and high-density recording, it has been inevitably necessary to use magnetic acicular metal particles containing iron as a main component, having a high coercive force and a large saturation magnetization. However, since the magnetic acicular metal particles containing iron as a main component are fine particles, the magnetic acicular metal particles containing iron as a main component tend to be corroded, resulting in deterioration in magnetic properties thereof. Therefore, it has been demanded to provide a magnetic recording medium in which magnetic properties thereof are not deteriorated and can be maintained for a long period of time.

As a result of the present inventors' earnest studies, it has been found that (a) by heat-treating specific acicular goethite particles at a specific temperature and then heat-dehydrating the thus-treated acicular goethite particles to obtain specific acicular hematite particles, or (b) by subjecting specific acicular hematite particles to a acid-dissolving treatment under specific conditions to obtain specific acicular hematite particles, and then heating the acicular hematite particles obtained by the method (a) or (b) in an alkaline suspension, there can be obtained high-purity acicular hematite particles which exhibit a uniform particle size, especially wherein the geometrical standard deviation nears 1.0, and which are useful as non-magnetic particles for a non-magnetic undercoat layer of a magnetic recording medium which can be prevented from being deteriorated in magnetic properties due to the corrosion of magnetic acicular metal particles containing iron as a main component contained in a magnetic recording layer. The present invention has been attained on the basis of the finding.

SUMMARY OF THE INVENTION

It is an object of the present invention to provide acicular hematite particles which are useful as non-magnetic particles for a non-magnetic undercoat layer of a magnetic recording medium exhibiting an excellent surface smoothness, and have a uniform particle size, especially are excellent geometrical standard deviation of a minor axis diameter thereof.

It is another object of the present invention to provide acicular hematite particles suitable as non-magnetic particles for a non-magnetic undercoat layer of a magnetic recording medium which can exhibit a low light transmittance, a smooth surface and a high strength, and can be prevented from being deteriorated in magnetic properties due to the corrosion of magnetic acicular metal particles containing iron as a main component contained in a magnetic recording layer thereof, and a magnetic recording medium provided with a non-magnetic undercoat layer containing the acicular hematite particles.

It is an other object of the present invention to provide acicular hematite particles suitable as non-magnetic particles for a non-magnetic undercoat layer having a low light transmittance, a smooth surface and a high, and a magnetic recording medium which can exhibit a low light transmittance, a smooth surface, a high strength and an excellent durability, and can be prevented from being deteriorated in magnetic properties due to the corrosion of magnetic acicular metal particles containing iron as a main component contained in a magnetic recording layer thereof.

To accomplish the aims, in a first aspect of the present invention, there are provided acicular hematite particles comprising an average major axis diameter of 0.004 to 0.295 μm, a geometrical standard deviation of minor axis diameter of not more than 1.35 and a pH value of not less than 8, and containing not more than 300 ppm of soluble sodium salt, calculated as Na and not more than 150 ppm of soluble sulfate, calculated as $SO_4$.

In a second aspect of the present invention, there are provided acicular hematite particles comprising an average major axis diameter of 0.004 to 0.295 μm, a geometrical standard deviation of minor axis diameter of not more than 1.35 and a pH value of not less than 8, and containing not more than 300 ppm of soluble sodium salt, calculated as Na and not more than 150 ppm of soluble sulfate, calculated as $SO_4$, and having a coat formed on at least a part of the surface of said acicular hematite particle, comprising at least one compound selected from the group consisting of hydroxides of aluminum, oxides of aluminum, hydroxides of silicon and oxides of silicon in amount of 0.05 to 50% by weight, calculated as Al or $SiO_2$, based on the weight of said acicular hematite particles.

In a third aspect of the present invention, there are provided acicular hematite particles comprising an average major axis diameter of 0.004 to 0.295 μm, a geometrical standard deviation of minor axis diameter of not more than 1.35 and a pH value of not less than 8, containing aluminum existing within the particle in an amount of 0.05 to 50% by weight, calculated as Al, based on the weight of said acicular hematite particles, and containing not more than 300 ppm of soluble sodium salt, calculated as Na and not more than 150 ppm of soluble sulfate, calculated as $SO_4$.

In a fourth aspect of the present invention, there are provided acicular hematite particles comprising an average major axis diameter of 0.004 to 0.295 μm, a geometrical standard deviation of minor axis diameter of not more than 1.35 and a pH value of not less than 8, containing aluminum existing within the particle in an amount of 0.05 to 50% by weight, calculated as Al, based on the weight of said acicular hematite particles, and containing not more than 300 ppm of soluble sodium salt, calculated as Na and not more than 150 ppm of soluble sulfate, calculated as $SO_4$, and having a coat formed on at least a part of the surface of said acicular hematite particle, comprising at least one compound selected from the group consisting of hydroxides of aluminum, oxides of aluminum, hydroxides of silicon and oxides of silicon in amount of 0.05 to 50% by weight, calculated as Al or $SiO_2$, based on the weight of said acicular hematite particles.

In a fifth aspect of the present invention, there are provided acicular hematite particles comprising an average major axis diameter of 0.004 to 0.295 μm, a geometrical standard deviation of minor axis diameter of not more than 1.35, a geometrical standard deviation of major axis diameter of not more than 1.50, a BET specific surface area of 35.9 to 180 $m^2/g$ and a pH value of not less than 8, and containing not more than 300 ppm of soluble sodium salt, calculated as Na and not more than 150 ppm of soluble sulfate, calculated as $SO_4$.

In a sixth aspect of the present invention, there are provided acicular hematite particles comprising an average major axis diameter of 0.004 to 0.295 μm, a geometrical standard deviation of minor axis diameter of not more than 1.35, a geometrical standard deviation of major axis diameter of not more than 1.50, a BET specific surface area of 35.9 to 180 $m^2/g$ and a pH value of not less than 8, and containing not more than 300 ppm of soluble sodium salt, calculated as Na and not more than 150 ppm of soluble sulfate, calculated as $SO_4$, and having a coat formed on at least a part of the surface of said acicular hematite particle, comprising at least one compound selected from the group consisting of hydroxides of aluminum, oxides of aluminum, hydroxides of silicon and oxides of silicon in amount of 0.05 to 50% by weight, calculated as Al or $SiO_2$, based on the weight of said acicular hematite particles.

In a seventh aspect of the present invention, there are provided acicular hematite particles comprising an average major axis diameter of 0.004 to 0.295 μm, a geometrical standard deviation of minor axis diameter of not more than 1.35, a geometrical standard deviation of major axis diameter of not more than 1.50, a BET specific surface area of 35.9 to 180 $m^2/g$ and a pH value of not less than 8, containing aluminum existing within the particle in an amount of 0.05 to 50% by weight, calculated as Al, based on the weight of said acicular hematite particles, and containing not more than 300 ppm of soluble sodium salt, calculated as Na and not more than 150 ppm of soluble sulfate, calculated as $SO_4$.

In an eighth aspect of the present invention, there are provided acicular hematite particles comprising an average major axis diameter of 0.004 to 0.295 μm, a geometrical standard deviation of minor axis diameter of not more than 1.35, a geometrical standard deviation of major axis diameter of not more than 1.50, a BET specific surface area of 35.9 to 180 $m^2$/g and a pH value of not less than 8, containing aluminum existing within the particle in an amount of 0.05 to 50% by weight, calculated as Al, based on the weight of said acicular hematite particles, and containing not more than 300 ppm of soluble sodium salt, calculated as Na and not more than 150 ppm of soluble sulfate, calculated as $SO_4$, and having a coat formed on at least a part of the surface of said acicular hematite particle, comprising at least one compound selected from the group consisting of hydroxides of aluminum, oxides of aluminum, hydroxides of silicon and oxides of silicon in amount of 0.05 to 50% by weight, calculated as Al or $SiO_2$, based on the weight of said acicular hematite particles.

In a ninth aspect of the present invention, there is provided acicular hematite particles comprising a geometrical standard deviation of major axis diameter of not more than 1.50, a geometrical standard deviation of minor axis diameter of not more than 1.30, a BET specific surface area of 40 to 150 $m^2$/g, an average major axis diameter of 0.01 to 0.2 μm and a pH value of not less than 8, and containing not more than 300 ppm of soluble sodium salt, calculated as Na and not more than 150 ppm of soluble sulfate, calculated as $SO_4$.

In a tenth aspect of the present invention, there are provided acicular hematite particles comprising a geometrical standard deviation of major axis diameter of not more than 1.50, a geometrical standard deviation of minor axis diameter of not more than 1.30, a BET specific surface area of 40 to 150 $m^2$/g, an average major axis diameter of 0.01 to 0.2 μm and a pH value of not less than 8, and containing not more than 300 ppm of soluble sodium salt, calculated as Na and not more than 150 ppm of soluble sulfate, calculated as $SO_4$, and having a coat formed on at least a part of the surface of said acicular hematite particle, comprising at least one compound selected from the group consisting of hydroxides of aluminum, oxides of aluminum, hydroxides of silicon and oxides of silicon in amount of 0.05 to 50% by weight, calculated as Al or $SiO_2$, based on the weight of said acicular hematite particles.

In an eleventh aspect of the present invention, there are provided acicular hematite particles comprising a geometrical standard deviation of major axis diameter of not more than 1.50, a geometrical standard deviation of minor axis diameter of not more than 1.30, a BET specific surface area of 40 to 150 $m^2$/g, an average major axis diameter of 0.01 to 0.2 μm and a pH value of not less than 8, containing aluminum existing within the particle in an amount of 0.05 to 50% by weight, calculated as Al, based on the weight of said acicular hematite particles, and containing not more than 300 ppm of soluble sodium salt, calculated as Na and not more than 150 ppm of soluble sulfate, calculated as $SO_4$.

In a twelfth aspect of the present invention, there are provided acicular hematite particles comprising a geometrical standard deviation of major axis diameter of not more than 1.50, a geometrical standard deviation of minor axis diameter of not more than 1.30, a BET specific surface area of 40 to 150 $m^2$/g, an average major axis diameter of 0.01 to 0.2 μm and a pH value of not less than 8, containing aluminum existing within the particle in an amount of 0.05 to 50% by weight, calculated as Al, based on the weight of said acicular hematite particles, and containing not more than 300 ppm of soluble sodium salt, calculated as Na and not more than 150 ppm of soluble sulfate, calculated as $SO_4$, and having a coat formed on at least a part of the surface of said acicular hematite particle, comprising at least one compound selected from the group consisting of hydroxides of aluminum, oxides of aluminum, hydroxides of silicon and oxides of silicon in amount of 0.05 to 50% by weight, calculated as Al or $SiO_2$, based on the weight of said acicular hematite particles.

In a thirteenth aspect of the present invention, there is provided a magnetic recording medium comprising:

a non-magnetic base film;

a non-magnetic undercoat layer formed on said non-magnetic base film, comprising a binder resin and acicular hematite particles having an average major axis diameter of 0.004 to 0.295 μm, a geometrical standard deviation of minor axis diameter of not more than 1.35 and a pH value of not less than 8, and containing not more than 300 ppm of soluble sodium salt, calculated as Na and not more than 150 ppm of soluble sulfate, calculated as $SO_4$; and a magnetic coating film comprising a binder resin and magnetic acicular metal particles containing iron as a main component.

In a fourteenth aspect of the present invention, there is provided a magnetic recording medium comprising:

a non-magnetic base film;

a non-magnetic undercoat layer formed on said non-magnetic base film, comprising a binder resin and acicular hematite particles comprising an average major axis diameter of 0.004 to 0.295 μm, a geometrical standard deviation of minor axis diameter of not more than 1.35 and a pH value of not less than 8, and containing not more than 300 ppm of soluble sodium salt, calculated as Na and not more than 150 ppm of soluble sulfate, calculated as $SO_4$, and having a coat formed on at least a part of the surface of said acicular hematite particle, comprising at least one compound selected from the group consisting of hydroxides of aluminum, oxides of aluminum, hydroxides of silicon and oxides of silicon in amount of 0.05 to 50% by weight, calculated as Al or $SiO_2$, based on the weight of said acicular hematite particles; and a magnetic coating film comprising a binder resin and magnetic acicular metal particles containing iron as a main component.

In a fifteenth aspect of the present invention, there is provided a magnetic recording medium comprising:

a non-magnetic base film;

a non-magnetic undercoat layer formed on said non-magnetic base film, comprising a binder resin and acicular hematite particles comprising an average major axis diameter of 0.004 to 0.295 μm, a geometrical standard deviation of minor axis diameter of not more than 1.35 and a pH value of not less than 8, containing aluminum existing within the particle in an amount of 0.05 to 50% by weight, calculated as Al, based on the weight of said acicular hematite particles, and containing not more than 300 ppm of soluble sodium salt, calculated as Na and not more than 150 ppm of soluble sulfate, calculated as $SO_4$; and a magnetic coating film comprising a binder resin and magnetic acicular metal particles containing iron as a main component.

In a sixteenth aspect of the present invention, there is provided a magnetic recording medium comprising:

a non-magnetic base film;

a non-magnetic undercoat layer formed on said non-magnetic base film, comprising a binder resin and acicular hematite particles comprising an average major axis diameter of 0.004 to 0.295 μm, a geometrical standard deviation of minor axis diameter of not more than 1.35 and a pH value of not less than 8, containing aluminum existing within the particle in an amount of 0.05 to 50% by weight, calculated as Al, based on the weight of said acicular hematite particles, and containing not more than 300 ppm of soluble sodium salt, calculated as Na and not more than 150 ppm of soluble sulfate, calculated as $SO_4$, and having a coat formed on at least a part of the surface of said acicular hematite particle, comprising at least one compound selected from the group consisting of hydroxides of aluminum, oxides of aluminum, hydroxides of silicon and oxides of silicon in amount of 0.05 to 50% by weight, calculated as Al or $SiO_2$, based on the weight of said acicular hematite particles; and a magnetic coating film comprising a binder resin and magnetic acicular metal particles containing iron as a main component.

In a seventeenth aspect of the present invention, there is provided a non-magnetic substrate comprising:

a non-magnetic base film; and a non-magnetic undercoat layer formed on said non-magnetic base film, comprising a binder resin and acicular hematite particles having an average major axis diameter of 0.004 to 0.295 μm, a geometrical standard deviation of minor axis diameter of not more than 1.35 and a pH value of not less than 8, and containing not more than 300 ppm of soluble sodium salt, calculated as Na and not more than 150 ppm of soluble sulfate, calculated as $SO_4$.

In an eighteenth aspect of the present invention, there is provided a non-magnetic substrate comprising:

a non-magnetic base film; and a non-magnetic undercoat layer formed on said non-magnetic base film, comprising a binder resin and acicular hematite particles comprising an average major axis diameter of 0.004 to 0.295 μm, a geometrical standard deviation of minor axis diameter of not more than 1.35 and a pH value of not less than 8, and containing not more than 300 ppm of soluble sodium salt, calculated as Na and not more than 150 ppm of soluble sulfate, calculated as $SO_4$, and having a coat formed on at least a part of the surface of said acicular hematite particle, comprising at least one compound selected from the group consisting of hydroxides of aluminum, oxides of aluminum, hydroxides of silicon and oxides of silicon in amount of 0.05 to 50% by weight, calculated as Al or $SiO_2$, based on the weight of said acicular hematite particles.

In a nineteenth aspect of the present invention, there is provided a non-magnetic substrate comprising:

a non-magnetic base film; and a non-magnetic undercoat layer formed on said non-magnetic base film, comprising a binder resin and acicular hematite particles comprising an average major axis diameter of 0.004 to 0.295 μm, a geometrical standard deviation of minor axis diameter of not more than 1.35 and a pH value of not less than 8, containing aluminum existing within the particle in an amount of 0.05 to 50% by weight, calculated as Al, based on the weight of said acicular hematite particles, and containing not more than 300 ppm of soluble sodium salt, calculated as Na and not more than 150 ppm of soluble sulfate, calculated as $SO_4$.

In a twentieth aspect of the present invention, there is provided a non-magnetic substrate comprising:

a non-magnetic base film; and a non-magnetic undercoat layer formed on said non-magnetic base film, comprising a binder resin and acicular hematite particles comprising an average major axis diameter of 0.004 to 0.295 μm, a geometrical standard deviation of minor axis diameter of not more than 1.35 and a pH value of not less than 8, containing aluminum existing within the particle in an amount of 0.05 to 50% by weight, calculated as Al, based on the weight of said acicular hematite particles, and containing not more than 300 ppm of soluble sodium salt, calculated as Na and not more than 150 ppm of soluble sulfate, calculated as $SO_4$, and having a coat formed on at least a part of the surface of said acicular hematite particle, comprising at least one compound selected from the group consisting of hydroxides of aluminum, oxides of aluminum, hydroxides of silicon and oxides of silicon in amount of 0.05 to 50% by weight, calculated as Al or $SiO_2$, based on the weight of said acicular hematite particles.

DETAILED DESCRIPTION OF THE INVENTION

The present invention is explained in more detail below.

First, the acicular hematite particles for a non-magnetic undercoat layer of a magnetic recording medium according to the present invention are described.

The acicular hematite particles according to the present invention have substantially the same acicular shape as that of particles to be treated. The "acicular" shape may include not only a needle shape but also a spindle shape or a rice-ball shape. In addition, the lower limit of an aspect ratio of the particles (=average major axis diameter:average minor axis diameter, hereinafter referred to merely as "aspect ratio") is usually 2:1, preferably 3:1. With the consideration of dispersibility of the particles in vehicle, the upper limit of the aspect ratio is preferably 20:1, more preferably 10:1. When the aspect ratio is less than 2:1, it may be difficult to obtain a coating film having a sufficient strength. On the other hand, when the aspect ratio is more than 20:1, the particles may be entangled with each other in vehicle, thereby causing a tendency that the dispersibility thereof may be deteriorated or the viscosity thereof may be increased.

The upper limit of the average major axis diameter of the acicular hematite particles according to the present invention is usually 0.295 μm. The lower limit of the average major axis diameter of the acicular hematite particles according to the present invention is usually 0.004 μm. If the upper limit of the average major axis diameter exceeds 0.295 μm, the surface smoothness of the coating film formed using such particles may be impaired because the particle size is large. On the other hand, if the lower limit of the average major axis diameter is less than 0.004 μm, the dispersion in the vehicle may be difficult because of the increase of the intermolecular force due to the fine particles. With the consideration of the dispersibility in the vehicle and the surface smoothness of the coating film, the upper limit thereof is preferably 0.275 μm, more preferably 0.200 μm, still more preferably 0.100 μm, and the lower limit thereof is preferably 0.008 μm, more preferably 0.010 μm, more preferably 0.020 μm.

The upper limit of the average minor axis diameter of the acicular hematite particles according to the present invention is usually 0.147 μm. The lower limit of the average minor axis diameter of the acicular hematite particles according to the present invention is usually 0.002 μm. If the upper limit of the average minor axis diameter exceeds 0.147 μm, the surface smoothness of the coating film formed using such particles may be impaired because the particle size is large. On the other hand, if the lower limit of the average minor axis diameter is less than 0.002 μm, the dispersion in the vehicle may be difficult because of the increase of the intermolecular force due to the fine particles. With the consideration of the dispersibility in the vehicle and the surface smoothness of the coating film, the upper limit thereof is preferably 0.123 μm, more preferably 0.100 μm, still more preferably 0.050 μm, and the lower limit thereof is preferably 0.004 μm, more preferably 0.005 μm, more preferably 0.010 μm.

The upper limit of the BET specific surface area ($S_{BET}$) of the acicular hematite particles according to the present invention is usually 180 m$^2$/g. The lower limit of the BET specific surface area ($S_{BET}$) of the acicular hematite particles according to the present invention is usually 35.9 m$^2$/g. If the upper limit thereof is more than 180 m$^2$/g, the dispersion in the vehicle may be difficult because of the increase of the intermolecular force due to the fine particles. On the other hand, if the lower limit thereof is less than 35.9 m$^2$/g, the acicular hematite particles may be coarse particles or large particles produced by sintering a particle and between particles, which are apt to exert a deleterious influence on the surface smoothness of the coating film. With the consideration of the dispersibility in the vehicle and the surface smoothness of the coating film, the upper limit thereof ($S_{BET}$) is preferably 160 m$^2$/g, more preferably 150 m$^2$/g and the lower limit thereof ($S_{BET}$) is preferably 38 m$^2$/g, more preferably 40 m$^2$/g.

The upper limit of the geometrical standard deviation of the major axis diameter of the acicular hematite particles according to the present invention is usually not more than 1.50. If the upper limit of the geometrical standard deviation of the major axis diameter exceeds 1.50, the coarse particles existent sometimes exert a deleterious influence on the surface smoothness of the coating film. With the consideration of the surface smoothness of the coating film, the upper limit thereof is preferably 1.45, more preferably not more than 1.40. From the point of view of industrial productivity, the lower limit thereof is preferably 1.01.

The upper limit of the geometrical standard deviation of the minor axis diameter of the acicular hematite particles according to the present invention is usually not more than 1.35. If the upper limit of the geometrical standard deviation of the minor axis diameter exceeds 1.35, the coarse particles existent sometimes exert a deleterious influence on the surface smoothness of the coating film. With the consideration of the surface smoothness of the coating film, the upper limit thereof is preferably 1.33, more preferably not more than 1.30, still more preferably not more than 1.28. From the point of view of industrial productivity, the lower limit thereof is preferably 1.01.

The acicular hematite particles for a non-magnetic undercoat layer of a magnetic recording medium according to the present invention have a high degree of densification. When the degree of densification is represented by a ratio value of the specific surface area ($S_{BET}$) measured by a BET method to the surface area ($S_{BET}$) calculated from the major axis diameter and the minor axis diameter which were measured from the particles in an electron micrograph of the acicular hematite particles (hereinafter referred to merely as "$S_{BET}/S_{TEM}$ value"), the $S_{BET}/S_{TEM}$ value is 0.5 to 2.5.

When the $S_{BET/STEM}$ value is less than 0.5, although the acicular hematite particles are highly densified, the particle diameter thereof may be increased due to sintering in each particle or between particles, so that a coating film formed using these particles, may not have a sufficient smooth surface. On the other hand, when the $S_{BET}/S_{TEM}$ value is more than 2.5, the degree of densification of the particles is insufficient, so that many pores tend to be formed on the surface and inside of the particle, resulting in insufficient dispersibility of the particles in vehicle. With the consideration of the smooth surface of the coating film and the dispersibility in the vehicle, the $S_{BET}/S_{TEM}$ value is preferably 0.7 to 2.0, more preferably 0.8 to 1.6.

The pH value of the acicular hematite particles when suspended in an aqueous solution (concentration: 50 g/liter), is not less than 8. If it is less than 8, the magnetic acicular metal particles containing iron as a main component contained in the magnetic recording layer formed on the non-magnetic undercoat layer are gradually corroded, which leads to a deterioration in the magnetic characteristics. In consideration of a corrosion preventive effect on the magnetic acicular metal particles containing iron as a main component, the lower limit of the pH value of the acicular hematite particles is preferably not less than 8.5, more preferably not less than 9.0. The upper limit of the pH value of the acicular hematite particles is preferably 11, more preferably 10.5.

The content of soluble sodium salt in the acicular hematite particles is not more than 300 ppm (calculated as Na). If it exceeds 300 ppm, the magnetic acicular metal particles containing iron as a main component contained in the magnetic recording layer formed on the non-magnetic undercoat layer are gradually corroded, thereby causing a deterioration in the magnetic characteristics. In addition, the dispersion property of the acicular hematite particles in the vehicle is easily impaired, and the preservation of the magnetic recording medium is deteriorated and chalking is sometimes caused in a highly humid environment. In consideration of a corrosion preventive effect on the magnetic acicular metal particles containing iron as a main component, the content of soluble sodium salt in the acicular hematite particles is preferably not more than 250 ppm, more preferably not more than 200 ppm, even more preferably not more than 150 ppm. From the point of view of industry such as productivity, the lower limit thereof is about 0.01 ppm.

The content of soluble sulfate in the acicular hematite particles is not more than 150 ppm (calculated as $SO_4$). If it exceeds 150 ppm, the magnetic acicular metal particles containing iron as a main component contained in the magnetic recording layer formed on the non-magnetic undercoat layer are gradually corroded, thereby causing a deterioration in the magnetic properties. In addition, the dispersion property of the acicular hematite particles in the vehicle is easily impaired, and the preservation of the magnetic recording medium is deteriorated and chalking is sometimes caused in a highly humid environment. In consideration of a corrosion preventive effect on the magnetic acicular metal particles containing iron as a main component, the content of soluble sodium salt in the acicular hematite particles is preferably not more than 70 ppm, more preferably not more than 50 ppm. From the point of view of industry such as productivity, the lower limit thereof is about 0.01 ppm.

With the consideration of the durability of the magnetic recording medium having a non-magnetic undercoat layer containing such acicular hematite particles, it is preferable acicular hematite particles contain aluminum present substantially uniformly within the particle in an amount of 0.05 to 50% by weight (calculated as Al) based on the total weight of the acicular hematite particles. When the aluminum content exceeds 50% by weight, although a magnetic recording medium having the non-magnetic undercoat layer containing such acicular hematite particles has a sufficient durability, the durability-improving effect becomes saturated, so that it is meaningless to add aluminum more than necessary. From the point of view of durability-improving effect of a magnetic recording medium and industrial productivity, the aluminum content therein is preferably 0.1 to 30% by weight, more preferably 0.2 to 20% by weight (calculated as Al) based on the total weight of the particles.

Various properties of the acicular hematite particles which contain aluminum within the particle, such as aspect ratio, average major axis diameter, average minor axis diameter, BET specific surface area, geometrical standard deviation of major axis diameter, geometrical standard deviation of minor axis diameter and degree of densification are approximately equivalent in values to those of the acicular hematite particles in which aluminum is not contained within the particle.

The resin adsorptivity of the acicular hematite particles which contain aluminum within the particle according to the present invention is usually not less than 65%, preferably not less than 68%, more preferably not less than 70%. The upper limit thereof is preferably 95%.

At least a part of the surface of the acicular hematite particle which may contain aluminum within the particle according to the present invention may be coated with at least one selected from the group consisting of a hydroxide of aluminum, an oxide of aluminum, a hydroxide of silicon and an oxide of silicon. When the acicular hematite particles which are coated with the above-described coating material are dispersed in a vehicle, the treated particles have an affinity with the binder resin and it is more easy to obtain a desired dispersibility.

The amount of the hydroxide of aluminum, the oxide of aluminum, the hydroxide of silicon or the oxide of silicon used as the coating material is usually not less than 50% by weight, preferably 0.01 to 50% by weight (calculated as Al and/or $SiO_2$) based on the total weight of the particles. If it is less than 0.01% by weight (calculated as Al and/or $SiO_2$) based on the total weight of the particles, the dispersibility-improving effect by coating therewith may be insufficient. If the amount exceeds 50% by weight (calculated as Al and/or $SiO_2$) based on the total weight of the particles, the dispersibility-improving effect by coating therewith becomes saturated, so that it is meaningless to add a coating material more than necessary. From the point of view of dispersibility in the vehicle and industrial productivity, the more preferable amount of coating material is 0.05 to 20% by weight (calculated as Al and/or $SiO_2$) based on the total weight of the particles.

Various properties of the acicular hematite particles which are coated with above-mentioned coating material, such as aspect ratio, average major axis diameter, average minor axis diameter, BET specific surface area, geometrical standard deviation of major axis diameter, geometrical standard deviation of minor axis diameter and degree of densification are approximately equivalent in values to those of the acicular hematite particles in which the surfaces thereof is not coated with the above-mentioned coating material.

The process for producing the acicular hematite particles according to the present invention is exemplified as follows.

The acicular hematite particles for a non-magnetic undercoat layer of a magnetic recording medium according to the present invention are produced by the following processes (I) and (II).

(I) The acicular hematite particles according to the present invention can be obtained by subjecting acicular hematite particles to be treated to acid-dissolving treatment under specific conditions.

The acicular hematite particles to be treated can be produced by various methods. Examples of these methods may include a method of directly producing the hematite particles by a wet process; a method of producing akaganeite particles (β-FeOOH) and then heat-dehydrating the akaganeite particles; or the like. As an ordinary production method, there may be industrially preferably used a method of producing acicular goethite particles as a precursor of the acicular hematite particles by the following wet process and then heat-dehydrating the obtained acicular goethite particles.

An ordinary method of producing acicular goethite particles as one of precursors of the acicular hematite particles is described below.

As described hereinafter, the acicular goethite particles can be produced by passing an oxygen-containing gas through a suspension containing ferrous precipitates such as hydroxides of iron or iron carbonate which are obtained by reacting a ferrous salt with either alkali hydroxide, alkali carbonate or mixed alkali composed of alkali hydroxide and alkali carbonate.

Acicular goethite particles are produced by an ordinary method:

(A) a method of producing needle-shaped goethite particles comprising oxidizing a suspension having a pH value of not less than 11 and containing colloidal ferrous hydroxide particles which is obtained by adding not less than an equivalent of an alkali hydroxide solution to an aqueous ferrous salt solution, by passing an oxygen-containing gas thereinto at a temperature of not higher than 80° C.;

(B) a method of producing spindle-shaped goethite particles comprising oxidizing a suspension containing $FeCO_3$ which is obtained by reacting an aqueous ferrous salt solution with an aqueous alkali carbonate solution, by passing an oxygen-containing gas thereinto after aging the suspension, if necessary;

(C) a method of producing spindle-shaped goethite particles comprising oxidizing a suspension containing precipitates containing iron which is obtained by reacting an aqueous ferrous salt solution with an aqueous alkali carbonate solution and an alkali hydroxide solution, by passing an oxygen-containing gas thereinto after aging the suspension, if necessary;

(D) a method of growing needle-shaped seed goethite particles comprising oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas thereinto, thereby producing needle-shaped seed goethite particles, adding not less than an equivalent of an alkali hydroxide solution to the $Fe^{2+}$ in the aqueous ferrous salt solution, to the aqueous ferrous salt solution containing the needle-shaped seed goethite particles, and passing an oxygen-containing gas into the aqueous ferrous salt solution;

(E) a method of growing needle-shaped seed goethite particles comprising oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas thereinto, thereby producing needle-shaped seed goethite particles, adding not less than an equivalent of an aqueous alkali carbonate solution to the $Fe^{2+}$ in the aqueous ferrous salt solution, to the aqueous ferrous salt solution containing the needle-shaped seed goethite particles, and passing an oxygen-containing gas into the aqueous ferrous salt solution; and (F) a method of growing needle-shaped seed goethite particles comprising oxidizing a ferrous hydroxide solution containing colloidal ferrous hydroxide particles which is obtained by adding less than an equivalent of an alkali hydroxide solution or an alkali carbonate solution to an aqueous ferrous salt solution, by passing an oxygen-containing gas thereinto, thereby producing needle-shaped seed goethite particles and growing the obtained needle-shaped seed goethite particles in an acidic or neutral region.

Elements other than Fe such as Ni, Zn, P and Si, which are generally added in order to enhance various properties of the particles such as the major axis diameter, the minor axis diameter and the aspect ratio, may be added during the reaction system for producing the goethite particles.

The acicular goethite particles obtained have an average major axial diameter of usually 0.005 to 0.4 μm, an average minor axial diameter of usually 0.0025 to 0.20 μm, a geometrical standard deviation of the major axis diameter of not more than 1.70, a geometrical standard deviation of the minor axis diameter of 1.37 to 1.50 and a BET specific surface area of about usually 50 to 250 m$^2$/g, and contain soluble sodium salts of usually 300 to 1500 ppm (calculated as Na) and ordinarily soluble sulfates of 150 to 3000 ppm (calculated as SO$_4$).

Alternatively, the acicular hematite particles to be treated which contain aluminum therewithin in an amount of 0.05 to 50% by weight (calculated as Al) based on the total weight of the particles, can be produced by containing aluminum in the acicular goethite particles by preliminarily adding an aluminum compound upon the above-mentioned production reaction of the acicular goethite particles.

Further, in the production reaction of the acicular goethite particles which contain aluminum within the particle, an aluminum compound may be added to at least one solution selected from suspensions containing a ferrous salt, alkali hydroxide, alkali carbonate, mixed alkali composed of alkali hydroxide and alkali carbonate, or ferrous precipitates such as hydroxides of iron or iron carbonate. It is preferred that the aluminum compound is added to an aqueous ferrous salt solution.

As the above-mentioned aluminum compounds, there may be used aluminum salts such as aluminum acetate, aluminum sulfate, aluminum chloride or aluminum nitrate, alkali aluminates such as sodium aluminate, alumina sol, aluminum hydroxide or the like.

The amount of the aluminum compound added is 0.05 to 50% by weight (calculated as Al) based on the total weight of the particles.

The obtained acicular goethite particles usually have an average major axial diameter of ordinarily 0.005 to 0.4 μm, an average minor axial diameter of ordinarily 0.0025 to 0.20 μm, a geometrical standard deviation of the major axis diameter of not more than 1.70, a geometrical standard deviation of the minor axis diameter of 1.37 to 1.50 and a BET specific surface area of about ordinarily 50 to 250 m$^2$/g, contain aluminum in an amount of usually 0.05 to 50% by weight (calculated as Al) based on the total weight of the particles, and contain soluble sodium salts of usually 300 to 1500 ppm (calculated as Na) and soluble sulfates of usually 100 to 3000 ppm (calculated as SO$_4$).

Next, there is described a process for producing acicular hematite particles to be treated, which may substantially uniformly containing aluminum within the particle.

The acicular hematite particles which may substantially uniformly contain aluminum within the particle may be produced by heat-dehydrating the above-mentioned acicular goethite particles which may substantially uniformly contain aluminum within the particle.

The temperature of the heat-dehydration is preferably 550 to 850° C. to obtain high-density acicular hematite particles which may substantially uniformly contain aluminum within the particle.

Especially, in the case where the heat-dehydration is conducted at an elevated temperature as high as not less than 550° C., it is preferred that the surface of the acicular goethite particle which may substantially uniformly contain aluminum within the particle, is coated with an antisintering agent prior to the heat-dehydration, as is well known in the art.

As the sintering preventive, sintering preventives generally used are usable. For example, phosphorus compounds such as sodium hexametaphosphate, polyphospholic acid and orthophosphoric acid, silicon compounds such as #3 water glass, sodium orthosilicate, sodium metasilicate and colloidal silica, boron compounds such as boric acid, aluminum compounds including aluminum salts such as aluminum acetate, aluminum sulfate, aluminum chloride and aluminum nitrate, alkali aluminate such as sodium aluminate, alumina sol and aluminum hydroxide, and titanium compounds such as titanyl sulfate may be exemplified.

The amount of the sintering preventive applied onto the surface of the acicular goethite particle is about 0.05 to 10% by weight based on the total weight of the particles, though the amount is varied depending upon kinds of sintering preventives used, pH value of the alkali aqueous solution or various conditions such as heat-treating temperature or the like.

The acicular goethite particles coated with a sintering preventive have the BET specific surface area ($S_{BET}$) of usually about 50 to 250 m$^2$/g. The coating treatment using a sintering preventive is composed of the steps of: adding a sintering preventive to an aqueous suspension containing the acicular goethite particles, mixing and stirring the resultant suspension, filtering out the particles, washing the particles with water, and drying the particles.

Meanwhile, as the acicular hematite particles to be treated, there may be preferably used high-density acicular hematite particles which may substantially uniformly contain aluminum within the particle. In the case of low-density acicular hematite particles, many dehydration pores are present within particles or on surfaces thereof. Therefore, upon subjecting the particles to the acid-dissolving treatment, the dissolution is initiated from the dehydration pores, so that the particle shape can be no longer maintained, resulting in deteriorated dispersibility of the obtained particles.

In order to obtain high-density acicular hematite particles which can maintain a particle shape of the acicular goethite particles, it is preferred that the acicular goethite particles which may substantially uniformly contain aluminum within the particle, are first heat-treated at a temperature as low as not less than 250° C. and less than 550° C. to form low-density acicular hematite particles which may contain aluminum which is present within the particle, and then the low-density hematite particles are heat-treated at an elevated temperature as high as 550 to 850° C.

If the temperature for heat-treating the goethite particles is less than 250° C., the dehydration reaction takes a long time. On the other hand, if the temperature is not less than 550° C., the dehydration reaction is abruptly brought out, so that it is difficult to retain the shapes because the sintering between particles is caused. The low-density acicular hematite particles obtained by heat-treating the acicular goethite particles at a low temperature are low-density particles having a large number of dehydration pores through which $H_2O$ is removed from the acicular goethite particles and the BET specific surface area thereof is about 1.2 to 2 times larger than that of the acicular goethite particles as the precursor.

The low-density acicular hematite particles obtained by heat-treating the acicular goethite particles coated with a sintering preventive at a temperature of not less than 250° C. and less than 550° C., have an average major axis diameter of usually 0.005 to 0.30 μm, an average minor axis diameter of usually 0.0025 to 0.15 μm, a geometrical standard deviation of a major axis diameter of usually not more than 1.70, a geometrical standard deviation of a minor axis diameter of usually 1.37 to 1.50 and a BET specific surface area ($S_{BET}$) of usually about 70 to 350 m²/g, and contain ordinarily soluble sodium salts of usually 300 to 1500 ppm (calculated as Na) and ordinarily soluble sulfates of usually 100 to 3000 ppm (calculated as $SO_4$).

The low-density acicular hematite particles containing aluminum which is present within the particle, obtained by heat-treating the acicular goethite particles coated with a sintering preventive at a temperature of not less than 250° C. and less than 550° C., have an average major axis diameter of usually 0.005 to 0.30 μm, an average minor axis diameter of usually 0.0025 to 0.15 μm, a geometrical standard deviation of a major axis diameter of usually not more than 1.70, a geometrical standard deviation of a minor axis diameter of usually 1.37 to 1.50 and a BET specific surface area ($S_{BET}$) of usually about 70 to 350 m²/g, and containing aluminum in an amount of 0.05 to 50% by weight (calculated as Al) based on the total weight of the particles, and contain soluble sodium salts of usually 500 to 3000 ppm (calculated as Na) and soluble sulfates of usually 300 to 4000 ppm (calculated as $SO_4$).

The low-density acicular hematite particles which may substantially uniformly contain aluminum within the particle, are then heat-treated at a temperature of usually 550 to 850° C., preferably 550 to 800° C. to obtain a high-density acicular hematite particles which may substantially uniformly contain aluminum within the particle. If the heat-treating temperature is less than 550° C., since the densification may be insufficient, a large number of dehydration pores may exist within and on the surface of the acicular hematite particles, so that the dispersion in the vehicle may become insufficient. Further, when the non-magnetic undercoat layer is formed from these particles, it may be difficult to obtain a coating film having a smooth surface. On the other hand, if the temperature exceeds 850° C., although the densification of the acicular hematite particles may be sufficient, since sintering is caused on and between particles, the particle size may increase, so that it may be difficult to obtain a coating film having a smooth surface.

The BET specific surface area of the high-density acicular hematite particles having the average major axis diameter of usually 0.005 to 0.30 μm, the average minor axis diameter of usually 0.0025 to 0.15 μm, the geometrical standard deviation of a major axis diameter of usually not more than 1.70 and the geometrical standard deviation of a minor axis diameter of usually 1.37 to 1.50, is usually about 35 to 180 m²/g. The high-density acicular hematite particles contain soluble sodium salts of usually 500 to 4000 ppm (calculated as Na) and soluble sulfates of usually 300 to 5000 ppm (calculated as $SO_4$).

The BET specific surface area of the high-density acicular hematite particles having the average major axis diameter of usually 0.005 to 0.30 μm, the average minor axis diameter of usually 0.0025 to 0.15 μm, the geometrical standard deviation of a major axis diameter of usually not more than 1.70 and the geometrical standard deviation of a minor axis diameter of usually 1.37 to 1.50, and containing aluminum within the particle, is usually about 35 to 180 m²/g. The high-density acicular hematite particles contain soluble sodium salts of usually 500 to 4000 ppm (calculated as Na) and soluble sulfates of usually 300 to 5000 ppm (calculated as $SO_4$), and contain aluminum in amount of 0.05 to 50% by weight (calculated as Al) based on the total weight of the particles.

The high-density acicular hematite particles which may substantially uniformly contain aluminum within the particle, are diaggregated by a dry-process, and formed into a slurry. The coarse particles thereof contained in the slurry are then deagglomerated by a wet-process. In the wet-deagglomeration, ball mill, sand grinder, colloid mill or the like is used until the coarse particles having a particle size of at least 44 μm are substantially removed. That is, the wet-pulverization is carried out until the amount of the coarse particles having a particle size of not less than 44 μm becomes to usually not more than 10% by weight, preferably not more than 5% by weight, more preferably 0% by weight based on the total weight of the particles. If the amount of the coarse particles having a particle size of not less than 44 μm is more than 10% by weight, the effect of treating the particles in an acid-dissolving treatment at the next step is not attained.

Next, there is described a process for producing acicular hematite particles having a specific geometrical standard deviation of the minor axis diameter.

The acicular hematite particles may be produced by subjecting a water suspension of acicular hematite particles as particles to be treated to an acid-dissolving treatment at an acid concentration of not less than 1.0 N, a pH value of not more than 3.0 and a temperature of 20 to 100° C. so as to dissolve 5 to 50% by weight of the acicular hematite particles based on the total weight of acicular hematite particles present in the water suspension, followed by washing with water; adding an aqueous alkali solution to the water suspension containing residual acicular hematite particles so as to adjust the pH value of the water suspension to not less than 13; and then heat-treating the water suspension at a temperature of 80 to 103° C., followed by filtering, washing with water and drying.

First, the acicular hematite particles to be treated with acid, are described below.

The particle shape of the hematite particles to be treated, is an acicular shape. The "acicular" shape may include not only a needle shape but also a spindle shape or a rice ball shape. In addition, the aspect ratio of the particles is usually 2:1 to 20:1.

The average major axis diameter of the acicular hematite particles to be treated, is usually 0.005 to 0.3 μm, preferably 0.02 to 0.28 μm.

The average minor axis diameter of the acicular hematite particles to be treated, is usually 0.0025 to 0.15 μm, preferably 0.01 to 0.14 μm.

The geometrical standard deviation of the major axis diameter of the acicular hematite particles to be treated, is usually not more than 1.70, and the geometrical standard deviation of the minor axis diameter of the acicular hematite particles to be treated, is usually 1.37 to 1.50.

The BET specific surface area ($S_{BET}$) of the acicular hematite particles to be treated, is usually 35 to 180 m²/g.

The acicular hematite particles to be treated contain soluble sodium salts of usually 500 to 4000 ppm (calculated as Na) and soluble sulfates of usually 300 to 5000 ppm (calculated as $SO_4$).

The acicular hematite particles to be treated, may contain aluminum in an amount of usually 0.05 to 50% by weight (calculated as Al) which is present within the particle.

Next, the acid-dissolving treatment of the acicular hematite particles to be treated is described in detail.

The concentration of the acicular hematite particles in the water suspension is usually 1 to 500 g/liter, preferably 10 to 250 g/liter. When the concentration of the acicular hematite particles in the water suspension is less than 1 g/liter, the amount of the particles treated is too small, which is industrially disadvantageous. On the other hand, when the concentration of the acicular hematite particles in the water suspension is more than 500 g/liter, it becomes difficult to evenly subject the particles to the acid-dissolving treatment.

As the acids, there may be used any of sulfuric acid, hydrochloric acid, nitric acid, sulfurous acid, chloric acid, perchloric acid and oxalic acid. With the consideration of corrosion or deterioration of a container in which a high-temperature treatment or a dissolving treatment is conducted, economy or the like, sulfuric acid is preferred.

The concentration of the acid is usually not less than 1.0 N, preferably not less than 1.2 N, more preferably not less than 1.5 N. The upper limit of concentration of the acid is preferably 5 N. When the acid concentration is less than 1.0 N, the dissolution of the acicular hematite particles requires an extremely long period of time and is, therefore, industrially disadvantageous.

Upon the acid-dissolving treatment, the initial pH value is usually not more than 3.0, preferably not more than 2.0, more preferably not more than 1.0. With the consideration of the dissolving time or the like, it is industrially preferred that the pH value is not more than 1.0. When the pH value is more than 3.0, the dissolution of the acicular hematite particles requires an extremely long period of time and is, therefore, industrially disadvantageous.

The temperature of the water suspension is usually 20 to 100° C., preferably 50 to 100° C., more preferably 70 to 100° C. When the temperature of the water suspension is less than 20° C., the dissolution of the acicular hematite particles requires an extremely long period of time and is, therefore, industrially disadvantageous. On the other hand, when the temperature of the water suspension is more than 100° C., the dissolution of the particles proceeds too rapidly, so that it becomes difficult to control the dissolving treatment. Further, in that case, the dissolving treatment requires a special apparatus such as autoclave, resulting in industrially disadvantageous process.

Incidentally, in the case where the acicular hematite particles to be treated have a relatively large average major axis diameter, i.e., in the range of 0.05 to 0.30 μm, it is preferred that the dissolving treatment is conducted under the hard conditions, e.g., at a pH value of not more than 1.0 and a temperature of 70 to 100° C. On the other hand, in the case where the acicular hematite particles to be treated have a relatively small average major axis diameter, i.e., in the range of 0.005 to 0.05 μm, it is preferred that the dissolving treatment is conducted under the soft conditions, e.g., at a pH value of 1.0 to 3.0 and a temperature of 20 to 70° C.

The dissolving treatment with acid may be conducted until the amount of the acicular hematite particles dissolved reaches 5 to 50% by weight, preferably 10 to 45% by weight, more preferably 15 to 40% by weight based on the total weight of the acicular hematite particles to be treated. When the amount of the acicular hematite particles dissolved is less than 5% by weight, the fine particle components may not be sufficiently removed by the dissolving treatment. On the other hand, when the amount of the acicular hematite particles dissolved is more than 50% by weight, the particles as a whole may be finely divided and the dissolving loss is increased, resulting in industrially disadvantageous process.

Incidentally, the aqueous solution in which iron salts are dissolved in the above dissolving treatment, is separated from the slurry by filtration. From the standpoint of the reuse of resources, the thus-separated iron salts may be used as a raw material of the ferrous salt used for the production of acicular goethite particles.

After completion of the above acid-dissolving treatment with acid, the acicular hematite particles remaining in the water suspension is filtered, washed with water and dried.

As the water-washing methods, there may be used those ordinarily used in industrial fields, such as a washing method by decantation, a washing method conducted according to a diluting process by using a filter thickener, a washing method of feeding water through a filter press, or the like.

(II) The acicular hematite particles according to the present invention are produced by heat-treating the specific acicular goethite particles which are produced by the aforementioned method, at a temperature of 100 to 200° C., whereby superfine goethite particles are adhered to the surface of the acicular goethite particles, and heat-treating at a temperature of 550 to 850° C.

As the acicular goethite particles as precursor, acicular goethite particles having an average major axis diameter of usually 0.01 to 0.25 μm and a geometrical standard deviation of a minor axis diameter of usually 1.37 to 1.50, are used. Especially, acicular goethite particles having an average major axis diameter of usually 0.01 to 0.25 μm, an average minor axis diameter of usually 0.05 to 0.17 μm, a geometrical standard deviation of a major axis diameter of usually not more than 1.70, a geometrical standard deviation of a minor axis diameter of usually 1.37 to 1.50, and a BET specific surface area ($S_{BET}$) of usually 50 to 250 m$^2$/g, containing soluble sodium salts of usually 500 to 1500 ppm (calculated as Na) and soluble sulfates of usually 150 to 3000 ppm (calculated as SO$_4$), are preferable.

Also, the acicular goethite particles which substantially uniformly contain aluminum within the particle as starting particles, have an average major axis diameter of usually 0.01 to 0.25 μm and a geometrical standard deviation of a minor axis diameter of usually 1.37 to 1.50, are used. Especially, acicular goethite particles having an average major axis diameter of usually 0.01 to 0.25 μm, an average minor axis diameter of usually 0.05 to 0.17 μm, a geometrical standard deviation of a major axis diameter of usually not more than 1.70, a geometrical standard deviation of a minor axis diameter of usually 1.37 to 1.50, and a BET specific surface area ($S_{BET}$) of usually 50 to 250 m$^2$/g, and containing aluminum in amount of 0.05 to 50% by weight (calculated as Al) based on the total weight of the particles and containing soluble sodium salts of usually 500 to 1500 ppm (calculated as Na) and soluble sulfates of usually 150 to 3000 ppm (calculated as SO$_4$), are preferable.

When the heating temperature is less than 100° C., it may be difficult to absorb a sufficient amount of the superfine goethite particles into the acicular goethite particles, thereby failing to obtain particles having a uniform particle size. On the other hand, when the heating temperature is more than 200° C., the acicular goethite particles is heat-dehydrated under such a condition that the superfine goethite particles still remain therein. As a result, the sintering between the particles is disadvantageously caused, thereby also failing to obtain particles having a uniform particle size. With the consideration of industrial productivity or the like, the heat-treating temperature is preferably 120 to 200° C.

The heat-treating time is preferably 5 to 60 minutes.

The acicular goethite particles obtained by heat-treating at a temperature of 100 to 200° C., have an average major axis diameter of usually 0.011 to 0.26 μm, and a geometrical standard deviation of minor axis diameter of usually not more than 1.30.

Especially, it is preferred that the acicular goethite particles obtained by heat-treating at a temperature of 100 to 200° C., have an average major axis diameter of usually 0.011 to 0.26 μm, an average minor axis diameter of usually 0.0055 to 0.13 μm, a geometrical standard deviation of major axis diameter of usually not more than 1.50, a geometrical standard deviation of minor axis diameter of usually not more than 1.30, and a BET specific surface area ($S_{BET}$) of usually 50 to 250 m$^2$/g, and contain soluble sodium salts of usually 300 to 1500 ppm (calculated as Na) and soluble sulfates of usually 150 to 3000 ppm (calculated as SO$_4$).

Also, it is preferred that the acicular goethite particles which substantially uniformly contain aluminum within the particle as starting particles and are obtained by heat-treating at a temperature of 100 to 200° C., have an average major axis diameter of usually 0.011 to 0.26 and a geometrical standard deviation of a minor axis diameter of usually not more than 1.30, and containing aluminum in amount of 0.05 to 50% by weight (calculated as Al) based on the total weight of the particles.

Especially, the acicular goethite particles which substantially uniformly contain aluminum within the particle as starting particles and are obtained by heat-treating at a temperature of 100 to 200° C., have an average major axis diameter of usually 0.011 to 0.26, an average minor axis diameter of usually 0.0055 to 0.13 μm, a geometrical standard deviation of a major axis diameter of usually not more than 1.50, a geometrical standard deviation of a minor axis diameter of usually not more than 1.30, and a BET specific surface area ($S_{BET}$) of usually 50 to 250 m$^2$/g, and containing aluminum in amount of 0.05 to 50% by weight (calculated as Al) based on the total weight of the particles, and contain soluble sodium salts of usually 300 to 1500 ppm (calculated as Na) and soluble sulfates of usually 150 to 3000 ppm (calculated as SO$_4$).

The obtained acicular goethite particles are heat-treated at 550 to 850° C., thereby producing acicular hematite particles.

Incidentally, as the acicular hematite particles according to the present invention, high-density acicular hematite particles produced by heat-treating acicular goethite particles at 100 to 200° C., heat-dehydrating the acicular goethite particles at 250 to 500° C., thereby obtaining low-density acicular hematite particles, and then heat-treating the obtained low-density acicular hematite particles at a temperature as high as 550 to 850° C., are preferable.

Next, the high-purification treatment of the acicular hematite particles is explained.

The high-density acicular hematite particles having a specific geometrical standard deviation of a minor axis diameter, which may substantially uniformly contain aluminum within the particle, are diaggregated by a dry-process, and formed into a slurry. The coarse particles thereof contained in the slurry are then deagglomerated by a wet-process. In the wet-deagglomeration, ball mill, sand grinder, colloid mill or the like is used until the coarse particles having a particle size of at least 44 μm are substantially removed. That is, the wet-pulverization is carried out until the amount of the coarse particles having a particle size of not less than 44 μm becomes to usually not more than 10% by weight, preferably not more than 5% by weight, more preferably 0% by weight based on the total weight of the particles. If the amount of the coarse particles having a particle size of not less than 44 μm is more than 10% by weight, the effect of treating the particles in a high-purification treatment at the next step is not attained.

The acicular hematite particles for a non-magnetic undercoat layer of a magnetic recording medium according to the present invention can be produced by adding an aqueous alkali solution to a water suspension containing acicular hematite particles so as to adjust the pH value of the water suspension to not less than 13, and then heat-treating the water suspension at 80 to 103° C., followed by filtering, washing with water and drying.

Upon the addition of the aqueous alkali solution, it is preferred that a filter cake obtained by filtering and water-washing the water suspension containing the acicular hematite particles, is preliminarily dispersed in water, thereby forming a water suspension again, or that the water suspension containing the acicular hematite particles is preliminarily washed with water by a decantation method.

The concentration of the alkaline suspension containing the acicular hematite particles is preferably 50 to 250 g/liter.

As the above-mentioned aqueous alkali solution, there may be used aqueous solutions containing alkali hydroxides such as sodium hydroxide, potassium hydroxide, calcium hydroxide or the like.

If the pH value of the aqueous alkali solution containing the acicular hematite particles is less than 13, it is difficult to effectively remove the solid crosslinking caused by the sintering preventive which exists on the surfaces of the acicular hematite particles, so that it is difficult to wash out the soluble sodium salt, soluble sulfate, etc. existing within and on the surfaces of the particles. The upper limit of the pH value is about 14. In consideration of the effect of removing the solid crosslinking caused by the sintering preventive which exists on the surfaces of the acicular hematite particles, the effect of washing out the soluble sodium slat, soluble sulfate, etc., and the effect of removing the alkali which adheres to the surfaces of acicular hematite particles in the process of treatment with the aqueous alkali solution, the preferable pH value is in the range of 13.1 to 13.8.

The heating temperature in the aqueous alkali suspension is preferably 80 to 103° C., more preferably 90 to 100° C. If the temperature is lower than 80° C., it is difficult to effectively remove the solid crosslinking caused by the sintering preventive which exists on the surfaces of the acicular hematite particles. If the heating temperature exceeds 103° C., although it is possible to effectively remove the solid crosslinking, since an autoclave is necessary or the treated solution boils under a normal pressure, it is not advantageous from the point of view of industry.

The acicular hematite particles heat-treated in the aqueous alkali suspension are thereafter filtered out and washed with water by an ordinary method so as to remove the soluble sodium salt and soluble sulfate which are washed out of the interiors and the surfaces of the particles and to remove the alkali adhered to the surfaces of the acicular hematite particles in the process of treatment with the aqueous alkali solution, and then dried.

As the method of washing the acicular hematite particles with water, a method generally industrially used such as a decantation method, a dilution method using a filter thickener and a method of passing water into a filter press is adopted.

If the soluble sodium salt and soluble sulfate which are contained within the acicular hematite particles are washed out with water, even if soluble sodium salt and soluble sulfate adhere to the surfaces when the surfaces of the acicular hematite particles are coated with a coating material, the soluble sodium salt and soluble sulfate can be easily removed by water washing.

The acicular hematite particles for a non-magnetic undercoat layer of a magnetic recording medium according to the present invention, may be coated with at least one compound selected from the group consisting of hydroxides of aluminum, oxides of aluminum, hydroxides of silicon and oxides of silicon, if required.

In order to coat the acicular hematite particles, an aluminum compound and/or a silicon compound is added to an aqueous suspension containing the acicular hematite particles, and mixed under stirring. After mixing and stirring, the pH value of the mixed solution is adjusted by using an alkali or acid, if necessary. The acicular hematite particles thus coated with at least one selected from the group consisting of a hydroxide of aluminum, an oxide of aluminum, a hydroxide of silicon and an oxide of silicon are then filtered out, washed with water, dried and pulverized. They may be further deaerated and compacted, if necessary.

As the aluminum compound for the coating, the same aluminum compounds as those described above as the sintering preventive are usable.

The amount of aluminum compound added is usually 0.01 to 50% by weight (calculated as Al) based on the total weight of the particles. If the amount is less than 0.01% by weight, the dispersibility-improving effect in the vehicle may be insufficient. On the other hand, if the amount exceeds 50% by weight, the coating dispersibility-improving effect becomes saturated, so that it is meaningless to add an aluminum compound more than necessary.

As the silicon compound, the same silicon compounds as those described above as the sintering preventive are usable.

The amount of silicon compound added is 0.01 to 50% by weight (calculated as $SiO_2$) based on the total weight of the particles. If the amount is less than 0.01% by weight, the improvement of the dispersibility in the vehicle may be insufficient. On the other hand, if the amount exceeds 50.00% by weight, the coating dispersibility-improving effect becomes saturated, so that it is meaningless to add an silicon compound more than necessary.

When both an aluminum compound and a silicon compound are used, the amount thereof used is preferably 0.01 to 50% by weight (calculated as Al and $SiO_2$) based on the total weight of the particles.

Next, the magnetic recording medium according to the present invention is described.

The magnetic recording medium according to the present invention comprises:

a non-magnetic base film;

a non-magnetic undercoat layer formed on the non-magnetic base film, comprising a binder resin and the acicular hematite particles; and a magnetic coating film formed on the non-magnetic undercoat layer, comprising a binder resin and magnetic particles.

Firstly, the non-magnetic substrate having the non-magnetic undercoat layer according to the present invention is described.

The non-magnetic substrate according to the present invention comprises:

a non-magnetic base film; and a non-magnetic undercoat layer formed on said non-magnetic base film, comprising a binder resin and the acicular hematite particles.

The non-magnetic substrate of the present invention is produced by forming a coating film on the base film and drying the coating film. The coating film is formed by applying a non-magnetic coating composition which contains the acicular hematite particles, a binder resin and a solvent, to the surface of the base film.

As the base film, the following materials which are at present generally used for the production of a magnetic recording medium are usable as a raw material: a synthetic resin such as polyethylene terephthalate, polyethylene, polypropylene, polycarbonate, polyethylene naphthalate, polyamide, polyamideimide and polyimide; foil and plate of a metal such as aluminum and stainless steel; and various kinds of paper. The thickness of the base film varies depending upon the material, but it is usually about 1.0 to 300 μm, preferably 2.0 to 200 μm.

In the case of a magnetic disc, polyethylene terephthalate is usually used as the base film, and the thickness thereof is usually 50 to 300 μm, preferably 60 to 200 μm.

In a magnetic tape, when polyethylene terephthalate is used as the base film, the thickness thereof is usually 3 to 100 μm, preferably 4 to 20 μm; when polyethylene naphthalate is used, the thickness thereof is usually 3 to 50 μm, preferably 4 to 20 μm; and when polyamide is used, the thickness thereof is usually 2 to 10 μm, preferably 3 to 7 μm.

As the binder resin used in the present invention, the following resins which are at present generally used for the production of a magnetic recording medium are usable: vinyl chloride-vinyl acetate copolymer, urethane resin, vinyl chloride-vinyl acetate-maleic acid copolymer, urethane elastomer, butadiene-acrylonitrile copolymer, polyvinyl butyral, cellulose derivative such as nitrocellulose, polyester resin, synthetic rubber resin such as polybutadiene, epoxy resin, polyamide resin, polyisocyanate, electron radiation curing acryl urethane resin and mixtures thereof. Each of these resin binders may contain a functional group such as —OH, —COOH, —SO$_3$M, —OPO$_2$M$_2$ and —NH$_2$, wherein M represents H, Na or K. With the consideration of the dispersibility of the particles, a binder resin containing a functional group —COOH or —SO$_3$M is preferable.

The mixing ratio of the acicular hematite particles with the binder resin is usually 5 to 2000 parts by weight, preferably 100 to 1000 parts by weight based on 100 parts by weight of the binder resin.

As the solvents, there may be used methyl ethyl ketone, toluene, cyclohexanone, methyl isobutyl ketone, tetrahydrofuran, a mixture of these solvents or the like.

The total amount of the solvent used is 50 to 1,000 parts by weight based on 100 parts by weight of the acicular hematite particles. When the amount of the solvent used is less than 50 parts by weight, the viscosity of the non-magnetic coating composition prepared therefrom becomes too high, thereby making it difficult to apply the non-magnetic coating composition. On the other hand, when the amount of the solvent used is more than 1,000 parts by weight, the amount of the solvent volatilized during the formation of the coating film becomes too large, thereby rendering the coating process industrially disadvantageous.

It is possible to add a lubricant, a polishing agent, an antistatic agent, etc. which are generally used for the production of a magnetic recording medium to the non-magnetic undercoat layer.

The thickness of the non-magnetic undercoat layer obtained by applying a non-magnetic coating composition on the surface of the base film and drying, is usually 0.2 to 10.0 μm, preferably 0.5 to 5.0 μm. If the thickness is less than 0.2 μm, not only it is impossible to ameliorate the surface roughness of the non-magnetic substrate but also the strength is insufficient. If the thickness is more than 10 μm, it is difficult to reduce the thickness of the magnetic recording medium.

In case of using the acicular hematite particles as defined in first aspect as non-magnetic particles, the non-magnetic substrate according to the present invention has a gloss (of the coating film) of usually 189 to 300%, preferably 194 to 300%, more preferably 198 to 300%; a surface roughness Ra (of the coating film) of usually 0.5 to 9.6 nm, preferably 0.5 to 9.1 nm, more preferably 0.5 to 8.6 nm; a Young's modulus (relative value to a commercially available video tape: and AV T-120 produced by Victor Company of Japan, Limited) of usually 120 to 160, preferably 121 to 160.

In case of using the acicular hematite particles as defined in second aspect as non-magnetic particles, the non-magnetic substrate according to the present invention has a gloss (of the coating film) of usually 191 to 300%, preferably 196 to 300%, more preferably 201 to 300%; a surface roughness Ra (of the coating film) of usually 0.5 to 9.4 nm, preferably 0.5 to 8.9 nm, more preferably 0.5 to 8.4 nm; a Young's modulus (relative value to a commercially available video tape: and AV T-120 produced by Victor Company of Japan, Limited) of usually 122 to 160, preferably 124 to 160.

In case of using the acicular hematite particles as defined in third aspect as non-magnetic particles, the non-magnetic substrate according to the present invention has a gloss (of the coating film) of usually 191 to 300%, preferably 196 to 300%, more preferably 201 to 300%; a surface roughness Ra (of the coating film) of usually 0.5 to 9.3 nm, preferably 0.5 to 8.8 nm, more preferably 0.5 to 8.3 nm; a Young's modulus (relative value to a commercially available video tape: and AV T-120 produced by Victor Company of Japan, Limited) of usually 122 to 160, preferably 124 to 160.

In case of using the acicular hematite particles as defined in fourth aspect as non-magnetic particles, the non-magnetic substrate according to the present invention has a gloss (of the coating film) of usually 193 to 300%, preferably 198 to 300%, more preferably 203 to 300%; a surface roughness Ra (of the coating film) of usually 0.5 to 9.1 nm, preferably 0.5 to 8.6 nm, more preferably 0.5 to 8.1 nm; a Young's modulus (relative value to a commercially available video tape: and AV T-120 produced by Victor Company of Japan, Limited) of usually 124 to 160, preferably 126 to 160.

In case of using the acicular hematite particles as defined in ninth aspect as non-magnetic particles, the non-magnetic substrate according to the present invention has a gloss (of the coating film) of usually 193 to 300%, preferably 198 to 300%, more preferably 203 to 300%; a surface roughness Ra (of the coating film) of usually 0.5 to 9.0 nm, preferably 0.5 to 8.5 nm, more preferably 0.5 to 8.0 nm; a Young's modulus (relative value to a commercially available video tape: and AV T-120 produced by Victor Company of Japan, Limited) of usually 124 to 160, preferably 126 to 160.

In case of using the acicular hematite particles as defined in tenth aspect as non-magnetic particles, the non-magnetic substrate according to the present invention has a gloss (of the coating film) of usually 195 to 300%, preferably 200 to 300%, more preferably 205 to 300%; a surface roughness Ra (of the coating film) of usually 0.5 to 8.8 nm, preferably 0.5 to 8.3 nm, more preferably 0.5 to 7.8 nm; a Young's modulus (relative value to a commercially available video tape: and AV T-120 produced by Victor Company of Japan, Limited) of usually 126 to 160, preferably 128 to 160.

In case of using the acicular hematite particles as defined in eleventh aspect as non-magnetic particles, the non-magnetic substrate according to the present invention has a gloss (of the coating film) of usually 196 to 300%, preferably 201 to 300%, more preferably 206 to 300%; a surface roughness Ra (of the coating film) of usually 0.5 to 8.7 nm, preferably 0.5 to 8.2 nm, more preferably 0.5 to 7.7 nm; a Young's modulus (relative value to a commercially available video tape: and AV T-120 produced by Victor Company of Japan, Limited) of usually 126 to 160, preferably 128 to 160.

In case of using the acicular hematite particles as defined in twelfth aspect as non-magnetic particles, the non-magnetic substrate according to the present invention has a gloss (of the coating film) of usually 198 to 300%, preferably 203 to 300%, more preferably 208 to 300%; a surface roughness Ra (of the coating film) of usually 0.5 to 8.5 nm, preferably 0.5 to 8.0 nm, more preferably 0.5 to 7.5 nm; a Young's modulus (relative value to a commercially available video tape: and AV T-120 produced by Victor Company of Japan, Limited) of usually 128 to 160, preferably 130 to 160.

The magnetic recording medium according to the present invention can be produced by applying a magnetic coating composition containing the magnetic particles, a binder resin and a solvent, on the non-magnetic undercoat layer, followed by drying, to form a magnetic recording layer thereon.

As the magnetic particles used in the present invention, magnetic particles containing iron as a main component are usable.

The magnetic acicular metal particles containing iron as a main ingredient used in the present invention comprises iron and at least one selected from the group consisting of Co, Al, Ni, P, Si, Zn, Ti, B, Nd, La and Y. Further, the following magnetic acicular metal particles containing iron as a main component may be exemplified.

1) Magnetic acicular metal particles containing iron as a main component comprises iron; and cobalt of usually 0.05 to 40% by weight, preferably 1.0 to 35% by weight, more preferably 3 to 30% by weight (calculated as Co) based on the weight of the magnetic acicular metal particles containing iron as a main component.

2) Magnetic acicular metal particles containing iron as a main component comprises iron; and aluminum of usually 0.05 to 10% by weight, preferably 0.1 to 7% by weight (calculated as Al) based on the weight of the magnetic acicular metal particles containing iron as a main component.

3) Magnetic acicular metal particles containing iron as a main component comprises iron; cobalt of usually 0.05 to 40% by weight, preferably 1.0 to 35% by weight, more preferably 3 to 30% by weight (calculated as Co) based on the weight of the magnetic acicular metal particles containing iron as a main component; and aluminum of usually 0.05 to 10% by weight, preferably 0.1 to 7% by weight (calculated as Al) based on the weight of the magnetic acicular metal particles containing iron as a main component.

4) Magnetic acicular metal particles containing iron as a main component comprises iron; cobalt of usually 0.05 to 40% by weight, preferably 1.0 to 35% by weight, more preferably 3 to 30% by weight (calculated as Co) based on the weight of the magnetic acicular metal particles containing iron as a main component; and at least one selected from the group consisting of Nd, La and Y of usually 0.05 to 10% by weight, preferably 0.1 to 7% by weight (calculated as the corresponding element) based on the weight of the magnetic acicular metal particles containing iron as a main component.

5) Magnetic acicular metal particles containing iron as a main component comprises iron; aluminum of usually 0.05 to 10% by weight, preferably 0.1 to 7% by weight (calculated as Al) based on the weight of the magnetic acicular metal particles containing iron as a main component; and at least one selected from the group consisting of Nd, La and Y of usually 0.05 to 10% by weight, preferably 0.1 to 7% by weight (calculated as the corresponding element) based on the weight of the magnetic acicular metal particles containing iron as a main component.

6) Magnetic acicular metal particles containing iron as a main component comprises iron; cobalt of usually 0.05 to 40% by weight, preferably 1.0 to 35% by weight, more preferably 3 to 30% by weight (calculated as Co) based on the weight of the magnetic acicular metal particles containing iron as a main component; aluminum of usually 0.05 to 10% by weight, preferably 0.1 to 7% by weight (calculated as Al) based on the weight of the magnetic acicular metal particles containing iron as a main component; and at least one selected from the group consisting of Nd, La and Y of usually 0.05 to 10% by weight, preferably 0.1 to 7% by weight (calculated as the corresponding element) based on the weight of the magnetic acicular metal particles containing iron as a main component.

7) Magnetic acicular metal particles containing iron as a main component comprises iron; cobalt of usually 0.05 to 40% by weight, preferably 1.0 to 35% by weight, more preferably 3 to 30% by weight (calculated as Co) based on the weight of the magnetic acicular metal particles containing iron as a main component; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles containing iron as a main component.

8) Magnetic acicular metal particles containing iron as a main component comprises iron; aluminum of usually 0.05 to 10% by weight, preferably 0.1 to 7% by weight (calculated as Al) based on the weight of the magnetic acicular metal particles containing iron as a main component; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles containing iron as a main component.

9) Magnetic acicular metal particles containing iron as a main component comprises iron; cobalt of usually 0.05 to 40% by weight, preferably 1.0 to 35% by weight, more preferably 3 to 30% by weight (calculated as Co) based on the weight of the magnetic acicular metal particles containing iron as a main component; aluminum of usually 0.05 to 10% by weight, preferably 0.1 to 7% by weight (calculated as Al) based on the weight of the magnetic acicular metal particles containing iron as a main component; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles containing iron as a main component.

10) Magnetic acicular metal particles containing iron as a main component comprises iron; cobalt of usually 0.05 to 40% by weight, preferably 1.0 to 35% by weight, more preferably 3 to 30% by weight (calculated as Co) based on the weight of the magnetic acicular metal particles containing iron as a main component; at least one selected from the group consisting of Nd, La and Y of usually 0.05 to 10% by weight, preferably 0.1 to 7% by weight (calculated as the corresponding element) based on the weight of the magnetic acicular metal particles containing iron as a main component; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles containing iron as a main component.

11) Magnetic acicular metal particles containing iron as a main component comprises iron; aluminum of usually y 0.05 to 10% by weight, preferably 0.1 to 7% by weight (calculated as Al) based on the weight of the magnetic acicular metal particles containing iron as a main component; at least one selected from the group consisting of Nd, La and Y of ordinarily 0.05 to 10% by weight, preferably 0.1 to 7% by weight (calculated as the corresponding element) based on the weight of the magnetic acicular metal particles containing iron as a main component; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles containing iron as a main component.

12) Magnetic acicular metal particles containing iron as a main component comprises iron; cobalt of usually 0.05 to 40% by weight, preferably 1.0 to 35% by weight, more preferably 3 to 30% by weight (calculated as Co) based on the weight of the magnetic acicular metal particles containing iron as a main component; aluminum of usually 0.05 to 10% by weight, preferably 0.1 to 7% by weight (calculated as Al) based on the weight of the magnetic acicular metal particles containing iron as a main component; at least one selected from the group consisting of Nd, La and Y of usually 0.05 to 10% by weight, preferably 0.1 to 7% by weight (calculated as the corresponding element) based on the weight of the magnetic acicular metal particles containing iron as a main component; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles containing iron as a main component.

The iron content in the particles is the balance, and is preferably 50 to 99% by weight, more preferably 60 to 95% by weight (calculated as Fe) based on the weight of the magnetic acicular metal particles containing iron as a main component.

The magnetic acicular metal particles containing iron as a main component comprising (i) iron and Al; (ii) iron, cobalt and aluminum, (iii) iron, aluminum and at least one rare-earth metal such as Nd, La and Y, or (iv) iron, cobalt, aluminum and at least one rare-earth metal such as Nd, La and Y is preferable from the point of the durability of the magnetic recording medium.

Further, the magnetic acicular metal particles containing iron as a main component comprising iron, containing aluminum of 0.05 to 10% by weight (calculated as Al) which are present within the particle, and optionally containing at least one rare-earth metal such as Nd, La and Y, are more preferable.

With respect to the existing position of aluminum of usually 0.05 to 10% by weight (calculated as Al) based on the weight of the magnetic acicular metal particles containing iron as a main component, it may be contained only in the core and inside portions, or in the surface portion of the magnetic acicular metal particles containing iron as a main component. Alternatively, aluminum may be approximately uniformly contained in the magnetic acicular metal particles containing iron as a main component from the core portion to the surface. An aluminum-coating layer may be formed on the surfaces of the particles. In addition, any of these positions may be combined. In the consideration of the effect of improving the surface property of the magnetic recording layer or the durability of the magnetic recording medium, magnetic acicular metal particles containing iron as a main component uniformly containing aluminum from the core portion to the surface and coated with an aluminum-coating layer are more preferable.

When the content of aluminum is less than 0.05% by weight (calculated as Al), the adsorption of the resin to the magnetic acicular metal particles containing iron as a main component in the vehicle may not be said sufficient, so that it may be difficult to produce a magnetic recording layer or a magnetic recording medium having a high durability. When the content of aluminum exceeds 10% by weight, the effect of improving the durability of the magnetic recording layer or the magnetic recording medium is observed, but the effect is saturated and it is meaningless to add aluminum more than necessary. Furthermore, the magnetic characteristics of the magnetic acicular metal particles containing iron as a main component may be sometimes deteriorated due to an increase in the aluminum as a non-magnetic component. The existing amount of aluminum of the magnetic acicular metal particles containing iron as a main component is preferably 0.1 to 7% by weight.

It is still more preferable to produce a magnetic recording medium of the present invention using the magnetic acicular metal particles containing iron as a main component containing Al and a rare-earth metal such as Nd, La and Y therein, because the magnetic recording layer or magnetic recording medium produced is apt to have a more excellent durability. Especially, magnetic acicular metal particles containing iron as a main component containing Al and Nd therein are the even more preferable.

The magnetic acicular metal particles containing iron as a main component comprising iron and aluminum within the particles are produced, as is well known, by adding an aluminum compound at an appropriate stage during the above-described process for producing acicular goethite particles to produce acicular goethite particles containing aluminum at desired positions of the particles, and heat-treating, at a temperature of 300 to 500° C., the acicular goethite particles or the acicular hematite particles containing aluminum at desired positions within the particles which are obtained by dehydrating the acicular goethite particles.

The magnetic acicular metal particles containing iron as a main component coated with aluminum are produced by heat-treating, at a temperature of 300 to 500° C., the acicular goethite particles coated with an oxide or hydroxide of aluminum, or the acicular hematite particles coated with the oxide or hydroxide of aluminum which are obtained by dehydrating the acicular goethite particles.

The magnetic particles containing iron as a main component used in the present invention have an average major axial diameter of usually 0.01 to 0.50 $\mu$m, preferably 0.03 to 0.30 $\mu$m, an average minor axial diameter of usually 0.0007 to 0.17 $\mu$m, preferably 0.003 to 0.10 $\mu$m, and an aspect ratio of usually not less than 3:1, preferably not less than 5:1. The upper limit of the aspect ratio is usually 15:1, preferably 10:1 with the consideration of the dispersibility in the vehicle. The shape of the a magnetic particles containing iron as a main component may have not only acicular but also spindle-shaped, rice ball-shaped, cubic-shaped, plate-like shaped or the like.

The geometrical standard deviation of the major axis diameter of the magnetic particles used in the present invention is preferably not more than 2.50. If it exceeds 2.50, the coarse particles existent sometimes exert a deleterious influence on the surface smoothness of the magnetic recording layer. From the point of view of industrial productivity, the lower limit of the geometrical standard deviation of the major axis diameter is preferably 1.01.

As to the magnetic properties of the magnetic acicular metal particles containing iron as a main component used in the present invention, the coercive force is usually 800 to 3500 Oe, preferably 900 to 3500 Oe, more preferably 1000 to 3500 Oe, and the saturation magnetization is usually preferably 90 to 170 emu/g, preferably 100 to 170 emu/g, more preferably 110 to 170 emu/g with the consideration of the properties such as high-density recording.

With the consideration of the durability of the magnetic recording medium, it is preferred to use magnetic acicular metal particles containing iron as a main component, which contain aluminum, as magnetic particles. The resin adsorptivity of such magnetic acicular metal particles containing iron as a main component used in the present invention is usually not less than 65%, preferably not less than 68%, more preferably not less than 70%.

As the binder resin for the magnetic recording layer, the same binder resin as that used for the production of the non-magnetic undercoat layer is usable.

The mixing ratio of the magnetic acicular metal particles containing iron as a main component with the binder resin in the magnetic recording layer is usually 200 to 2000 parts by weight, preferably 300 to 1500 parts by weight based on 100 parts by weight of the binder resin.

As the solvents, the same solvent as that used for the production of the non-magnetic undercoat layer is usable.

The total amount of the solvent used is 65 to 1,000 parts by weight based on 100 parts by weight of the magnetic particles. When the amount of the solvent used is less than 65 parts by weight, the viscosity of the magnetic coating composition prepared therefrom becomes too high, thereby making it difficult to apply the magnetic coating composition. On the other hand, when the amount of the solvent used is more than 1,000 parts by weight, the amount of the solvent volatilized during the formation of the coating film becomes too large, thereby rendering the coating process industrially disadvantageous.

It is possible to add a lubricant, a polishing agent, an antistatic agent, etc., which are generally used for the production of a magnetic recording medium to the magnetic recording layer.

The thickness of the magnetic recording layer obtained by applying the magnetic coating composition on the surface of the non-magnetic undercoat layer and dried, is usually in the range of 0.01 to 5.0 $\mu$m. If the thickness is less than 0.01 $\mu$m, uniform coating may be difficult, so that unfavorable phenomenon such as unevenness on the coating surface is observed. On the other hand, when the thickness exceeds 5.0 $\mu$m, it may be difficult to obtain desired signal recording property due to an influence of diamagnetism. The preferable thickness is in the range of 0.05 to 1.0 $\mu$m.

The magnetic recording medium according to the present invention has a coercive force of usually 800 to 3500 Oe; a squareness (residual magnetic flux density Br/saturation magnetic flux density Bm) of usually 0.86 to 0.95; a gloss (of the coating film) of usually 192 to 300%; a surface roughness Ra (of the coating film) of usually not more than 9.8 nm; a Young's modulus (relative value to a commercially available video tape: AV T-120 produced by Victor Company of Japan, Limited) of usually 120 to 160; and a linear adsorption coefficient (of the coating film) of usually 1.10 to 2.00 $\mu m^{-1}$.

In case of using the acicular hematite particles as defined in the first aspect as non-magnetic particles, the magnetic recording medium according to the present invention has a coercive force of usually 800 to 3500 Oe, preferably 900 to 3500 Oe; a squareness (residual magnetic flux density Br/saturation magnetic flux density Bm) of usually 0.86 to 0.95, preferably 0.87 to 0.95; a gloss (of the coating film) of usually 192 to 300%, preferably 197 to 300%; a surface roughness Ra (of the coating film) of usually not more than 9.8 nm, preferably 0.5 to 9.3 nm,; more preferably 0.5 to 8.8 nm, a Young's modulus (relative value to a commercially available video tape: AV T-120 produced by Victor Company of Japan, Limited) of usually 120 to 160, preferably 122 to 160; and a linear adsorption coefficient (of the coating film) of usually 1.10 to 2.00 $\mu m^{-1}$, preferably 1.20 to 2.00 $\mu m^{-1}$.

In case of using the acicular hematite particles as defined in the second aspect as non-magnetic particles, the magnetic recording medium according to the present invention has a coercive force of usually 800 to 3500 Oe, preferably 900 to 3500 Oe; a squareness (residual magnetic flux density Br/saturation magnetic flux density Bm) of usually 0.86 to 0.95, preferably 0.87 to 0.95; a gloss (of the coating film) of usually 194 to 300%, preferably 199 to 300%; a surface roughness Ra (of the coating film) of usually not more than 9.6 nm, preferably 0.5 to 9.1 nm, more preferably 0.5 to 8.6 nm; a Young's modulus (relative value to a commercially available video tape: AV T-120 produced by Victor Company of Japan, Limited) of usually 122 to 160, preferably 124 to 160; and a linear adsorption coefficient (of the coating film) of usually 1.10 to 2.00 $\mu m^-$, preferably 1.20 to 2.00 $\mu m^{-1}$.

In case of using the acicular hematite particles as defined in the first aspect as non-magnetic particles and magnetic acicular metal particles containing iron as a main component and aluminum which are present in and/or on the surface of the particle, the magnetic recording medium according to the present invention has a coercive force of usually 800 to 3500 Oe, preferably 900 to 3500 Oe; a squareness (residual magnetic flux density Br/saturation magnetic flux density Bm) of usually 0.86 to 0.95, preferably 0.87 to 0.95, a gloss (of the coating film) of usually 194 to 300%, preferably 199 to 300%; a surface roughness Ra (of the coating film) of usually not more than 9.6 nm, preferably 0.5 to 9.1 nm, more preferably 0.5 to 8.6 nm; a Young's modulus (relative value to a commercially available video tape: AV T-120 produced by Victor Company of Japan, Limited) of usually 122 to 160, preferably 124 to 160; and a linear adsorption coefficient (of the coating film) of usually 1.10 to 2.00 $\mu m^{-1}$, preferably 1.20 to 2.00 $\mu m^-$. As to the durability, the running durability thereof is usually not less than 22 minutes, preferably not less than 24 minutes. Also, the scratch resistance thereof is usually A or B, preferably A.

In case of using the acicular hematite particles as defined in the second aspect as non-magnetic particles and magnetic acicular metal particles containing iron as a main component and aluminum which are present in and/or on the surface of the particle, the magnetic recording medium according to the present invention has a coercive force of usually 800 to 3500 Oe, preferably 900 to 3500 Oe; a squareness (residual magnetic flux density Br/saturation magnetic flux density Bm) of usually 0.86 to 0.95, preferably 0.87 to 0.95, a gloss (of the coating film) of usually 196 to 300%, preferably 201 to 300%; a surface roughness Ra (of the coating film) of usually not more than 9.4 nm, preferably 0.5 to 8.9 nm, more preferably 0.5 to 8.4 nm; a Young's modulus (relative value to a commercially available video tape: AV T-120 produced by Victor Company of Japan, Limited) of usually 124 to 160, preferably 126 to 160; and a linear adsorption coefficient (of the coating film) of usually 1.10 to 2.00 $\mu m^{-1}$, preferably 1.20 to 2.00 $\mu m^{-1}$. As to the durability, the running durability thereof is usually not less than 23 minutes, preferably not less than 25 minutes. Also, the scratch resistance thereof is usually A or B, preferably A.

In case of using the acicular hematite particles as defined in the third aspect as non-magnetic particles, the magnetic recording medium according to the present invention has a coercive force of usually 800 to 3500 Oe, preferably 900 to 3500 Oe; a squareness (residual magnetic flux density Br/saturation magnetic flux density Bm) of usually 0.86 to 0.95, preferably 0.87 to 0.95, a gloss (of the coating film) of usually 194 to 300%, preferably 199 to 300%; a surface roughness Ra (of the coating film) of usually not more than 9.6 nm, preferably 0.5 to 9.1 nm, more preferably 0.5 to 8.6 nm; a Young's modulus (relative value to a commercially available video tape: AV T-120 produced by Victor Company of Japan, Limited) of usually 122 to 160, preferably 124 to 160; and a linear adsorption coefficient (of the coating film) of usually 1.10 to 2.00 $\mu m^{-1}$, preferably 1.20 to 2.00 $\mu m^{-1}$. As to the durability, the running durability thereof is usually not less than 22 minutes, preferably not less than 23 minutes. Also, the scratch resistance thereof is usually A or B, preferably A.

In case of using the acicular hematite particles as defined in the fourth aspect as non-magnetic particles, the magnetic recording medium according to the present invention has a coercive force of usually 800 to 3500 Oe, preferably 900 to 3500 Oe; a squareness (residual magnetic flux density Br/saturation magnetic flux density Bm) of usually 0.86 to 0.95, preferably 0.87 to 0.95, a gloss (of the coating film) of usually 196 to 300%, preferably 201 to 300%; a surface roughness Ra (of the coating film) of usually not more than 9.4 nm, preferably 0.5 to 8.9 nm, more preferably 0.5 to 8.4 nm; a Young's modulus (relative value to a commercially available video tape: AV T-120 produced by Victor Company of Japan, Limited) of usually 124 to 160, preferably 126 to 160; and a linear adsorption coefficient (of the coating film) of usually 1.10 to 2.00 $\mu m^{-1}$, preferably 1.20 to 2.00 $\mu m^{-1}$. As to the durability, the running durability thereof is usually not less than 23 minutes, preferably not less than 24 minutes. Also, the scratch resistance thereof is usually A or B, preferably A.

In case of using the acicular hematite particles as defined in the third aspect as non-magnetic particles and magnetic acicular metal particles containing iron as a main component and aluminum which are present in and/or on the surface of the particle, the magnetic recording medium according to the present invention has a coercive force of usually 800 to 3500 Oe, preferably 900 to 3500 Oe; a squareness (residual magnetic flux density Br/saturation magnetic flux density Bm) of usually 0.86 to 0.95, preferably 0.87 to 0.95, a gloss (of the coating film) of usually 196 to 300%, preferably 201 to 300%; a surface roughness Ra (of the coating film) of usually not more than 9.4 nm, preferably 0.5 to 8.9 nm, more preferably 0.5 to 8.4 nm; a Young's modulus (relative value to a commercially available video tape: AV T-120 produced by Victor Company of Japan, Limited) of usually 124 to 160, preferably 126 to 160; and a linear adsorption coefficient (of the coating film) of usually 1.10 to 2.00 $\mu m^{-1}$, preferably 1.20 to 2.00 $\mu m^{-1}$. As to the durability, the running durability thereof is usually not less than 23 minutes, preferably not less than 24 minutes. Also, the scratch resistance thereof is usually A or B, preferably A.

In case of using the acicular hematite particles as defined in the fourth aspect as non-magnetic particles and magnetic acicular metal particles containing iron as a main component and aluminum which are present in and/or on the surface of the particle, the magnetic recording medium according to the present invention has a coercive force of usually 800 to 3500 Oe, preferably 900 to 3500 Oe; a squareness (residual magnetic flux density Br/saturation magnetic flux density Bm) of usually 0.86 to 0.95, preferably 0.87 to 0.95, a gloss (of the coating film) of usually 198 to 300%, preferably 203 to 300%; a surface roughness Ra (of the coating film) of usually not more than 9.2 nm, preferably 0.5 to 8.7 nm, more preferably 0.5 to 8.2 nm; a Young's modulus (relative value to a commercially available video tape: AV T-120 produced by Victor Company of Japan, Limited) of usually 126 to 160, preferably 127 to 160; and a linear adsorption coefficient (of the coating film) of usually 1.10 to 2.00 $\mu m^{-1}$, preferably 1.20 to 2.00 $\mu m^{-1}$. As to the durability, the running durability thereof is usually not less than 24 minutes, preferably not less than 26 minutes. Also, the scratch resistance thereof is usually A or B, preferably A.

In case of using the acicular hematite particles as defined in the ninth aspect as non-magnetic particles, the magnetic recording medium according to the present invention has a coercive force of usually 800 to 3500 Oe, preferably 900 to 3500 Oe; a squareness (residual magnetic flux density Br/saturation magnetic flux density Bm) of usually 0.86 to 0.95, preferably 0.87 to 0.95, a gloss (of the coating film) of usually 196 to 300%, preferably 201 to 300%; a surface roughness Ra (of the coating film) of usually not more than 9.4 nm, preferably 0.5 to 8.9 nm, more preferably 0.5 to 8.4 nm; a Young's modulus (relative value to a commercially available video tape: AV T-120 produced by Victor Company of Japan, Limited) of usually 124 to 160, preferably 126 to 160; and a linear adsorption coefficient (of the coating film) of usually 1.10 to 2.00 $\mu m^{-1}$, preferably 1.20 to 2.00 $\mu m^{-1}$.

In case of using the acicular hematite particles as defined in the tenth aspect as non-magnetic, the magnetic recording medium according to the present invention has a coercive force of usually 800 to 3500 Oe, preferably 900 to 3500 Oe; a squareness (residual magnetic flux density Br/saturation magnetic flux density Bm) of usually 0.86 to 0.95, preferably 0.87 to 0.95, a gloss (of the coating film) of usually 198 to 300%, preferably 203 to 300%; a surface roughness Ra (of the coating film) of usually not more than 9.2 nm, preferably 0.5 to 8.7 nm, more preferably 0.5 to 8.2 nm; a Young's modulus (relative value to a commercially available video tape: AV T-120 produced by Victor Company of Japan, Limited) of usually 126 to 160, preferably 128 to 160; and a linear adsorption coefficient (of the coating film) of usually 1.10 to 2.00 $\mu m^{-1}$, preferably 1.20 to 2.00 $\mu m^{-1}$.

In case of using the acicular hematite particles as defined in the ninth aspect as non-magnetic particles and magnetic acicular metal particles containing iron as a main component and aluminum which are present in and/or on the surface of the particle, the magnetic recording medium according to the present invention has a coercive force of usually 800 to 3500 Oe, preferably 900 to 3500 Oe; a squareness (residual magnetic flux density Br/saturation magnetic flux density Bm) of usually 0.86 to 0.95, preferably 0.87 to 0.95, a gloss (of the coating film) of usually 198 to 300%, preferably 203 to 300%; a surface roughness Ra (of the coating film) of usually not more than 9.2 nm, preferably 0.5 to 8.7 nm, more preferably 0.5 to 8.2 nm; a Young's modulus (relative value to a commercially available video tape: AV T-120 produced by Victor Company of Japan, Limited) of usually 126 to 160, preferably 128 to 160; and a linear adsorption coefficient (of the coating film) of usually 1.10 to 2.00 $\mu m^{-1}$, preferably 1.20 to 2.00 $\mu m^{-1}$. As to the durability, the running durability thereof is usually not less than 24 minutes, preferably not less than 26 minutes. Also, the scratch resistance thereof is usually A or B, preferably A.

In case of using the acicular hematite particles as defined in the tenth aspect as non-magnetic particles and magnetic acicular metal particles containing iron as a main component and aluminum which are present in and/or on the surface of the particle, the magnetic recording medium according to the present invention has a coercive force of usually 800 to 3500 Oe, preferably 900 to 3500 Oe; a squareness (residual magnetic flux density Br/saturation magnetic flux density Bm) of usually 0.86 to 0.95, preferably 0.87 to 0.95, a gloss (of the coating film) of usually 200 to 300%, preferably 205 to 300%; a surface roughness Ra (of the coating film) of usually not more than 9.0 nm, preferably 0.5 to 8.5 nm, more preferably 0.5 to 8.0 nm; a Young's modulus (relative value to a commercially available video tape: AV T-120 produced by Victor Company of Japan, Limited) of usually 128 to 160, preferably 130 to 160; and a linear adsorption coefficient (of the coating film) of usually 1.10 to 2.00 $\mu m^{-1}$, preferably 1.20 to 2.00 $\mu m^{-1}$. As to the durability, the running durability thereof is usually not less than 25 minutes, preferably not less than 27 minutes. Also, the scratch resistance thereof is usually A or B, preferably A.

In case of using the acicular hematite particles as defined in the eleventh aspect as non-magnetic particles, the magnetic recording medium according to the present invention has a coercive force of usually 800 to 3500 Oe, preferably 900 to 3500 Oe; a squareness (residual magnetic flux density Br/saturation magnetic flux density Bm) of usually 0.86 to 0.95, preferably 0.87 to 0.95, a gloss (of the coating film) of usually 198 to 300%, preferably 203 to 300%; a surface roughness Ra (of the coating film) of usually not more than 9.2 nm, preferably 0.5 to 8.7 nm, more preferably 0.5 to 8.2 nm; a Young's modulus (relative value to a commercially available video tape: AV T-120 produced by Victor Company of Japan, Limited) of usually 126 to 160, preferably 128 to 160; and a linear adsorption coefficient (of the coating film) of usually 1.10 to 2.00 $\mu m^{-1}$, preferably 1.20 to 2.00 $\mu m^{-1}$. As to the durability, the running durability thereof is usually not less than 24 minutes, preferably not less than 26 minutes. Also, the scratch resistance thereof is usually A or B, preferably A.

In case of using the acicular hematite particles as defined in the twelfth aspect as non-magnetic, the magnetic recording medium according to the present invention has a coercive force of usually 800 to 3500 Oe, preferably 900 to 3500 Oe; a squareness (residual magnetic flux density Br/saturation magnetic flux density Bm) of usually 0.86 to 0.95, preferably 0.87 to 0.95, a gloss (of the coating film) of usually 200 to 300%, preferably 205 to 300%; a surface roughness Ra (of the coating film) of usually not more than 9.0 nm, preferably 0.5 to 8.5 nm, more preferably 0.5 to 8.0 nm; a Young's modulus (relative value to a commercially available video tape: AV T-120 produced by Victor Company of Japan, Limited) of usually 128 to 160, preferably 130 to 160; and a linear adsorption coefficient (of the coating film) of usually 1.10 to 2.00 $\mu m^{-1}$, preferably 1.20 to 2.00 $\mu m^{-1}$. As to the durability, the running durability thereof is usually not less than 25 minutes, preferably not less than 27 minutes. Also, the scratch resistance thereof is usually A or B, preferably A.

In case of using the acicular hematite particles as defined in the eleventh aspect as non-magnetic particles and magnetic acicular metal particles containing iron as a main component and aluminum which are present in and/or on the surface of the particle, the magnetic recording medium according to the present invention has a coercive force of usually 800 to 3500 Oe, preferably 900 to 3500 Oe; a squareness (residual magnetic flux density Br/saturation magnetic flux density Bm) of usually 0.86 to 0.95, preferably 0.87 to 0.95, a gloss (of the coating film) of usually 200 to 300%, preferably 205 to 300%; a surface roughness Ra (of the coating film) of usually not more than 9.0 nm, preferably 0.5 to 8.5 nm, more preferably 0.5 to 8.0 nm; a Young's modulus (relative value to a commercially available video tape: AV T-120 produced by Victor Company of Japan, Limited) of usually 128 to 160, preferably 130 to 160; and a linear adsorption coefficient (of the coating film) of usually 1.10 to 2.00 $\mu m^{-1}$, preferably 1.20 to 2.00 $\mu m^{-1}$. As to the durability, the running durability thereof is usually not less than 25 minutes, preferably not less than 27 minutes. Also, the scratch resistance thereof is usually A or B, preferably A.

In case of using the acicular hematite particles as defined in the twelfth aspect as non-magnetic particles and magnetic acicular metal particles containing iron as a main component and aluminum which are present in and/or on the surface of the particle, the magnetic recording medium according to the present invention has a coercive force of usually 800 to 3500 Oe, preferably 900 to 3500 Oe; a squareness (residual magnetic flux density Br/saturation magnetic flux density Bm) of usually 0.86 to 0.95, preferably 0.87 to 0.95, a gloss (of the coating film) of usually 202 to 300%, preferably 207 to 300%; a surface roughness Ra (of the coating film) of usually not more than 8.8 nm, preferably 0.5 to 8.3 nm, more preferably 0.5 to 7.8 nm; a Young's modulus (relative value to a commercially available video tape: AV T-120 produced by Victor Company of Japan, Limited) of usually 130 to 160, preferably 132 to 160; and a linear adsorption coefficient (of the coating film) of usually 1.10 to 2.00 $\mu m^{-1}$, preferably 1.20 to 2.00 $\mu m^{-1}$. As to the durability, the running durability thereof is usually not less than 26 minutes, preferably not less than 28 minutes. Also, the scratch resistance thereof is usually A or B, preferably A.

The magnetic recording medium according to the present invention shows an anti-corrosion property of not more than 10.0%, preferably not more than 9.5% when expressed by he percentage (%) of change in coercive force thereof, and also shows an anti-corrosion property of not more than 10.0%, preferably not more than 9.5% when expressed by the percentage (%) of change in saturation magnetic flux density thereof.

The important feature of the present invention lies in such a fact that when the acicular hematite particles are acid-dissolving treatment, there can be obtained acicular hematite particles which have such a uniform particle size as being expressed by the geometrical standard deviation of major axis diameter of not more than 1.50 and the geometrical standard deviation of minor axis diameter of preferably not more than 1.35, and are, in particular, excellent in particle size distribution of minor axis diameter thereof.

The reason why the acicular hematite particles according to the present invention can exhibit a uniform particle size, is considered, such that by acid-treating acicular hematite particles in the strongly acidic solution, superfine hematite particles can be removed therefrom, whereby it is possible to obtain acicular goethite particles having a uniform particle size with respect to both major axis diameter and minor axis diameter thereof, because the amount of the superfine hematite particles be reduced.

Further, another important feature of the present invention lies in such a fact that when the acicular goethite particles are heat-treated at a temperature of 100 to 200° C. before subjecting to heat-dehydration treatment, there can be obtained acicular hematite particles which have such a uniform particle size as being expressed by the geometrical standard deviation of major axis diameter of not more than 1.50 and the geometrical standard deviation of minor axis diameter of preferably not more than 1.30, and are, in particular, excellent in particle size distribution of minor axis diameter thereof.

The reason why the acicular hematite particles according to the present invention can exhibit a uniform particle size, is considered, such that by heat-treating acicular goethite particles at a temperature of 100 to 200° C., superfine goethite particles can be absorbed into the acicular goethite particles, whereby it is possible to obtain acicular goethite particles having a uniform particle size with respect to both major axis diameter and minor axis diameter thereof, and further since the amount of the superfine goethite particles be reduced, the sintering between the particles due to the presence of the superfine goethite particles is unlikely to occur upon the subsequent heat-dehydration treatment, whereby it is possible to obtain acicular hematite particles which still maintain the uniform particle size of the acicular goethite particles.

In the magnetic recording medium according to the present invention, when the acicular hematite particles of the present invention are used as non-magnetic particles for non-magnetic undercoat layer, there can be obtained such a magnetic recording medium having a small light transmittance, a more excellent smooth surface and a high strength.

The reason why the magnetic recording medium according to the present invention can exhibit a more excellent smooth surface, is considered by the present inventors, such that by the synergistic effect of such a uniform particle size as being expressed by the geometrical standard deviation of major axis diameter of not more than 1.50 and the geometrical standard deviation of minor axis diameter of not more than 1.35 which results in less amount of coarse or fine particles, and the BET specific surface area of 35.9 to 180 $m^2/g$ which results in less amount of dehydration pores in the particles or on the surfaces of the particles, the acicular hematite particles according to the present invention can exhibit a more excellent dispersibility in vehicle, so that the obtained non-magnetic undercoat layer can have a more excellent smooth surface.

The another reason why the surface smoothness of the magnetic recording medium is excellent is considered as follows. Since it is possible to sufficiently remove the soluble sodium and the soluble sulfate, which agglomerate acicular hematite particles by firmly crosslinking, the agglomerates are separated into substantially discrete particles by washing the particles with water, so that acicular hematite particles having an excellent dispersion in the vehicle are obtained.

It has been found that the deterioration in magnetic properties of the magnetic acicular metal particles containing iron as a main component and dispersed in the magnetic layer, is considerably influenced by the pH value of non-magnetic particles in the non-magnetic undercoat layer and by the content of soluble sodium salts and soluble sulfates contained in the non-magnetic particles.

That is, as described above, the acicular goethite particles used as a precursor have been produced by various methods. However, in any method, in the case where ferrous sulfate is used as a main raw material for the production of the acicular goethite particles, a large amount of sulfate $[SO_4^{2-}]$ is necessarily present in a reacted slurry.

In particular, when the goethite particles are produced in an acid solution, water-soluble sulfates such as $Na_2SO_4$ are produced simultaneously, and the reaction mother liquor contains alkali metals such as $K^+$, $NH_4^+$, $Na^+$ or the like, so that precipitates containing alkali metals or sulfates tend to be formed. The thus-formed precipitates are represented by the formula of $RFe_3(SO_4)(OH)_6$, where R is $K^+$, $NH_4^+$ or $Na^+$. Such precipitates are composed of insoluble sulfur-containing iron salts and, therefore, cannot be removed merely by an ordinary water-washing method. The insoluble salts are converted into soluble sodium salts or soluble sulfates by the subsequent heat-treatment. However, the soluble sodium salts or the soluble sulfates cause the acicular hematite particles to be cross-linked with each other by the action of a sintering preventive which is added as an essential component for preventing the deformation of the acicular hematite particles and the sintering therebetween in the high-temperature treatment for high densification, and are strongly bonded to the inside or the surface of the acicular hematite particles. Thus, the agglomeration of the acicular hematite particles are further accelerated by the soluble sodium salts or the soluble sulfates. As a result, it becomes extremely difficult to remove especially such soluble sodium salts or soluble sulfates enclosed within the particles or the agglomerated particles, by an ordinary water-washing method.

In the case where the acicular goethite particles are produced in an aqueous alkali solution using ferrous sulfate and sodium hydroxide, a sulfate ($Na_2SO_4$) is simultaneously produced, and NaOH is contained in the reacted slurry. Since $Na_2SO_4$ and NaOH both are water-soluble, it is considered that these compounds can be essentially removed by sufficiently washing the acicular goethite particles with water. However, in general, the acicular goethite particles are deteriorated in water-washing efficiency due to a low crystallizability thereof, so that even when the acicular goethite particles are washed with water by an ordinary method, water-soluble components such as soluble sulfates $[SO_4^{2-}]$ or soluble sodium salts $[Na^+]$ still remain in the acicular goethite particles. Further, as described above, these water-soluble components cause the acicular hematite particles to be cross-linked with each other by the action of the sintering preventive, and are strongly bonded to the inside or the surface of the acicular hematite particles, thereby further accelerating the agglomeration of the acicular hematite particles. As a result, it also becomes extremely difficult to remove, especially, such soluble sodium salts or soluble sulfates enclosed within the particles or the agglomerated particles by an ordinary water-washing method.

As described above, it is considered that when the high-density hematite particles containing the soluble sodium salts or the soluble sulfates which are strongly bonded to the inside or the surface of the particles and to the inside of the agglomerated particles through the sintering preventive, are wet-pulverized to deagglomerate coarse particles, then the pH value of the slurry containing the high-density hematite particles is adjusted to not less than 13 and the slurry is heat-treated at not less than 80° C., the aqueous alkali solution can be sufficiently immersed into the high-density hematite particles, so that the bonding force of the sintering preventive strongly bonded to the inside or the surface of the particles and to the inside of the agglomerated particles is gradually weakened, whereby the sintering preventive is released from the inside or the surface of the particles and the inside of the agglomerated particles and simultaneously the water-soluble sodium salts or the water-soluble sulfates tend to be readily removed by washing with water.

In addition, the reason why the deterioration in magnetic properties due to the corrosion of the magnetic acicular metal particles containing iron as a main component and dispersed in the magnetic recording layer, can be suppressed, is considered, such that the amount of water-soluble components such as the soluble sodium salts or the soluble sulfates which accelerate the corrosion of metals contained in the acicular hematite particles for non-magnetic undercoat layer, is reduced and the particles have a pH value as high as not less than 8, so that the corrosion of the acicular hematite particles containing iron as a main component can be prevented from proceeding.

In the magnetic recording medium according to the present invention, when the acicular hematite particles containing aluminum in specific amount within the particle of the present invention are used as non-magnetic particles for non-magnetic undercoat layer, there can be obtained such a magnetic recording medium having a small light transmittance, a more excellent smooth surface, a high strength and a high durability.

The reason why the strength and the durability of the magnetic recording medium is more enhanced is considered that by using the acicular hematite particles containing aluminum uniformly within the particle, the resin adsorptivity of the acicular hematite particles to the binder resin in the vehicles are enhanced due to the use of the above-described particles, as will be shown in later-described examples, the degree of adhesion of the acicular hematite particles in the non-magnetic undercoat layer or the non-magnetic undercoat layer itself to the base film is enhanced; and the increase in adsorptivity of the binder resin for the magnetic particles in the coating composition by using as magnetic particles, the magnetic acicular metal particles containing iron as a main component and further containing aluminum, which results in increase in adhesion between the magnetic particles in the magnetic recording layer and the non-magnetic undercoat layer or between the magnetic recording layer itself and the non-magnetic undercoat layer.

As described in Examples hereinafter, in the case where the acicular hematite particles according to the present invention is used as non-magnetic particles for the non-magnetic undercoat layer, since these particles contain less amount of fine particle components and, therefore, can show an excellent dispersibility in vehicle, there can be obtained such a non-magnetic undercoat layer having an excellent strength and an excellent smooth surface. Further, in the case where a magnetic recording medium is produced by using the non-magnetic undercoat layer, there can be obtained such a magnetic recording medium which can exhibit a low light transmittance, an excellent smooth surface and a high strength, and whose magnetic properties can be prevented from being deteriorated due to the corrosion of the magnetic acicular metal particles containing iron as a main component and dispersed in the magnetic recording layer, since the pH value of the acicular hematite particles used as non-magnetic particles is low and the amount of the soluble sodium salts or the soluble sulfates contained is reduced. Therefore, the acicular hematite particles according to the present invention are suitable as non-magnetic particles for a non-magnetic undercoat layer of a high-density magnetic recording medium.

As described above, the magnetic recording medium according to the present invention can exhibit a low light transmittance, a smooth surface and a high strength, and can be prevented from being deteriorated in magnetic properties due to the corrosion of the magnetic acicular particles containing iron as a main component and dispersed in the magnetic recording layer. Therefore, the magnetic recording medium according to the present invention is suitable as a high-density magnetic recording medium.

Further, in the magnetic recording medium according to the present invention, in the case where specific acicular hematite particles are used as non-magnetic particles for the non-magnetic undercoat layer, there can be obtained such a non-magnetic undercoat layer having a high strength and an excellent smooth surface, because the acicular hematite particles used as non-magnetic particles contain less amount of fine particle components, and have a pH value as high as not less than 8 and an excellent dispersibility in vehicle due to less content of the soluble salts. Consequently, when the magnetic recording medium is produced by using the above-mentioned non-magnetic undercoat layer and using as magnetic particles for the magnetic recording layer, the magnetic acicular metal particles containing iron as a main component and further containing a predetermined amount of Al, there can be obtained such a magnetic recording medium which can exhibit a low light transmittance, an excellent smooth surface, a high strength and an excellent durability, and can be prevented from being deteriorated in magnetic properties due to the corrosion of the magnetic acicular metal particles containing iron as a main component and dispersed in the magnetic recording layer. Therefore, the magnetic recording medium according to the present invention is suitable as a high-density magnetic recording medium.

EXAMPLES

The present invention is described in more detail by Examples and Comparative Examples, but the Examples are only illustrative and, therefore, not intended to limit the scope of the present invention.

Various properties were evaluated by the following methods.

(1) The residue on sieve after the wet-pulverization was obtained by measuring the concentration of the slurry after pulverization by a wet-process in advance, and determining the quantity of the solid content on the sieve remaining after the slurry equivalent to 100 g of the particles content was passed through the sieve of 325 meshes (mesh size: 44 $\mu$m).

(2) The average major axis diameter and the average minor axis diameter of the acicular particles are expressed by the average values of 350 particles measured in the photograph obtained by magnifying an electron micrograph (×30000) by 4 times in the vertical and horizontal directions, respectively.

(3) The aspect ratio is the ratio of the average major axis diameter and the average minor axis diameter.

(4) The geometrical standard deviation for particle size distribution of the major axis diameter and minor axis diameter was obtained by the following method.

The major axis diameters and minor axis diameters of the particles were measured from the magnified electron microphotograph in the above-mentioned (2). The actual major axis diameters and minor axis diameters of the particles and the number of particles were obtained from the calculation on the basis of the measured values. On logarithmico-normal probability paper, the major axis diameters or minor axis diameters were plotted at regular intervals on the abscissa-axis and the accumulative number of particles belonging to each interval of the major axis diameters or minor axis diameters was plotted by percentage on the ordinate-axis by a statistical technique. The major axis diameters or minor axis diameters corresponding to the number of particles of 50% and 84.13%, respectively, were read from the graph, and each geometrical standard deviation was measured from the following formulae:

Geometrical standard deviation of the major axis diameter or minor axis diameter={major axis diameter ($\mu$m) or minor axis diameter ($\mu$m) corresponding to 84.13% under integration sieve}/{major axis diameter or minor axis diameter (geometrical average diameter) corresponding to 50% under integration sieve}.

The more the geometrical standard deviation nears 1.0, the more excellent the particle size distribution of the major axis diameters and minor axis diameters of the particles.

(5) The specific surface area is expressed by the value measured by a BET method.

(6) The degree of densification of the particles is represented by $S_{BET}/S_{TEM}$ value as described above.

$S_{BET}$ is a specific surface area measured by the above-described BET method.

$S_{TEM}$ is a value calculated from the average major axis diameter d cm and the average minor axis diameter w cm measured from the electron microphotograph described in (2) on the assumption that a particle is a rectangular parallellopiped in accordance with the following formula:

$$S_{TEM}\ (m^2/g)=\{(4\cdot d\cdot w+2w^2)/(d\cdot w^2\cdot \rho_p)\}\times 10^{-4}$$

wherein $\rho_p$ is the true specific gravity of the hematite particles, and 5.2 g/cm$^3$ was used.

(7) The content of each of Al, Si, P, and Nd in and/or on the particle was measured according to JIS K0119 using "fluorescent X-ray spectroscopy device 3063 M" (manufactured by Rigaku Denki Kogyo Co., Ltd.).

(8) The pH value of the particles was measured as follows. 5 g of a sample was weighed and placed in a 300-ml conical flask. 100 ml of boiling pure water was added into the flask and the contents thereof were heated and maintained in a boiling condition for about 5 minutes. Thereafter, the flask was plugged and allowed to stand for cooling up to an ordinary temperature. After boiling pure water was added in such an amount corresponding to the weight loss and the flask was plugged again, the contents of the flask were shaken and mixed for one minute and then allowed to stand for 5 minutes, thereby obtaining a supernatant. The pH value of the thus obtained supernatant was measured according to JIS Z 8802-7, and the pH value of the particles was expressed by the measured value.

(9) The content of soluble sodium salts and the content of soluble sulfates were determined by filtering the supernatant prepared for the above measurement of the pH value of the particles using a filter paper No. 5, and measuring amounts of Na$^+$ and SO$_4^{2-}$ in the filtrate by an inductively coupled plasma atomic emission spectrometry device (manufactured by Seiko Denshi Kogyo Co., Ltd.).

(10) The resin adsorptivity of the particles represents the degree at which a resin is adsorbed to the particles. The closer to 100% the value obtained in the following manner, the firmer the resin adsorptivity to the particles surfaces in the vehicle and the more favorable.

The resin adsorptivity Wa was first obtained. 20 g of particles and 56 g of a mixed solvent (27.0 g of methyl ethyl ketone, 16.2 g of toluene, and 10.8 g of cyclohexanone) with 2 g of a vinyl chloride-vinyl acetate copolymer having a sodium sulfonate group dissolved therein were charged into a 100-ml polyethylene bottle together with 120 g of 3 mm$\phi$ steel beads. The particles and the solvent were mixed and dispersed by a paint shaker for 60 minutes.

Thereafter, 50 g of the coating composition was taken out, and charged into a 50-ml settling cylinder. The solid content was separated from the solvent portion by the centrifugalization at a rate of 10000 rpm for 15 minutes. The concentration of the solid resin content contained in the solvent portion was determined by a gravimetric method and the resin content existing in the solid portion was determined by deducting the obtained resin content from the amount of the resin charged as the resin adsorptivity Wa (mg/g) to the particles.

The total quantity of separated solid content was taken into a 100 ml-tall beaker, and 50 g of a mixed solvent (25.0 g of methyl ethyl ketone, 15.0 g of toluene, and 10.0 g of cyclohexanone) was added thereto. The obtained mixture was to ultrasonic dispersion for 15 minutes, and the thus-obtained suspension was charged into a 50-ml settling cylinder. The solid content was separated from the solvent portion by centrifuging them at a rate of 10000 rpm for 15 minutes. The concentration of the solid resin content contained in the solvent portion was measured so as to determine the resin content dissolved from the resin which had been adsorbed to the particle surfaces into the solvent phase.

The process from the step of taking the solid content into the 100 ml-tall beaker to the determination of the resin content dissolved into the solvent phase was repeated twice. The total quantity We (mg/g) of resin content dissolved into the solvent phase in the three cycles was obtained, and the value calculated in accordance with the following formula is expressed as the resin adsorptivity T(%):

$$T(\%)=[(Wa-We)/Wa]\times 100.$$

(11) The viscosity of the coating composition was obtained by measuring the viscosity of the coating composition at 25° C. at a shear rate D of 1.92 sec$^{-1}$ by using "E type viscometer EMD-R" (manufactured by Tokyo Keiki, Co., Ltd.).

(12) The gloss of the surface of the coating film of each of the non-magnetic undercoat layer and the magnetic coating layer was measured at an angle of incidence of 45° by "glossmeter UGV-5D" (manufactured by Suga Shikenki, Co., Ltd.).

(13) The surface roughness Ra is expressed by the average value of the center-line average roughness of the profile curve of the surface of the coating film by using "Surfcom-575A" (manufactured by Tokyo Seimitsu Co., Ltd.).

(14) The strength of the coating film was expressed the Young's modulus obtained by "Autograph" (produced by Shimazu Seisakusho Co., Ltd.). The Young's modulus was expressed by the ratio of the Young's modulus of the coating film to that of a commercially available video tape "AV T-120" (produce by Victor Company of Japan, Limited). The higher the relative value, the more favorable.

(15) The magnetic properties of the magnetic particles and magnetic recording medium were measured under an external magnetic field of 10 kOe by "Vibration Sample Magnetometer VSM-3S-15 (manufactured by Toei Kogyo, Co., Ltd.)".

(16) The change with the passage of time in magnetic properties of the magnetic recording medium due to the corrosion of the magnetic acicular metal particles containing iron as a main component, which are dispersed in the magnetic coating film, was determined as follows.

The magnetic recording medium was allowed to stand at a temperature of 60° C. and a relative humidity of 90% for 14 days. The coercive force values and the saturation magnetization values of the magnetic recording medium before and after the keeping test were measured, and the difference between the measured values before and after the keeping test was divided by the value before the keeping test, thereby obtaining an amount of change in each magnetic property which was expressed by a percentage.

(17) The light transmittance is expressed by the linear adsorption coefficient calculated by substituting the light transmittance measured by using "UV-Vis Recording Spectrophotometer UV-2100" (manufactured by Shimazu Seisakusho, Ltd.) for the following formula. The larger the value, the more difficult it is for the magnetic recording medium to transmit light:

Linear adsorption coefficient $(\mu m^-)=\{\ln\ (1/t)\}/FT$ wherein t represents a light transmittance (−) at $\lambda=900$ nm, and FT represents thickness ($\mu m$) of the coating film used for the measurement.

(18) The durability of the magnetic medium was evaluated by the following running durability and the scratch resistance.

The running durability was evaluated by the actual operating time under the conditions that the load was 200 gw and the relative speed of the head and the tape was 16 m/s by using "Media Durability Tester MDT-3000" (manufactured by Steinberg Associates). The longer the actual operating time, the higher the running durability.

The scratch resistance was evaluated by observing through the microscope the surface of the magnetic tape after running and visually judging the degree of scratching. Evaluation was divided into the following four ranks.

A: No scratch

B: A few scratches

C: Many scratches

D: Great many scratches

(19) The thickness of each of the base film, the non-magnetic undercoat layer and the magnetic coating film constituting the magnetic recording medium was measured in the following manner by using "Digital Electronic Micrometer R351C" (manufactured by Anritsu Corp.)

The thickness (A) of a base film was first measured. Similarly, the thickness (B) (B=the sum of the thicknesses of the base film and the non-magnetic undercoat layer) of a non-magnetic substrate obtained by forming a non-magnetic undercoat layer on the base film was measured. Furthermore, the thickness (C) (C=the sum of the thicknesses of the base film, the non-magnetic undercoat layer and the magnetic recording layer) of a magnetic recording medium obtained by forming a magnetic recording layer on the non-magnetic substrata was measured. The thickness of the non-magnetic undercoat layer is expressed by (B)–(A), and the thickness of the magnetic recording layer is expressed by (C)–(B).

Example 1

<Production of spindle-shaped hematite Particles>

1200 g of spindle-shaped goethite particles obtained by the above production method (B) of goethite particles using a ferrous sulfate aqueous solution and a sodium carbonate aqueous solution (average major axis diameter: 0.171 µm, average minor axis diameter: 0.0213 µm, aspect ratio: 8.0:1, geometrical standard deviation of major axis diameter: 1.34, geometrical standard deviation of minor axis diameter: 1.39, BET specific surface area: 151.6 m$^2$/g, content of soluble sodium salts: 701 ppm (calculated as Na), content of soluble sulfate: 422 ppm (calculated as $SO_4$), pH value: 6.7) were suspended in water so as to obtain a slurry, and the concentration of the solid content was adjusted to 8 g/liter. 150 liter of the slurry was heated to 60° C. and the pH value of the slurry was adjusted to 10.0 by adding a 0.1-N aqueous NaOH solution.

To the alkali slurry was gradually added 36 g of #3 water glass as a sintering preventive, and after the end of addition, the resultant mixture was aged for 60 minutes. The pH value of the slurry was then adjusted to 6.0 by adding a 0.1-N acetic acid solution. Thereafter, the particles were filtered out, washed with water, dried and pulverized by an ordinary method, thereby producing spindle-shaped goethite particles coated with an oxide of silicon. The silicon content was 0.78% by weight (calculated as $SiO_2$).

1000 g of the spindle-shaped goethite particles obtained were charged into a stainless steel rotary furnace, and heat-dehydrated in the air at 350° C. for 40 minutes while rotating the furnace, to obtain low-density spindle-shaped hematite particles. The thus obtained low-density spindle-shaped hematite particles had an average major axis diameter of 0.145 µm, an average minor axis diameter of 0.0193 µm, an aspect ratio of 7.5:1, a geometrical standard deviation of major axis diameter of 1.34, a geometrical standard deviation of minor axis diameter of 1.39, a BET specific surface area of 176.5 m$^2$/g and a $S_{BET}/S_{TEM}$ value of 4.15. The content of soluble sodium salt of the low-density spindle-shaped hematite particles was 1717 ppm (calculated as Na) and the content of soluble sulfate was 1011 ppm (calculated as $SO_4$). The pH value of the low-density spindle-shaped hematite particles was 6.3.

850 g of the low-density spindle-shaped hematite particles were then charged into a ceramic rotary furnace, and heat-treated in the air at 610° C. for 30 minutes while rotating the furnace so as to fill in dehydration pores. The resultant high-density spindle-shaped hematite particles had an average major axis diameter of 0.137 µm, an average minor axis diameter of 0.0190 µm, an aspect ratio of 7.2:1, a geometrical standard deviation of major axis diameter of 1.35, a geometrical standard deviation of minor axis diameter of 1.40, a BET specific surface area ($S_{BET}$) of 55.3 m$^2$/g and a $S_{BET}/S_{TEM}$ value of 1.28. The silicon content was 0.85% by weight (calculated as $SiO_2$). The content of soluble sodium salt of the high-density spindle-shaped hematite particles was 2626 ppm (calculated as Na) and the content of soluble sulfate was 3104 ppm (calculated as $SO_4$). The pH value of the high-density spindle-shaped hematite particles was 5.3.

After 800 g of the high-density spindle-shaped hematite particles obtained were roughly pulverized by a Nara mill in advance, the obtained high-density spindle-shaped hematite particles were charged into 4.7 liter of pure water and deagglomerated by a homomixer (manufactured by Tokushu-kika Kogyo, CO., Ltd.) for 60 minutes.

The slurry of the high-density spindle-shaped hematite particles obtained was then dispersed for 3 hours at an axial rotation frequency of 2000 rpm while being circulated by a horizontal SGM (Dispermat SL, manufactured by S. C. Adichem, CO., Ltd.). The high-density spindle-shaped hematite particles in the slurry remaining on a sieve of 325 meshes (mesh size: 44 µm) was 0% by weight.

<Dissolving treatment with acid>

The slurry of the high-density spindle-shaped hematite particles obtained was mixed with water, thereby adjusting the concentration of the slurry to 100 g/liter. A 70% aqueous sulfuric acid solution was added to 7 liter of the slurry under stirring so as to adjust the sulfuric acid concentration to 1.3 N and the pH value to 0.65. The slurry was then heated to 80° C. under stirring, and was held for 5 hours at 80° C., thereby dissolving 29.7% by weight of the spindle-shaped hematite particles based on the total weight of the spindle-shaped hematite in the slurry.

The slurry was filtered to separate a filtrate (aqueous acid solution of iron sulfate) therefrom. The slurry from which the filtrate had been separated, was then washed with water by a decantation method and the pH value of the slurry was adjusted to 5.0. When the concentration of the slurry at this point was checked so as to ensure the accuracy, it was 68 g/liter.

2 liter of the obtained slurry was filtered through a Buchner filter, and pure water was passed until the electric conductivity of the filtrate became not more than 30 µs. The high-density spindle-shaped hematite particles were then dried by an ordinary method and pulverized so as to obtain the high-density spindle-shaped hematite particles. The high-density spindle-shaped hematite particles obtained had an average major axis diameter of 0.131 µm, an average minor axis diameter of 0.0181 µm, an aspect ratio of 7.2:1, a geometric standard deviation of major axis diameter of 1.35, a geometric standard deviation of major axis diameter of 1.33, a BET specific surface area ($S_{BET}$) of 58.1 m$^2$/g and a $S_{BET}/S_{TEM}$ value of 1.28. The content of soluble sodium salt of the high-density spindle-shaped hematite particles was 138 ppm (calculated as Na) and the content of soluble sulfate was 436 ppm (calculated as $SO_4$). The pH value of the high-density spindle-shaped hematite particles was 4.8.

S<Treatment of spindle-shaped hematite particles in an aqueous alkali solution>

The concentration of the high-density spindle-shaped hematite particles in the slurry was adjusted to 50 g/liter, and 5 liter of the slurry was adjusted to pH value 13.6 by adding 6N-aqueous NaOH solution. The resulting slurry was then heated to 95° C. under stirring, and was held for 3 hours at 95° C.

The resultant slurry was then washed with water by a decantation method and the pH value of the slurry was adjusted to 10.5. The concentration of the slurry at this point was 98 g/liter.

The high-density spindle-shaped hematite particles were filtered out from 1 liter of the obtained slurry through a Buchner filter, and the purified water was passed into the filtrate until the electric conductivity of the filtrate became not more than 30 μs. The high-density spindle-shaped hematite particles were then dried by an ordinary method and pulverized to obtain the target high-density spindle-shaped hematite particles. The high-density spindle-shaped hematite particles obtained had an average major axial diameter of not more than 0.131 μm, a minor axial diameter of 0.0181 μm, and a specific ratio of 7.2:1. The geometric standard deviation of major axial diameter was 1.35, the geometric standard deviation of minor axial diameter was 1.33, the BET specific surface ($S_{BET}$) was 57.8 m$^2$/g, the $S_{BET}/S_{TEM}$ value was 1.27. The content of soluble sodium salt of the high-density spindle-shaped hematite particles was 99 ppm (calculated as Na) and the content of soluble sulfate was 21 ppm (calculated as $SO_4$). The pH value of the high-density spindle-shaped hematite particles was 9.3.

Example 2

<Production of non-magnetic substrate: Formation of non-magnetic undercoat layer on base film>

12 g of the high-density spindle-shaped hematite particles obtained in Example 1 were mixed with a binder resin solution (30% by weight of vinyl chloride-vinyl acetate copolymer resin having a sodium sulfonate group and 70% by weight of cyclohexanone) and cyclohexanone, and each of the obtained mixtures (solid content: 72% by weight) was kneaded by a plast-mill for 30 minutes.

Each of the thus-obtained kneaded material was charged into a 140 ml-glass bottle together with 95 g of 1.5 mm glass beads, a binder resin solution (30% by weight of polyurethane resin having a sodium sulfonate group and 70% by weight of a solvent (methyl ethyl ketone : toluene=1:1)), cyclohexanone, methyl ethyl ketone and toluene, and the obtained mixture was mixed and dispersed by a paint shaker for 6 hours to obtain a non-magnetic coating composition. The viscosity of the obtained coating film composition was 367 cP.

The thus-obtained non-magnetic coating composition containing the high-density spindle-shaped hematite particles was as follows:

| | |
|---|---|
| High-density spindle-shaped hematite particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Cyclohexanone | 44.6 parts by weight |
| Methylethyl ketone | 111.4 parts by weight |
| Toluene | 66.9 parts by weight |

The non-magnetic coating composition obtained was applied to a polyethylene terephthalate film of 12 μm thick to a thickness of 55 μm by an applicator, and the coating film was then dried, thereby forming a non-magnetic undercoat layer. The thickness of the non-magnetic undercoat layer was 3.5 μm.

The non-magnetic undercoat layer produced from the high-density spindle-shaped hematite particles as the non-magnetic particles had a gloss of 204%, and a surface roughness Ra of 6.6 nm. The Young's modulus (relative value) thereof was 124.

Example 3

<Production of magnetic recording medium: Formation of magnetic recording layer>

12 g of magnetic acicular metal particles containing iron as a main component (average major axis diameter: 0.120 μm, average minor axis diameter: 0.0154 μm, a geometrical standard deviation of major axis diameter of 1.37, aspect ratio: 7.8:1, coercive force value: 1896 Oe, saturation magnetization value: 133.8 emu/g, pH value: 9.7), 1.2 g of a polishing agent (AKP-30: trade name, produced by Sumitomo Chemical Co., Ltd.), 0.12 g of carbon black (#3250B, trade name, produced by Mitsubishi Chemical Corp.), a binder resin solution (30% by weight of vinyl chloride-vinyl acetate copolymer resin having a sodium sulfonate group and 70% by weight of cyclohexanone) and cyclohexanone were mixed to obtain a mixture (solid content: 78% by weight). The mixture was further kneaded by a plast-mill for 30 minutes to obtain a kneaded material.

The thus-obtained kneaded material was charged into a 140 ml-glass bottle together with 95 g of 1.5 mm glass beads, a binder resin solution (30% by weight of polyurethane resin having a sodium sulfonate group and 70% by weight of a solvent (methyl ethyl ketone : toluene=1:1)), cyclohexanone, methyl ethyl ketone and toluene, and the mixture was mixed and dispersed by a paint shaker for 6 hours. Then, the lubricant and hardening agent were added to the mixture, and the resultant mixture was mixed and dispersed by a paint shaker for 15 minutes.

The thus-obtained magnetic coating composition was as follows:

| | |
|---|---|
| Magnetic acicular metal particles containing iron as a main component | 100 parts by weight |
| Vinyl chloride-vinyl acetate copolymer resin having a sodium sulfonate group | 10 parts by weight |
| Polyurethane resin having a sodium sulfonate group | 10 parts by weight |
| Polishing agent (AKP-30) | 10 parts by weight |
| Carbon black (#3250B) | 3.0 parts by weight |
| Lubricant (myristic acid:butyl stearate = 1:2) | 3.0 parts by weight |
| Hardening agent (polyisocyanate) | 5.0 parts by weight |
| Cyclohexanone | 65.8 parts by weight |
| Methyl ethyl ketone | 164.5 parts by weight |
| Toluene | 98.7 parts by weight |

The magnetic coating composition obtained was applied to the non-magnetic undercoat layer to a thickness of 15 μm by an applicator, and the magnetic recording medium obtained was oriented and dried in a magnetic field, and then calendered. The magnetic recording medium was then subjected to a curing reaction at 60° C. for 24 hours, and thereafter slit into a width of 0.5 inch, thereby obtaining a magnetic tape. The thickness of the respective magnetic recording layer was 1.1

The coercive force Hc of the magnetic tape produced by forming a magnetic recording layer on the non-magnetic undercoat layer was 1986 Oe, the squareness (Br/Bm) thereof was 0.87, the gloss thereof was 220%, the surface roughness Ra thereof was 6.2 nm, the Young's modulus (relative value) thereof was 128, the linear absorption coefficient thereof was 1.24 $\mu m^{-1}$.

The percentages of change in coercive force and saturation magnetization which represent an anti-corrosion is property of the magnetic tape, were 4.3% and 4.6%, respectively.

Example 4
<Production of magnetic recording medium: Formation of magnetic recording layer>

The same procedure as defined in Example 3 was conducted except that the magnetic particles were changed to magnetic acicular metal particles (average major axis diameter: 0.115 $\mu$m, average minor axis diameter: 0.0145 $\mu$m, a geometric standard deviation of major axis diameter of 1.36, aspect ratio: 7.9:1, coercive force: 1909 Oe, saturation magnetization: 133.8 emu/g, aluminum content of 2.85% by weight, calculated as Al, (1.26% by weight, calculated as Al, of aluminum in the central portion, 0.84% by weight, calculated as Al, of aluminum in the surface layer portion, and 0.75% by weight, calculated as Al, of aluminum on the surface coating), Nd content of 0.12% by weight, resin adsorptivity: 81.6%), thereby producing a magnetic tape.

The thickness of the magnetic coating film was 1.0 $\mu$m.

The thus obtained magnetic tape had a coercive force Hc of 1980 Oe, a squareness (Br/Bm) of 0.88, a gloss of 223%, a surface roughness Ra of 6.4 nm, a Young's modulus (relative value) of coating film of 128, a linear absorption coefficient of 1.24 $\mu m^{-1}$, a running durability of 28.9 minutes and a scratch resistance of A.

The percentages of change in coercive force and saturation magnetization which represent an anti-corrosion property of the magnetic tape, were 4.6% and 2.7%, respectively.

Example 5
<Production of single-shaped hematite particles>

1200 g of spindle-shaped goethite particles obtained by the above production method (B) of goethite particles using a ferrous sulfate aqueous solution, a sodium carbonate aqueous solution and aluminum sulfate aqueous solution, and containing aluminum in an amount of 1.12% by weight (calculated as Al) based on the total weight of the particles, uniformly within the particles (average major axis diameter: 0.167 $\mu$m, average minor axis diameter: 0.0196 $\mu$m, aspect ratio: 8.5:1, geometrical standard deviation of major axis diameter: 1.32, geometrical standard deviation of minor axis diameter: 1.40, BET specific surface area: 165.3 m$^2$/g, content of soluble sodium salts: 1821 ppm (calculated as Na), content of soluble sulfate: 2162 ppm (calculated as SO$_4$), pH value: 6.8) were suspended in water so as to obtain a slurry, and the concentration of the solid content was adjusted to 8 g/liter. 150 liter of the slurry was heated to 60° C. and the pH value of the slurry was adjusted to 10.0 by adding a 0.1-N aqueous NaOH solution.

To the alkali slurry was gradually added 24 g of #3 water glass as a sintering preventive, and after the end of addition, the resultant mixture was aged for 60 minutes. The pH value of the slurry was then adjusted to 6.0 by adding a 0.1-N acetic acid solution. Thereafter, the particles were filtered out, washed with water, dried and pulverized by an ordinary method, thereby producing spindle-shaped goethite particles which substantially uniformly contain aluminum within the particle, coated with an oxide of silicon. The silicon content was 0.52% by weight (calculated as SiO$_2$) based on the total weight of the particles.

1000 g of the spindle-shaped goethite particles which substantially uniformly contain aluminum within the particle, obtained were charged into a stainless steel rotary furnace, and heat-dehydrated in the air at 350° C. for 40 minutes while rotating the furnace, to obtain low-density spindle-shaped hematite particles which substantially uniformly contain aluminum within the particle. The thus obtained low-density spindle-shaped hematite particles which substantially uniformly contain aluminum within the particle, had an average major axial diameter of 0.143 $\mu$m, an average minor axial diameter of 0.0191 $\mu$m, a geometric standard deviation of major axis diameter of 1.32, a geometric standard deviation of minor axis diameter of 1.40, an aspect ratio of 7.5:1, a BET specific surface area (S$_{BET}$) of 188.9 m$^2$/g and a S$_{BET}$/S$_{TEM}$ value of 4.40. The low-density spindle-shaped hematite particles contained soluble sodium salts of 1682 ppm (calculated as Na) and soluble sulfates of 976 ppm (calculated as SO$_4$). The aluminum content was 1.23% by weight (calculated as Al), the pH value of the low-density spindle-shaped hematite particles was 6.1. The SiO$_2$ content thereof was 0.57% by weight (calculated as SiO$_2$) based on the total weight of the particles.

850 g of the low-density spindle-shaped hematite particles which substantially uniformly contain aluminum within the particle, were then charged into a ceramic rotary furnace, and heat-treated in the air at 650° C. for 30 minutes while rotating the furnace so as to fill in dehydration pores. The resultant high-density spindle-shaped hematite particles which substantially uniformly contain aluminum within the particle, had an average major axial diameter of 0.141 $\mu$m, an average minor axial diameter of 0.0192 $\mu$m, a geometric standard deviation of major axis diameter of 1.33, a geometric standard deviation of minor axis diameter of 1.41, an aspect ratio of 7.3:1, a BET specific surface area (S$_{BET}$) of 56.1 m$^2$/g and a S$_{BET}$/S$_{TEM}$ value of 1.31. The silicon content was 0.57% by weight (calculated as SiO$_2$) and the aluminum content was 1.23% by weight (calculated as Al). The content of soluble sodium salt of the high-density spindle-shaped hematite particles was 2538 ppm (calculated as Na) and the content of soluble sulfate was 2859 ppm (calculated as SO$_4$). The pH thereof was 5.6.

After 800 g of the high-density spindle-shaped hematite particles which substantially uniformly contain aluminum within the particle, obtained were roughly pulverized by a Nara mill in advance, the obtained high-density spindle-shaped hematite particles which substantially uniformly contain aluminum within the particle, were charged into 4.7 liter of pure water and deagglomerated by a homomixer (manufactured by Tokushu-kika Kogyo, CO., Ltd.) for 60 minutes.

The slurry of the high-density spindle-shaped hematite particles which substantially uniformly contain aluminum within the particle, obtained was then dispersed for 3 hours at an axial rotation frequency of 2000 rpm while being circulated by a horizontal SGM (Dispermat SL, manufactured by S. C. Adichem, CO., Ltd.). The high-density spindle-shaped hematite particles which substantially uniformly contain aluminum within the particle, in the slurry remaining on a sieve of 325 meshes (mesh size: 44 $\mu$m) was 0% by weight.

<Dissolving treatment with acid>

The slurry of the high-density spindle-shaped hematite particles which substantially uniformly contain aluminum within the particle, obtained was mixed with water, thereby adjusting the concentration of the slurry to 100 g/liter. A 70% aqueous sulfuric acid solution was added to 7 liter of the slurry under stirring so as to adjust the sulfuric acid concentration to 1.3N and the pH value to 0.58. The slurry was then heated to 80° C. under stirring, and was held for 5 hours at 80° C., thereby dissolving 29.5% by weight of the high density spindle-shaped hematite particles which substantially uniformly contain aluminum within the particle, based on the total weight of the high-density spindle-shaped hematite particles in the slurry.

The slurry was filtered to separate a filtrate (aqueous acid solution of iron sulfate) therefrom. The slurry from which the filtrate had been separated, was then washed with water by a decantation method and the pH value of the slurry was adjusted to 5.0. When the concentration of the slurry at this point was checked so as to ensure the accuracy, it was 68 g/liter.

A part of the water-washed slurry obtained was separated and filtered through a Buchner filter, and pure water was passed until the electric conductivity of the filtrate became not more than 30 $\mu$s. The resultant particles were then dried by an ordinary method and pulverized so as to obtain the high-density spindle-shaped hematite particles which substantially uniformly contain aluminum within the particle. The high-density spindle-shaped hematite particles which substantially uniformly contain aluminum within the particle, obtained had an average major axis diameter of 0.133 $\mu$m, an average minor axis diameter of 0.0182 $\mu$m, an aspect ratio of 7.3:1, a geometric standard deviation of major axis diameter of 1.34, a geometric standard deviation of minor axis diameter of 1.33, a BET specific surface area ($S_{BET}$) of 60.3 m$^2$/g, a $S_{BET}/S_{TEM}$ value of 1.34, an aluminum content of 1.23% by weight (calculated as Al). The content of soluble sodium salt of the high-density spindle-shaped hematite particles was 131 ppm (calculated as Na) and the content of soluble sulfate was 424 ppm (calculated as $SO_4$). The pH value of the high-density spindle-shaped hematite particles was 4.9.

<Treatment of high-density spindle-shaped hematite particles in an aqueous alkali solution>

The concentration of the high-density spindle-shaped hematite particles in the slurry was adjusted to 50 g/liter, and 5 liter of the slurry was adjusted to pH value 13.6 by adding a 6N-aqueous NaOH solution. The resulting slurry was then heated to 95° C. under stirring, and was held for 3 hours at 95° C.

The resultant slurry was then washed with water by a decantation method and the pH value of the slurry was adjusted to 10.5. The concentration of the slurry at this point was 98 g/liter.

The particles were filtered out from the obtained slurry of 1 liter through a Buchner filter, and the purified water was passed into the filtrate until the electric conductivity of the filtrate became not more than 30 $\mu$s. The particles were then dried by an ordinary method and pulverized to obtain the target high-density spindle-shaped hematite particles. The high-density spindle-shaped hematite particles obtained had an average major axial diameter of not more than 0.133 $\mu$m, a minor axial diameter of 0.0182 $\mu$m, and a specific ratio of 7.3:1. The geometric standard deviation of major axial diameter was 1.33, the geometric standard deviation of minor axial diameter was 1.34, the BET specific surface ($S_{BET}$) was 60.1 m$^2$/g, the $S_{BET}/S_{TEM}$ value was 1.33. The aluminum content was 1.23% by weight (calculated as Al). The content of soluble sodium salt of the high-density spindle-shaped hematite particles was 97 ppm (calculated as Na) and the content of soluble sulfate was 20 ppm (calculated as $SO_4$). The pH value of the high-density spindle-shaped hematite particles was 9.4, and the resin adsorptivity thereof was 72.5%.

Example 6

<Production of non-magnetic substrate: Formation of non-magnetic undercoat layer on base film>

The same procedure as defined in Example 2 was conducted except that the spindle-shaped hematite particles which substantially uniformly contain aluminum within the particle, obtained in Example 5 were used instead of the spindle-shaped hematite particles, thereby obtaining a non-magnetic undercoat layer.

The thickness of the non-magnetic undercoat layer was 3.5 $\mu$m.

The thus obtained non-magnetic undercoat layer had a gloss of 212%, a surface roughness Ra of 6.1 nm, and a Young's modulus (relative value) of coating film of 127.

Example 7

<Production of magnetic recording medium: Formation of magnetic recording layer>

The same procedure as defined in Example 3 was conducted except that magnetic acicular metal particles containing iron as a main component and further containing aluminum in amounts of 1.24% by weight (calculated as Al) at a central portion of particle; 0.83% by weight (calculated as Al) at a surface portion thereof; and 0.94% by weight (calculated as Al) in a coating layer formed on the surface of particle (average major axis diameter: 0.112 $\mu$m, average minor axis diameter: 0.0147 $\mu$m, geometrical standard deviation of major axis diameter: 1.36, aspect ratio: 7.6:1, coercive force: 1908 Oe, saturation magnetization: 136.3 emu/g, resin adsorptivity: 82.0%) were used, thereby obtaining a magnetic coating composition.

The thus obtained magnetic coating composition was applied onto the non-magnetic undercoat layer obtained in Example 6 in the same manner as in Example 3, thereby forming a magnetic recording layer and producing a magnetic tape.

The thickness of the magnetic coating film was 1.1 $\mu$m.

The thus obtained magnetic tape had a coercive force Hc of 1983 Oe, a squareness (Br/Bm) of 0.87, a gloss of 234%, a surface roughness Ra of 6.1 nm, a Young's modulus (relative value) of coating film of 131, a linear absorption coefficient of 1.24 $\mu m^{-1}$, a running durability of 29.2 minutes, and a scratch resistance of A.

Changes in the coercive force and the saturation magnetic flux density Bit with passage time were 4.5% and 2.6%, respectively.

Example 8

<Production of spindle-shaped hematite particles>

1200 g of spindle-shaped goethite particles obtained by the above production method (B) of goethite particles using a ferrous sulfate aqueous solution and a sodium carbonate aqueous solution (average major axis diameter: 0.0812 $\mu$m, geometrical standard deviation of major axis diameter: 1.53, average minor axis diameter: 0.0110 $\mu$m, geometrical standard deviation of minor axis diameter: 1.37, aspect ratio: 7.4:1, BET specific surface area: 168.9 m$^2$/g, soluble sodium salt content: 1212 ppm (calculated as Na), soluble sulfate content: 1816 ppm (calculated as $SO_4$), pH value: 6.8) were suspended in water so as to obtain a slurry, and the concentration of the solid content was adjusted to 8 g/liter. 150 liter of the slurry was heated to 60° C. and the pH value of the slurry was adjusted to 10.0 by adding a 0.1-N aqueous NaOH solution.

To the alkali slurry was gradually added 36.0 g of #3 water glass as a sintering preventive, and after the end of addition, the resultant mixture was aged for 60 minutes. The pH value of the slurry was then adjusted to 6.0 by adding a 0.1-N acetic acid solution. Thereafter, the particles were filtered out, washed with water, dried and pulverized by an ordinary method, thereby producing spindle-shaped goethite particles coated with an oxide of silicon. The silicon content was 0.78% by weight (calculated as $SiO_2$).

The spindle-shaped goethite particles obtained were charged into a heat-treatment metal furnace, and heat-treated therein at 150° C. for 30 minutes, thereby absorbing superfine goethite particles present within the spindle-shaped goethite particles, into the spindle-shaped goethite particles.

The thus obtained spindle-shaped goethite particles were charged again into the heat treatment metal furnace, and heat-dehydrated therein at 320° C. for 30 minutes, thereby obtaining low-density spindle-shaped hematite particles. The thus obtained low-density spindle-shaped hematite particles had an average major axis diameter of 0.0736 μm, a geometrical standard deviation of major axis diameter of 1.38, an average minor axis diameter of 0.0118 μm, a geometrical standard deviation of minor axis diameter of 1.16, an aspect ratio of 6.1:1, a BET specific surface area of 190.3 $m^2/g$, a $S_{BET}/S_{TEM}$ value of 2.70. The silicon content was 0.78% by weight (calculated as $SiO_2$). The content of soluble sodium salt of the low-density spindle-shaped hematite particles was 1826 ppm (calculated as Na) and the content of soluble sulfate was 2512 ppm (calculated as $SO_4$). The pH value of the low-density spindle-shaped hematite particles was 6.1.

850 g of the low-density spindle-shaped hematite particles were then charged into a ceramic rotary furnace, and heat-treated in the air at 650° C. for 30 minutes while rotating the furnace so as to fill in dehydration pores. The resultant high-density spindle-shaped hematite particles had an average major axis diameter of 0.0727 μm, a geometrical standard deviation of major axis diameter of 1.38, an average minor axis diameter of 0.0120 μm, a geometrical standard deviation of minor axis diameter of 1.17, an aspect ratio of 6.1:1, a BET specific surface area ($S_{BET}$) of 86.8 $m^2/g$, a $S_{BET}/S_{TEM}$ value of 1.25. The silicon content was 0.87% by weight (calculated as $SiO_2$). The content of soluble sodium salt of the high-density spindle-shaped hematite particles was 2121 ppm (calculated as Na) and the content of soluble sulfate was 2832 ppm (calculated as $SO_4$). The pH value of the high-density spindle-shaped hematite particles was 5.8.

<Treatment of high-density spindle-shaped hematite particles in an aqueous alkali solution>

The concentration of the high-density spindle-shaped hematite particles in the slurry was adjusted to 50 g/liter, and 5 liter of the slurry was adjusted to pH value 13.4 by adding a 6N-aqueous NaOH solution. The resulting slurry was then heated to 95° C. under stirring, and was held for 3 hours at 95° C.

The resultant slurry was then washed with water by a decantation method and the pH value of the slurry was adjusted to 10.5. The concentration of the slurry at this point was 98 g/liter.

The particles were filtered out through a Buchner filter, and the purified water was passed into the filtrate until the electric conductivity of the filtrate became not more than 30 μs. The particles were then dried by an ordinary method and pulverized to obtain the target high-density spindle-shaped hematite particles. The high-density spindle-shaped hematite particles obtained had an average major axial diameter of 0.0726 μm, a minor axial diameter of 0.0120 μm, and a specific ratio of 6.1. The geometric standard deviation of major axial diameter was 1.38, the geometric standard deviation of minor axial diameter was 1.17, the BET specific surface ($S_{BET}$) was 86.2 $m^2/g$, the $S_{BET}/S_{TEM}$ value was 1.24. The content of soluble sodium salt of the high-density spindle-shaped hematite particles was 86 ppm (calculated as Na) and the content of soluble sulfate was 32 ppm (calculated as $SO_4$). The pH value of the high-density spindle-shaped hematite particles was 9.0, and the resin adsorptivity thereof was 75.1%.

Example 9

<Production of non-magnetic substrate: Formation of non-magnetic undercoat layer on base film>

The same procedure as defined in Example 2 was conducted except that the high-density spindle-shaped hematite particles obtained in Example 8 were used instead of the spindle-shaped hematite particles, thereby obtaining a non-magnetic undercoat layer. The thickness of the non-magnetic undercoat layer was 3.4 μm.

The thus obtained non-magnetic undercoat layer had a gloss of 208%, a surface roughness Ra of 6.4 nm, and a Young's modulus (relative value) of coating film of 134.

Example 10

<Production of magnetic recording medium: Formation of magnetic recording layer>

The same procedure as defined in Example 3 was conducted except that the magnetic particles were changed to magnetic acicular metal particles containing iron as a main component (average major axis diameter: 0.103 μm, average minor axis diameter: 0.0152 μm, a geometric standard deviation of major axis diameter of 1.38, aspect ratio: 6.8:1, coercive force: 1910 Oe, saturation magnetization: 136 emu/g), and that the non-magnetic undercoat layer obtained in Example 9 was used, thereby producing a magnetic tape.

The thickness of the magnetic coating film was 1.0 μm.

The thus obtained magnetic tape had a coercive force Hc of 1991 Oe, a squareness (Br/Bm) of 0.88, a gloss of 235%, a surface roughness Ra of 5.8 nm, a Young's modulus (relative value) of coating film of 137, a linear absorption coefficient of 1.26 $\mu m^{-1}$, a running durability of 298 minutes and a scratch resistance of A.

Changes in the coercive force and the saturation magnetic flux density Bm with passage time were 4.6% and 3.8%, respectively.

Example 11

<Production of magnetic recording medium: Formation of magnetic recording layer>

The same procedure as defined in Example 3 was conducted except that the magnetic particles were changed to magnetic acicular metal particles (average major axis diameter: 0.115 μm, average minor axis diameter: 0.0145 μm, a geometric standard deviation of major axis diameter of 1.36, aspect ratio: 7.9:1, coercive force: 1909 Oe, saturation magnetization: 133.8 emu/g,,aluminum content of 2.85% by weight, calculated as Al, (1.26% by weight, calculated as Al, of aluminum in the central portion, 0.84% by weight, calculated as Al, of aluminum in the surface layer portion, and 0.75% by weight, calculated as Al, of aluminum on the surface coating), Nd content of 0.12% by weight, resin adsorptivity: 81.6%), and that the non-magnetic undercoat layer obtained in Example 9 was used, thereby producing a magnetic tape.

The thickness of the magnetic coating film was 1.0 μm.

The thus obtained magnetic tape had a coercive force Hc of 1985 Oe, a squareness (Br/Bm) of 0.89, a gloss of 238%, a surface roughness Ra of 5.6 nm, a Young's modulus (relative value) of coating film of 138, a linear absorption coefficient of 1.27 $\mu m^{-1}$, a running durability of not less than 30 minutes and a scratch resistance of A.

Changes in the coercive force and the saturation magnetic flux density Bm with passage time were 2.8% and 2.6%, respectively.

Example 12
<Production of spindle-shaped hematite Particles>

1200 g of spindle-shaped goethite particles obtained by the above production method (B) of goethite particles using a ferrous sulfate aqueous solution, a sodium carbonate aqueous solution and aluminum sulfate aqueous solution (average major axis diameter: 0.0846 μm, geometrical standard deviation of major axis diameter: 1.49, average minor axis diameter: 0.0115 μm, geometrical standard deviation of minor axis diameter: 1.38, aspect ratio: 7.4:1, BET specific surface area: 161.6 m²/g, aluminum content: 2.12% by weight (calculated as Al), soluble sodium salt content: 1168 ppm (calculated as Na), soluble sulfate content: 1721 ppm (calculated as $SO_4$), pH value: 6.0) were suspended in water so as to obtain a slurry, and the concentration of the solid content was adjusted to 8 g/liter. 150 liter of the slurry was heated to 60° C. and the pH value of the slurry was adjusted to 10.0 by adding a 0.1-N aqueous NaOH solution.

To the alkali slurry was gradually added 42.0 g of #3 water glass as a sintering preventive, and after the end of addition, the resultant mixture was aged for 60 minutes. The pH value of the slurry was then adjusted to 6.0 by adding a 0.1-N acetic acid solution. Thereafter, the particles were filtered out, washed with water, dried and pulverized by an ordinary method, thereby producing spindle-shaped goethite particles which substantially uniformly contain aluminum within the particle, coated with an oxide of silicon. The silicon content was 0.90% by weight (calculated as $SiO_2$).

The spindle-shaped goethite particles which substantially uniformly contain aluminum within the particle, obtained were charged into a heat treatment metal furnace, and heat-treated therein at 140° C. for 30 minutes, thereby absorbing superfine goethite particles present within the spindle-shaped goethite particles, into the spindle-shaped goethite particles.

The thus obtained spindle-shaped goethite particles which substantially uniformly contain aluminum within the particle, were charged again into the heat treatment metal furnace, and heat-dehydrated therein at 340° C. for 30 minutes, thereby obtaining low-density spindle-shaped hematite particles which substantially uniformly contain aluminum within the particle. The thus obtained low-density spindle-shaped hematite particles which substantially uniformly contain aluminum within the particle, had an average major axis diameter of 0.0793 μm, a geometrical standard deviation of major axis diameter of 1.37, an average minor axis diameter of 0.0119 μm, a geometrical standard deviation of minor axis diameter of 1.23, an aspect ratio of 6.7:1, a BET specific surface area ($S_{BET}$) of 181.0 m²/g, a $S_{BET}/S_{TEM}$ value of 2.60. The silicon content was 0.99% by weight (calculated as $SiO_2$) and the aluminum content was 2.35% by weight (calculated as Al). The content of soluble sodium salt of the low-density spindle-shaped hematite particles was 1465 ppm (calculated as Na) and the content of soluble sulfate was 1965 ppm (calculated as $SO_4$). The pH value of the low-density spindle-shaped hematite particles was 5.9.

850 g of the low-density spindle-shaped hematite particles which substantially uniformly contain aluminum within the particle, were then charged into a ceramic rotary furnace, and heat-treated in the air at 650° C. for 30 minutes while rotating the furnace so as to fill in dehydration pores. The resultant high-density spindle-shaped hematite particles which substantially uniformly contain aluminum within the particle, had an average major axis diameter of 0.0753 μm, a geometrical standard deviation of major axis diameter of 1.37, an average minor axis diameter of 0.0122 μm, a geometrical standard deviation of minor axis diameter of 1.24, an aspect ratio of 6.2:1, a BET specific surface area ($S_{BET}$) of 83.8 m²/g, a $S_{BET}/S_{TEM}$ value of 1.23. The silicon content was 1.00% by weight (calculated as $SiO_2$) and the aluminum content was 2.35% by weight (calculated as Al). The silicon content was 1.00% by weight (calculated as $SiO_2$). The content of soluble sodium salt of the high-density spindle-shaped hematite particles was 1612 ppm (calculated as Na) and the content of soluble sulfate was 2101 ppm (calculated as $SO_4$). The pH value of the high-density spindle-shaped hematite particles was 5.7.

<Treatment of high-density spindle-shaped hematite particles in an aqueous alkali solution>

The concentration of the high-density spindle-shaped hematite particles in the slurry was adjusted to 50 g/liter, and 5 liter of the slurry was adjusted to pH value 13.8 by adding a 6N-aqueous NaOH solution. The resulting slurry was then heated to 95° C. under stirring, and was held for 3 hours at 95° C.

The resultant slurry was then washed with water by a decantation method and the pH value of the slurry was adjusted to 10.5. The concentration of the slurry at this point was 98 g/liter.

The particles were filtered out through a Buchner filter, and the purified water was passed into the filtrate until the electric conductivity of the filtrate became not more than 30 μs. The particles were then dried by an ordinary method and pulverized to obtain the target high-density spindle-shaped hematite particles. The high-density spindle-shaped hematite particles obtained had an average major axial diameter of 0.0752 μm, a minor axial diameter of 0.0122 μm, and a specific ratio of 6.2. The geometric standard deviation of major axial diameter was 1.37, the geometric standard deviation of minor axial diameter was 1.24, the BET specific surface ($S_{BET}$) was 83.4 m²/g, the $S_{BET}/S_{TEM}$ value was 1.22. The content of soluble sodium salt of the high-density spindle-shaped hematite particles was 63 ppm (calculated as Na) and the content of soluble sulfate was 21 ppm (calculated as $SO_4$). The pH value of the high-density spindle-shaped hematite particles was 9.1, and the resin adsorptivity thereof was 79.6%.

Example 13
<Production of non-magnetic substrate: Formation of non-magnetic undercoat layer on base film>

The same procedure as defined in Example 2 was conducted except that the spindle-shaped hematite particles which substantially uniformly contain aluminum within the particle, obtained in Example 12 were used instead of the spindle-shaped hematite particles, thereby obtaining a non-magnetic undercoat layer.

The thickness of the magnetic coating film was 3.5 μm.

The thus obtained non-magnetic undercoat layer had a gloss of 218%, a surface roughness Ra of 6.2 nm, and a Young's modulus (relative value) of coating film of 135.

Example 14
<Production of magnetic recording medium: Formation of magnetic recording layer>

The same procedure as defined in Example 3 was conducted except that the magnetic particles were changed to acicular magnetic metal particles (average major axis diameter: 0.110 μm, average minor axis diameter: 0.0146 μm, a geometric standard deviation of major axis diameter of 1.38, aspect ratio: 7.5:1, coercive force: 1943 Oe, saturation magnetization: 132 emu/g), and that the non-magnetic undercoat layer obtained in Example 13 was used, thereby producing a magnetic tape.

The thickness of the magnetic coating film was 1.0 μm.

The thus obtained magnetic tape had a coercive force Hc of 1989 Oe, a squareness (Br/Bm) of 0.88, a gloss of 238%, a surface roughness Ra of 5.8 nm, a Young's modulus (relative value) of coating film of 136, a linear absorption coefficient of 1.27 $\mu m^{-1}$, a running durability of not less than 30 minutes and a scratch resistance of A.

Changes in the coercive force and the saturation magnetic flux density Bm with passage time were 2.8% and 2.1%, respectively.

Example 15
<Production of magnetic recording medium: Formation of magnetic recording layer>

The same procedure as defined in Example 3 was conducted except that the magnetic particles were changed to magnetic acicular metal particles (average major axis diameter: 0.115 μm, average minor axis diameter: 0.0145 pm, a geometric standard deviation of major axis diameter of 1.36, aspect ratio: 7.9:1, coercive force: 1909 Oe, saturation magnetization: 133.8 emu/g, aluminum content of 2.85% by weight, calculated as Al, (1.26% by weight, calculated as Al, of aluminum in the central portion, 0.84% by weight, calculated as Al, of aluminum in the surface layer portion, and 0.75% by weight, calculated as Al, of aluminum on the surface coating), Nd content of 0.12% by weight, resin adsorptivity: 81.6%), and that the non-magnetic undercoat layer obtained in Example 13 was used, thereby producing a magnetic tape.

The thickness of the magnetic coating film was 1.0 μm.

The thus obtained magnetic tape had a coercive force Hc of 1990 Oe, a squareness (Br/Bm) of 0.89, a gloss of 243%, a surface roughness Ra of 5.4 nm, a Young's modulus (relative value) of coating film of 138, a linear absorption coefficient of 1.26 $\mu m^{-1}$, a running durability of not less than 30 minutes and a scratch resistance of A.

Changes in the coercive force and the saturation magnetic flux density Bm with passage time were 1.8% and 1.6%, respectively.
<Kinds of acicular goethite particles>
Precursor 1 to 6:

Various properties of acicular goethite particles as a precursor of acicular hematite particles are shown in Table 1.

Examples 16 to 22 and Comparative Examples 1 to 6
<Production of low-density acicular hematite particles>

Low-density acicular hematite particles were obtained in the same way as in Example 1 except for varying the kind of acicular goethite particles as a precursor, the kind and amount added of sintering preventive, and heat-dehydration temperature and time. Incidentally, the particles obtained in Comparative Example 4 were acicular goethite particles.

The main producing conditions and various properties are shown in Tables 2 to 3.

Examples 23 to 29 and Comparative Examples 7 to 11
<Production of high-density acicular hematite particles>

High-density acicular hematite particles were obtained in the same way as in Example 1 except for varying the kind of low-density acicular hematite particles, and heat-treating temperature and time for high densification.

The main producing conditions and various properties are shown in Tables 4 to 5.

Examples 30 to 36 and Comparative Examples 12 to 13
<Acid-dissolving treatment of acicular hematite particles>

Acicular hematite particles were obtained in the same way as in Example 1 except for varying the kind of high-density acicular hematite particles, use or non-use of the wet pulverization, the acid concentration, the pH value of slurry, and the heating temperature and time.

The main producing conditions and various properties are shown in Tables 6 to 7.

Examples 37 to 43 and Reference Examples 1 to 2
<Heat-treatment of acicular hematite particles in alkaline suspension>

The same procedure as defined in Example 1 was conducted except that kind of acicular hematite particles, pH value of slurry, heating temperature and heating time were varied, thereby obtaining acicular hematite particles.

Main production conditions and various properties are shown in Tables 8 and 9.

Example 44
<Surface-coating treatment of acicular hematite particles>

The concentration of the slurry having a pH value of 10.5 which was obtained in Example 37 by washing the slurry heat-treated in the alkaline suspension, with water by a decantation method, was 50 g/liter. 4 liters of the water-washed slurry was heated again to 60° C., and then mixed with 74.1 ml of 1.0N sodium aluminate aqueous solution (corresponding to 1.0% by weight calculated as Al based on the weight of the acicular hematite particles). After maintaining the slurry at that temperature for 30 minutes, the pH value of the slurry was adjusted to 8.0 using an aqueous acetic acid solution. Next, the slurry was sequentially subjected to filtration, washing with water, drying and pulverization in the same manner as in Example 1, thereby obtaining acicular hematite particles whose surfaces were coated with a hydroxide of aluminum.

Main production conditions and various properties are shown in Tables 10 and 11.

Examples 45 to 50

Acicular hematite particles coated with a coating material by an ordinary method were obtained in the same way as in Example 44 except for varying the kind of acicular hematite particles and the kind and amount of the coating material.

The main producing conditions and various properties are shown in Tables 10 and 11, respectively.

Examples 51 to 64. Comparative Examples 14 to 22 and Reference Examples 3 to 11
<Production of non-magnetic substrate: Formation of non-magnetic undercoat layer on non-magnetic base film>

By using the acicular hematite particles obtained in Example 30 to 50, Comparative Examples 1, 3 and 7 to 13 and Reference Examples 1 to 2, non-magnetic undercoat layers were formed in the same way as in Example 2.

The main producing conditions and various properties are shown in Tables 12 and 13, respectively.
<Production of magnetic recording medium: Formation of magnetic coating film>

Magnetic particles used for forming the magnetic recording layers and various properties thereof are shown in Table 14.

Examples 65 to 78, Comparative Examples 23 to 31 and Reference Examples 12 to 20

Magnetic recording media were produced in the same way as in Example 3 except for varying the kind of non-magnetic substrate and the kind of magnetic particles.

The main producing conditions and various properties are shown in Tables 15 and 16.

Examples 79 to 92, Comparative Examples 32 to 40 and Reference Examples 21 to 29

Magnetic recording media were produced in the same way as in Example 4 except for varying the kind of non-magnetic substrate and the kind of magnetic particles.

The main producing conditions and various properties are shown in Tables 17 and 18.

<Kinds of acicular goethite particles which substantially uniformly contain aluminum within the particle >

Precursor 7 to 13:

Various properties of acicular goethite particles as a precursor of acicular hematite particles are shown in Table 19.

Examples 93 to 99 and Comparative Examples 41 to 46

<Production of low-density acicular hematite particles which substantially uniformly contain aluminum within the particle>

Low-density acicular hematite particles were obtained in the same way as in Example 5 except for varying the kind of acicular goethite particles as a precursor, the kind and amount added of sintering preventive, and heat-dehydration temperature and time. Incidentally, the particles obtained in Comparative Example 44 were acicular goethite particles.

The main producing conditions and various properties are shown in Tables 20 to 21.

Examples 100 to 106 and Comparative Examples 47 to 51

<Production of high-density acicular hematite Particles which substantially uniformly contain aluminum within the Particle>

High-density acicular hematite particles were obtained in the same way as in Example 5 except for varying the kind of low-density acicular hematite particles, and heat-treating temperature and time for high densification.

The main producing conditions and various properties are shown in Tables 22 to 23.

Examples 107 to 113 and Comparative Examples 52 to 53

<Acid-dissolving treatment of acicular hematite particles which substantially uniformly contain aluminum within the particle>

Acicular hematite particles were obtained in the same way as in Example 5 except for varying the kind of high-density acicular hematite particles, use or non-use of the wet pulverization, the acid concentration, the pH value of slurry, and the heating temperature and time.

The main producing conditions and various properties are shown in Tables 24 to 25.

Examples 114 to 120 and Reference Examples 30 to 31

<Heat-treatment of acicular hematite Particles in alkaline suspension>

The same procedure as defined in Example 5 was conducted except that kind of acicular hematite particles, pH value of slurry, heating temperature and heating time were varied, thereby obtaining acicular hematite particles.

Main production conditions and various properties are shown in Tables 26 and 27.

Example 121

<Surface coating of acicular hematite particles which substantially uniformly contain aluminum within the particle>

The concentration of the slurry having a pH value of 10.5 which was obtained in Example 114 by washing the slurry heat-treated in the alkaline suspension, with water by a decantation method, was 50 g/liter. 4 liters of the water-washed slurry was heated again to 60° C., and then mixed with 74.1 ml of 1.0N sodium aluminate aqueous solution (corresponding to 1.0% by weight calculated as Al based on the weight of the acicular hematite particles). After maintaining the slurry at that temperature for 30 minutes, the pH value of the slurry was adjusted to 8.0 using an aqueous acetic acid solution. Next, the slurry was sequentially subjected to filtration, washing with water, drying and pulverization in the same manner as in Example 5, thereby obtaining acicular hematite particles whose surfaces were coated with a hydroxide of aluminum.

Main production conditions and various properties are shown in Tables 28 and 29.

Examples 122 to 127

Acicular hematite particles coated with a coating material by an ordinary method were obtained in the same way as in Example 121 except for varying the kind of acicular hematite particles and the kind and amount of the coating material.

The main producing conditions and various properties are shown in Tables 28 and 29.

Examples 128 to 141. Comparative Examples 54 to 62 and Reference Examples 32 to 40

<Production of non-magnetic substrate: Formation of non-magnetic undercoat layer on non-magnetic base film>

By using the acicular hematite particles obtained in Example 107 to 127 and Comparative Examples 41, 43 and 47 to 53 and Reference Examples 30 to 31, non-magnetic undercoat layers were formed in the same way as in Example 2.

The main producing conditions and various properties are shown in Tables 30 and 31.

Examples 142 to 155. Comparative Examples 63 to 71 and Reference Examples 41 to 49

<Production of magnetic recording medium: Formation of magnetic coating film>

Magnetic recording media were produced in the same way as in Example 3 except for varying the kind of non-magnetic substrate and the kind of magnetic particles.

The main producing conditions and various properties are shown in Tables 32 and 33.

<Kind of acicular goethite particles>

Goethite Particles 1 to 2:

Acicular goethite particles 1 and 2 as precursors having properties shown in Table 34 were prepared.

Goethite particles 3 to 5:

Acicular goethite particles 3 to 5 which were subjected to a sintering preventing treatmnent, were obtained in the same way as in Example 8 except for varying the kind of starting particles and the element and amount of sintering preventive.

Various properties of the obtained acicular goethite particles are shown in Table 35.

<Heat treatment>

Goethite particles 6 to 9:

Acicular goethite particles 6 to 9 were obtained in the same way as in Example 8 except for varying the kind of acicular goethite particles as precursors and the heat-treating temperature and time.

The main producing conditions are shown in Table 36 and various properties of the obtained acicular goethite particles are shown in Table 37.

<Production of low-density acicular hematite particles>
Hematite particles 1 to 4:

Low-density acicular hematite particles 1 to 4 were obtained in the same way as in Example 8 except for varying the kind of acicular goethite particles as precursors and the heat-dehydrating temperature and time.

The main producing conditions are shown in Table 38 and various properties of the obtained low-density acicular hematite particles are shown in Table 39.

<Production of high-density acicular hematite particles>
Hematite particles 5 to 13:

High-density acicular hematite particles were obtained in the same way as in Example 8 except for varying the kind of particles to be treated and the heat-treating temperature and time.

The main producing conditions are shown in Table 40 and various properties of the obtained high-density hematite particles are shown in Table 41.

Examples 156 to 159 and Reference Examples 50 to 51

<Heat-treatment of acicular hematite particles in alkaline suspension>

The same procedure as defined in Example 1 was conducted except that kind of acicular hematite particles, pH value of slurry, heating temperature and heating time were varied, thereby obtaining acicular hematite particles.

Main production conditions and various properties are shown in Tables 42 and 43.

Examples 160

<Surface coating treatment of acicular hematite particles>

After 700 g of the high-density acicular hematite particles obtained in the Example 156 were roughly pulverized by a Nara mill in advance, the obtained particles were charged into 7 liters of pure water and diagglomerated by a homomixer (manufactured by Tokushu-kika Kogyo, CO., Ltd.) for 60 minutes.

The slurry of the acicular hematite particles obtained was then dispersed for 6 hours at an axial rotation frequency of 2000 rpm while being circulated by a horizontal sand grinder (Dispermat SL, manufactured by S. C. Adichem, Co., Ltd.).

The pH value of the obtained slurry containing the acicular hematite particles was adjusted to 4.0 by using a 0.1 N acetic acid aqueous solution. By adding water to the slurry, the concentration of the resultant slurry was adjusted to 45 g/liter. 10 liter of the slurry was re-heated to 60° C., and 500 ml (equivalent to 3.0% by weight (calculated as Al) based on the acicular hematite particles) of a 1.0 mol/liter aqueous aluminum acetate solution was added to the slurry, and the mixture was held for 30 minutes. Thereafter, the pH value of the mixture was adjusted to 7.1 by using aqueous sodium hydroxide solution. After holding the mixture for 30 minutes, the particles were then filtered out, washed with water, dried and, thereby obtaining acicular hematite particles coated with a hydroxide of aluminum.

The main producing conditions and various properties are shown in Tables 44 and 45.

Examples 161 to 163

Acicular hematite particles coated with a coating material were obtained in the same way as in Example 160 except for varying the kind of acicular hematite particles to be treated, the pH value before coating, the kind and amount of additives, and the final pH value.

The main producing conditions are shown in Table 44 and various properties of the obtained acicular hematite particles are shown in Table 45.

Examples 164 to 171 Comparative Examples 72 to 76 and Reference Examples 52 to 53

<Production of non-magnetic substrate: Formation of non-magnetic undercoat layer on non-magnetic base film>

By using the acicular hematite particles 9 to 13 and the non-magnetic particles obtained in Example 156 to 163 and Reference Examples 50 to 51, non-magnetic undercoat layers were formed in the same way as in Example 2.

The main producing conditions and various properties of the obtained non-magnetic undercoat layers are shown in Table 46.

Examples 172 to 183. Comparative Examples 77 and 81 and Reference examples 54 to 55

<Production of magnetic recording medium: Formation of magnetic coating film>

Magnetic recording media were produced in the same way as in Example 3 except for varying the kind of non-magnetic substrate and the kind of magnetic particles.

The main producing conditions and various properties of the obtained magnetic recording media are shown in Table 47.

<Kind of acicular goethite particles which substantially uniformly contain aluminum within the particle>
Goethite particles 10 to 11:

Acicular goethite particles 10 and 11 as precursors having properties shown in Table 48 were prepared.
Goethite particles 12 to 14:

Acicular goethite particles 12 to 14 which were subjected to a sintering preventing treatment, were obtained in the same way as in Example 12 except for varying the kind of acicular goethite particles as precursors and the element and amount of sintering preventive.

Various properties of the obtained acicular goethite particles are shown in Table 49.

<Heat treatment>
Goethite particles 15 to 18:

Acicular goethite particles 15 to 18 were obtained in the same way as in Example 12 except for varying the kind of starting particles and the heat-treating conditions.

The main producing conditions are shown in Table 50 and various properties of the obtained acicular goethite particles are shown in Table 51.

<Production of low-density acicular hematite particles which substantially uniformly contain aluminum within the particle>
Hematite Particles 14 to 17:

Low-density acicular hematite particles 14 to 17 were obtained in the same way as in Example 12 except for varying the kind of acicular goethite particles as precursors and the heat-dehydrating temperature and time.

The main producing conditions are shown in Table 52 and various properties of the obtained low-density acicular hematite particles are shown in Table 53.

<Production of high-density acicular hematite particles which substantially uniformly contain aluminum within the particle >Hematite particles 18 to 26:

High-density acicular hematite particles were obtained in the same way as in Example 12 except for varying the kind of particles to be treated and the heat-treating temperature and time.

The main producing conditions are shown in Table 54 and various properties of the obtained high-density acicular hematite particles are shown in Table 55.

Examples 184 to 187 and Reference Examples 56 to 457

<Heat-treatment of acicular hematite particles in alkaline suspension>

The same procedure as defined in Example 12 was conducted except that kind of acicular hematite particles, use or non-use of heat-treatment in alkaline suspension, pH value of slurry, heating temperature and heating time were varied, thereby obtaining acicular hematite particles.

Main production conditions and various properties are shown in Tables 56 and 57.

Example 188

<Surface coating treatment of acicular hematite particles>

After 700 g of the high-density acicular hematite particles obtained in the Example 184 were roughly pulverized by a Nara mill in advance, the obtained particles were charged into 7 liters of pure water and diagglomerated by a homo-mixer (manufactured by Tokushu-kika Kogyo, CO., Ltd.) for 60 minutes.

The slurry of the acicular hematite particles obtained was then dispersed for 6 hours at an axial rotation frequency of 2000 rpm while being circulated by a horizontal sand grinder (Dispermat SL, manufactured by S.C. Adichem, CO., Ltd.).

The pH value of the obtained slurry containing the acicular hematite particles was adjusted to 4.0 by using a 0.1 N acetic acid aqueous solution. By adding water to the slurry, the concentration of the resultant slurry was adjusted to 45 g/liter. 10 liter of the slurry was re-heated to 60° C., and 500 ml (equivalent to 3.0% by weight (calculated as Al) based on the acicular hematite particles) of a 1.0 mol/liter aqueous aluminum acetate solution was added to the slurry, and the mixture was held for 30 minutes. Thereafter, the pH value of the mixture was adjusted to 7.0 by using aqueous sodium hydroxide solution. After holding the mixture for 30 minutes, the particles were then filtered out, washed with water, dried and, thereby obtaining acicular hematite particles coated with a hydroxide of aluminum.

The main producing conditions and various properties are shown in Tables 58 and 59.

Examples 189 to 191

Acicular hematite particles coated with a coating material were obtained in the same way as in Example 188 except for varying the kind of particles to be treated, the pH value before coating, the kind and amount of additives, and the final pH value.

The main producing conditions are shown in Table 58 and various properties of the obtained acicular hematite particles are shown in Table 59.

Example 192 to 199. Comparative Examples 82 to 986 and Reference examples 58 to 59

<Production of non-magnetic substrate: Formation of non-magnetic undercoat layer on non-magnetic base film>

By using the acicular hematite particles 22 to 26 and the non-magnetic particles obtained in Example 184 to 191, and Reference Examples 56 to 57, non-magnetic undercoat layers were formed in the same way as in Example 2.

The main producing conditions and various properties of the obtained non-magnetic undercoat layers are shown in Table 60.

Examples 200 to 211. Comparative Examples 87 and 91 and Reference examples 60 to 61

<Production of magnetic recording medium: Formation of magnetic coating film>

Magnetic recording media were produced in the same way as in Example 3 except for varying the kind of non-magnetic substrate and the kind of magnetic particles.

The main producing conditions and various properties of the obtained magnetic recording media are shown in Table 61.

TABLE 1

| | Properties of acicular goethite particles | | |
|---|---|---|---|
| Kind of Precursor | Production method of acicular goethite particles | Average major axial diameter ($\mu$m) | Geometrical standard deviation of major axial diameter (-) |
| Precursor 1 | (B) | 0.181 | 1.32 |
| Precursor 2 | (C) | 0.230 | 1.31 |
| Precursor 3 | (D) | 0.251 | 1.28 |
| Precursor 4 | (A) | 0.200 | 1.36 |
| Precursor 5 | (E) | 0.160 | 1.35 |
| Precursor 6 | (F) | 0.271 | 1.32 |

| | Properties of acicular goethite particles | | |
|---|---|---|---|
| Kind of Precursor | Average minor axial diameter ($\mu$m) | Geometrical standard deviation of minor axial diameter (-) | Aspect ratio (-) |
| Precursor 1 | 0.0229 | 1.38 | 7.9:1 |
| Precursor 2 | 0.0277 | 1.37 | 8.3:1 |
| Precursor 3 | 0.0285 | 1.38 | 8.8:1 |
| Precursor 4 | 0.0225 | 1.40 | 8.9:1 |
| Precursor 5 | 0.0210 | 1.38 | 7.6:1 |
| Precursor 6 | 0.0319 | 1.38 | 8.5:1 |

| | Properties of acicular goethite particles | | |
|---|---|---|---|
| Kind of Precursor | BET specific surface area (m$^2$/g) | Soluble sodium salt (calculated as Na) (ppm) | Soluble sulfate (calculated as SO$_4$) (ppm) | pH value (-) |
| Precursor 1 | 138.2 | 678 | 387 | 6.8 |
| Precursor 2 | 98.6 | 412 | 1,234 | 5.3 |
| Precursor 3 | 86.1 | 612 | 823 | 6.3 |
| Precursor 4 | 81.8 | 986 | 343 | 8.2 |
| Precursor 5 | 163.8 | 789 | 546 | 6.6 |
| Precursor 6 | 65.1 | 423 | 751 | 6.0 |

TABLE 2

| Examples and Comparative Examples | Kind of acicular goethite particles | Anti-sintering treatment Kind | Calculated as | Amount added (wt %) |
|---|---|---|---|---|
| Example 16 | Particles obtained in Example 1 | Water glass #3 | $SiO_2$ | 1.0 |
| Example 17 | Precursor 1 | Water glass #3 Phosphoric acid | $SiO_2$ P | 2.0 1.0 |
| Example 18 | Precursor 2 | Phosphoric acid | P | 2.5 |
| Example 19 | Precursor 3 | Sodium hexa-metaphosphate | P | 1.8 |
| Example 20 | Precursor 4 | Water glass #3 | $SiO_2$ | 3.0 |
| Example 21 | Precursor 5 | Sodium hexa-metaphosphate | P | 1.0 |
| Example 22 | Precursor 6 | Water glass #3 Phosphoric acid | $SiO_2$ P | 3.5 1.5 |
| Comparative Example 1 | Particles obtained in Example 1 | — | — | — |
| Comparative Example 2 | Particles obtained in Example 1 | — | — | — |
| Comparative Example 3 | Particles obtained in Example 1 | Water glass #3 | $SiO_2$ | 1.0 |
| Comparative Example 4 | Particles obtained in Example 1 | Phosphoric acid | P | 1.0 |
| Comparative Example 5 | Particles obtained in Example 1 | Phosphoric acid | P | 1.5 |
| Comparative Example 6 | Precursor 6 | Water glass #3 | $SiO_2$ | 1.5 |

| Examples and Comparative Examples | Heat-dehydration Temperature (° C.) | Time (min) |
|---|---|---|
| Example 16 | 330 | 60 |
| Example 17 | 360 | 30 |
| Example 18 | 340 | 60 |
| Example 19 | 310 | 120 |
| Example 20 | 360 | 75 |
| Example 21 | 330 | 90 |
| Example 22 | 380 | 60 |
| Comparative Example 1 | 310 | 60 |
| Comparative Example 2 | 340 | 30 |
| Comparative Example 3 | 320 | 60 |
| Comparative Example 4 | — | — |
| Comparative Example 5 | 350 | 60 |
| Comparative Example 6 | 330 | 60 |

TABLE 3

| Examples and Comparative Examples | Properties of low-density acicular hematite particles | | | |
|---|---|---|---|---|
| | Average major axial diameter (μm) | Geometrical standard deviation of major axial diameter (−) | Average minor axial diameter (μm) | Geometrical standard deviation of minor axial diameter (−) |
| Example 16 | 0.142 | 1.37 | 0.0192 | 1.38 |
| Example 17 | 0.153 | 1.35 | 0.0196 | 1.38 |
| Example 18 | 0.199 | 1.34 | 0.0246 | 1.38 |
| Example 19 | 0.213 | 1.31 | 0.0250 | 1.38 |
| Example 20 | 0.168 | 1.39 | 0.0195 | 1.41 |
| Example 21 | 0.126 | 1.36 | 0.0172 | 1.37 |
| Example 22 | 0.230 | 1.35 | 0.0291 | 1.39 |
| Comparative Example 1 | 0.139 | 1.37 | 0.0194 | 1.38 |
| Comparative Example 2 | 0.138 | 1.37 | 0.0197 | 1.38 |
| Comparative Example 3 | 0.141 | 1.36 | 0.0191 | 1.38 |
| Comparative Example 4 | — | — | — | — |
| Comparative Example 5 | 0.142 | 1.37 | 0.0191 | 1.38 |
| Comparative Example 6 | 0.230 | 1.35 | 0.0291 | 1.38 |

| Examples and Comparative Examples | Properties of low-density acicular hematite particles | | | |
|---|---|---|---|---|
| | Aspect ratio (−) | $S_{BET}$ ($m^2/g$) | $S_{TEM}$ ($m^2/g$) | $S_{BET}/S_{TEM}$ value (−) |
| Example 16 | 7.4:1 | 151.6 | 42.8 | 3.54 |
| Example 17 | 7.8:1 | 179.4 | 41.8 | 4.30 |
| Example 18 | 8.1:1 | 143.0 | 33.2 | 4.31 |
| Example 19 | 8.5:1 | 123.7 | 32.6 | 3.80 |
| Example 20 | 8.6:1 | 143.7 | 41.7 | 3.44 |
| Example 21 | 7.3:1 | 196.6 | 47.8 | 4.12 |
| Example 22 | 7.9:1 | 110.5 | 28.1 | 3.93 |
| Comparative Example 1 | 7.2:1 | 146.8 | 42.4 | 3.46 |
| Comparative Example 2 | 7.0:1 | 130.6 | 41.8 | 3.12 |
| Comparative Example 3 | 7.4:1 | 168.6 | 43.0 | 3.92 |
| Comparative Example 4 | — | — | — | — |
| Comparative Example 5 | 7.4:1 | 163.2 | 43.0 | 3.80 |
| Comparative Example 6 | 7.9:1 | 91.2 | 28.1 | 3.24 |

| Examples and Comparative Examples | Properties of low-density acicular hematite particles | | | | |
|---|---|---|---|---|---|
| | Amount of sintering preventive | | Soluble sodium salt (calculated as Na) (ppm) | Soluble sulfate (calculated as $SO_4$) (ppm) | pH value (−) |
| | Calculated as | Content (wt %) | | | |
| Example 16 | $SiO_2$ | 1.09 | 1,653 | 925 | 6.0 |
| Example 17 | $SiO_2$ P | 2.77 1.07 | 1,561 | 1,110 | 5.9 |
| Example 18 | P | 2.73 | 1,356 | 1,610 | 6.1 |
| Example 19 | P | 1.95 | 1,282 | 1,583 | 6.6 |
| Example 20 | $SiO_2$ | 3.21 | 2,582 | 632 | 7.8 |
| Example 21 | P | 1.10 | 1,376 | 652 | 5.6 |
| Example 22 | $SiO_2$ P | 3.81 1.64 | 1,168 | 3,265 | 4.8 |
| Comparative Example 1 | — | — | 726 | 586 | 5.7 |
| Comparative Example 2 | — | — | 832 | 612 | 5.6 |
| Comparative Example 3 | $SiO_2$ | 1.09 | 1,231 | 1,010 | 5.8 |
| Comparative Example 4 | — | — | 2,663 | 713 | 7.5 |
| Comparative Example 5 | P | 1.64 | 1,183 | 1,121 | 6.1 |
| Comparative Example 6 | $SiO_2$ | 1.63 | 1,216 | 892 | 6.4 |

TABLE 4

| Examples and Comparative Examples | Kind of low-density acicular hematite particles | Heat treatment for high densification Temperature (° C.) | Time (min) |
|---|---|---|---|
| Example 23 | Example 16 | 680 | 60 |
| Example 24 | Example 17 | 690 | 30 |
| Example 25 | Example 18 | 720 | 20 |
| Example 26 | Example 19 | 660 | 60 |
| Example 27 | Example 20 | 640 | 30 |
| Example 28 | Example 21 | 680 | 60 |
| Example 29 | Example 22 | 730 | 30 |
| Comparative Example 7 | Comparative Example 2 | 680 | 20 |
| Comparative Example 8 | Comparative Example 4 | 670 | 30 |
| Comparative Example 9 | Comparative Example 5 | 450 | 60 |
| Comparative Example 10 | Comparative Example 6 | 850 | 20 |
| Comparative Example 11 | Comparative Example 6 | 680 | 30 |

TABLE 5

| Examples and Comparative Examples | Properties of high-density acicular hematite particles | | | |
|---|---|---|---|---|
| | Average major axial diameter ($\mu$m) | Geometrical standard deviation of major axial diameter (–) | Average minor axial diameter ($\mu$m) | Geometrical standard deviation of minor axial diameter (–) |
| Example 23 | 0.136 | 1.37 | 0.0195 | 1.39 |
| Example 24 | 0.152 | 1.36 | 0.0200 | 1.38 |
| Example 25 | 0.197 | 1.35 | 0.0249 | 1.39 |
| Example 26 | 0.211 | 1.33 | 0.0252 | 1.38 |
| Example 27 | 0.166 | 1.41 | 0.0195 | 1.42 |
| Example 28 | 0.126 | 1.36 | 0.0173 | 1.38 |
| Example 29 | 0.231 | 1.36 | 0.0296 | 1.40 |
| Comparative Example 7 | 0.070 | 1.83 | 0.0330 | 1.68 |
| Comparative Example 8 | 0.126 | 1.64 | 0.0228 | 1.61 |
| Comparative Example 9 | 0.142 | 1.37 | 0.0191 | 1.39 |
| Comparative Example 10 | 0.100 | 1.71 | 0.0263 | 1.38 |
| Comparative Example 11 | 0.229 | 1.36 | 0.0292 | 1.38 |

| Examples and Comparative Examples | Properties of high-density acicular hematite particles | | | |
|---|---|---|---|---|
| | Aspect ratio (–) | $S_{BET}$ (m$^2$/g) | $S_{TEM}$ (m$^2$/g) | $S_{BET}/S_{TEM}$ value (–) |
| Example 23 | 7.0:1 | 50.4 | 42.3 | 1.19 |
| Example 24 | 7.6:1 | 52.5 | 41.0 | 1.28 |
| Example 25 | 7.9:1 | 41.4 | 32.8 | 1.26 |
| Example 26 | 8.4:1 | 41.4 | 32.3 | 1.28 |
| Example 27 | 8.5:1 | 53.6 | 41.8 | 1.28 |
| Example 28 | 7.3:1 | 55.1 | 47.5 | 1.16 |
| Example 29 | 7.8:1 | 42.9 | 27.7 | 1.55 |
| Comparative Example 7 | 2.1:1 | 14.6 | 28.8 | 0.51 |
| Comparative Example 8 | 5.5:1 | 26.7 | 36.8 | 0.73 |
| Comparative Example 9 | 7.4:1 | 111.6 | 43.0 | 2.60 |
| Comparative Example 10 | 3.8:1 | 25.6 | 33.1 | 0.77 |
| Comparative Example 11 | 7.8:1 | 41.3 | 28.0 | 1.47 |

| Examples and Comparative Examples | Properties of high-density acicular hematite particles | | | | |
|---|---|---|---|---|---|
| | Amount of sintering preventive | | Soluble sodium salt (calculated as Na) (ppm) | Soluble sulfate (calculated as SO$_4$) (ppm) | pH value (–) |
| | Calculated as | Content (wt %) | | | |
| Example 23 | SiO$_2$ | 1.08 | 2,382 | 2,652 | 5.5 |
| Example 24 | SiO$_2$ P | 2.76 1.07 | 2,265 | 2,783 | 4.9 |
| Example 25 | P | 2.73 | 1,982 | 3,326 | 5.6 |
| Example 26 | P | 1.95 | 1,765 | 3,273 | 5.1 |
| Example 27 | SiO$_2$ | 3.22 | 3,039 | 1,076 | 7.5 |
| Example 28 | P | 1.11 | 2,162 | 2,765 | 4.6 |
| Example 29 | SiO$_2$ P | 3.82 1.65 | 1,963 | 2,838 | 4.3 |
| Comparative Example 7 | — | — | 1,365 | 1,863 | 5.8 |
| Comparative Example 8 | — | — | 1,462 | 1,921 | 6.1 |
| Comparative Example 9 | P | 1.64 | 1,763 | 2,563 | 5.1 |
| Comparative Example 10 | SiO$_2$ | 1.63 | 2,762 | 3,362 | 4.8 |
| Comparative Example 11 | SiO$_2$ | 1.64 | 2,562 | 2,863 | 5.5 |

TABLE 6

| Examples and Comparative Examples | Kind of high-density acicular hematite particles | Wet-pulverization | |
|---|---|---|---|
| | | Use or non-use | Residue on sieve (wt %) |
| Example 30 | Example 23 | used | 0 |
| Example 31 | Example 24 | used | 0 |
| Example 32 | Example 25 | used | 0 |
| Example 33 | Example 26 | used | 0 |
| Example 34 | Example 27 | used | 0 |
| Example 35 | Example 28 | used | 0 |
| Example 36 | Example 29 | used | 0 |
| Comparative Example 12 | Particles obtained in Example 1 | used | 0 |
| Comparative Example 13 | Comparative Example 11 | used | 0 |

| Examples and Comparative Examples | Acid-dissolving treatment | | | | |
|---|---|---|---|---|---|
| | Kind of acid | Concentration (N) | Temperature (° C.) | Time (Hr) | pH value (–) |
| Example 30 | Sulfuric acid | 1.4 | 90 | 3.0 | 0.68 |
| Example 31 | Sulfuric acid | 1.5 | 85 | 5.5 | 0.56 |
| Example 32 | Sulfuric acid | 2.0 | 90 | 5.0 | 0.32 |
| Example 33 | Sulfuric acid | 1.5 | 75 | 7.0 | 0.74 |
| Example 34 | Sulfuric acid | 1.2 | 70 | 2.0 | 0.81 |
| Example 35 | Sulfuric acid | 1.3 | 90 | 1.0 | 0.91 |
| Example 36 | Sulfuric acid | 1.5 | 85 | 8.0 | 0.70 |
| Comparative Example 12 | Sulfuric acid | 3.2E–05 | 80 | 5.0 | 4.5 |

TABLE 6-continued

| | | | | | |
|---|---|---|---|---|---|
| Comparative Example 13 | Sulfuric acid | 3.8E−04 | 80 | 7.0 | 3.8 |

TABLE 7

Properties of acicular hematite particles washed with water after acid-dissolving treatment

| Examples and Comparative Examples | Average major axial diameter (μm) | Geometrical standard deviation of major axial diameter (−) | Average minor axial diameter (μm) | Geometrical standard deviation of minor axial diameter (−) |
|---|---|---|---|---|
| Example 30 | 0.130 | 1.34 | 0.0188 | 1.33 |
| Example 31 | 0.143 | 1.32 | 0.0181 | 1.32 |
| Example 32 | 0.175 | 1.31 | 0.0216 | 1.33 |
| Example 33 | 0.200 | 1.31 | 0.0235 | 1.31 |
| Example 34 | 0.164 | 1.39 | 0.0193 | 1.34 |
| Example 35 | 0.126 | 1.35 | 0.0173 | 1.32 |
| Example 36 | 0.193 | 1.32 | 0.0238 | 1.34 |
| Comparative Example 12 | 0.136 | 1.37 | 0.0195 | 1.38 |
| Comparative Example 13 | 0.230 | 1.36 | 0.0296 | 1.38 |

Properties of acicular hematite particles washed with water after acid-dissolving treatment

| Examples and Comparative Examples | Aspect ratio (−) | Amount dissolved (wt %) | $S_{BET}$ (m²/g) | $S_{TEM}$ (m²/g) | $S_{BET}/S_{TEM}$ value (−) |
|---|---|---|---|---|---|
| Example 30 | 6.9:1 | 26.5 | 55.4 | 43.9 | 1.26 |
| Example 31 | 7.9:1 | 35.6 | 58.1 | 45.2 | 1.29 |
| Example 32 | 8.1:1 | 41.2 | 46.6 | 37.8 | 1.23 |
| Example 33 | 8.5:1 | 21.6 | 43.2 | 34.7 | 1.25 |
| Example 34 | 8.5:1 | 10.2 | 57.8 | 42.2 | 1.37 |
| Example 35 | 7.3:1 | 6.8 | 56.2 | 47.5 | 1.18 |
| Example 36 | 8.1:1 | 49.6 | 46.6 | 34.3 | 1.36 |
| Comparative Example 12 | 7.0:1 | 0.3 | 51.0 | 42.3 | 1.21 |
| Comparative Example 13 | 7.8:1 | 1.2 | 41.8 | 27.7 | 1.51 |

Properties of acicular hematite particles washed with water after acid-dissolving treatment

| Examples and Comparative Examples | Soluble sodium salt (calculated as Na) (ppm) | Soluble sulfate (calculated as SO₄) (ppm) | pH value (−) |
|---|---|---|---|
| Example 30 | 126 | 326 | 4.6 |
| Example 31 | 141 | 412 | 5.3 |
| Example 32 | 98 | 512 | 5.1 |
| Example 33 | 121 | 286 | 5.3 |
| Example 34 | 68 | 211 | 5.1 |
| Example 35 | 111 | 268 | 4.6 |
| Example 36 | 123 | 312 | 4.5 |
| Comparative Example 12 | 368 | 512 | 5.0 |
| Comparative Example 13 | 346 | 536 | 4.8 |

TABLE 8

| Examples and Reference Examples | Kind of acicular hematite particles subjected to acid-dissolving treatment | Heat treatment in aqueous alkali solution pH value (−) | Temperature (° C.) | Time (min) |
|---|---|---|---|---|
| Example 37 | Example 30 | 13.5 | 90 | 180 |
| Example 38 | Example 31 | 13.8 | 85 | 120 |
| Example 39 | Example 32 | 13.1 | 95 | 180 |
| Example 40 | Example 33 | 13.5 | 98 | 240 |
| Example 41 | Example 34 | 13.3 | 80 | 120 |
| Example 42 | Example 35 | 13.5 | 90 | 300 |
| Example 43 | Example 36 | 13.6 | 85 | 90 |
| Reference Example 1 | Example 30 | 9.5 | 90 | 180 |
| Reference Example 2 | Example 30 | 13.1 | 45 | 180 |

TABLE 9

Properties of acicular hematite particles washed with water after heat-treatment in aqueous alkali solution

| Examples and Reference Examples | Average major axial diameter (μm) | Geometrical standard deviation of major axial diameter (−) | Average minor axial diameter (μm) | Geometrical standard deviation of minor axial diameter (−) |
|---|---|---|---|---|
| Example 37 | 0.130 | 1.34 | 0.0188 | 1.33 |
| Example 38 | 0.143 | 1.33 | 0.0180 | 1.32 |
| Example 39 | 0.174 | 1.31 | 0.0216 | 1.33 |
| Example 40 | 0.201 | 1.31 | 0.0235 | 1.31 |
| Example 41 | 0.163 | 1.38 | 0.0192 | 1.34 |
| Example 42 | 0.126 | 1.35 | 0.0173 | 1.33 |
| Example 43 | 0.194 | 1.32 | 0.0238 | 1.33 |
| Reference Example 1 | 0.130 | 1.34 | 0.0188 | 1.38 |
| Reference Example 2 | 0.130 | 1.34 | 0.0188 | 1.39 |

Properties of acicular hematite particles washed with water after heat-treatment in aqueous alkali solution

| Examples and Reference Examples | Aspect ratio (−) | $S_{BET}$ (m²/g) | $S_{TEM}$ (m²/g) | $S_{BET}/S_{TEM}$ value (−) |
|---|---|---|---|---|
| Example 37 | 6.9:1 | 55.2 | 43.9 | 1.26 |
| Example 38 | 7.9:1 | 58.3 | 45.4 | 1.28 |
| Example 39 | 8.1:1 | 46.7 | 37.8 | 1.23 |
| Example 40 | 8.6:1 | 43.4 | 34.6 | 1.25 |
| Example 41 | 8.5:1 | 58.1 | 42.4 | 1.37 |
| Example 42 | 7.3:1 | 56.6 | 47.5 | 1.19 |
| Example 43 | 8.2:1 | 47.0 | 34.3 | 1.37 |
| Reference Example 1 | 6.9:1 | 55.5 | 43.9 | 1.26 |
| Reference Example 2 | 6.9:1 | 55.6 | 43.9 | 1.27 |

Properties of acicular hematite particles washed with water after heat-treatment in aqueous alkali solution

| Examples and Reference Examples | Soluble sodium salt (calculated as Na) (ppm) | Soluble sulfate (calculated as SO₄) (ppm) | pH value (−) |
|---|---|---|---|
| Example 37 | 116 | 13 | 9.1 |
| Example 38 | 98 | 6 | 9.3 |
| Example 39 | 86 | 12 | 8.9 |
| Example 40 | 68 | 31 | 8.7 |
| Example 41 | 72 | 1 | 9.3 |
| Example 42 | 96 | 3 | 9.0 |

TABLE 9-continued

| | | | |
|---|---|---|---|
| Example 43 | 121 | 10 | 9.5 |
| Reference Example 1 | 116 | 286 | 7.6 |
| Reference Example 2 | 106 | 182 | 7.8 |

TABLE 10

| | Surface treatment | | |
|---|---|---|---|
| Examples | Kind of acicular hematite particles heat-treated in aqueous alkali solution | Kind of surface treatment material | Amount added (calculated as Al or $SiO_2$) (wt %) |
| Example 44 | Example 37 | Sodium aluminate | 1.0 |
| Example 45 | Example 38 | Water glass #3 | 0.5 |
| Example 46 | Example 39 | Aluminum sulfate | 2.0 |
| | | Water glass #3 | 1.0 |
| Example 47 | Example 40 | Aluminum acetate | 5.0 |
| Example 48 | Example 41 | Sodium aluminate | 1.0 |
| | | Colloidal silica | 1.5 |
| Example 49 | Example 42 | Colloidal silica | 3.0 |
| Example 50 | Example 43 | Sodium aluminate | 12.0 |

| | Coating material | |
|---|---|---|
| Examples | Kind* | Coating amount (calculated as Al or $SiO_2$) (wt %) |
| Example 44 | A | 0.99 |
| Example 45 | S | 0.49 |
| Example 46 | A | 1.95 |
| | S | 0.98 |
| Example 47 | A | 4.78 |
| Example 48 | A | 0.98 |
| | S | 1.47 |
| Example 49 | S | 2.90 |
| Example 50 | A | 10.75 |

Note
*"A" represents a hydroxide of aluminum.
"S" represents an oxide of silicon.

TABLE 11

| | Properties of acicular hematite particles washed with water after surface treatment | | | |
|---|---|---|---|---|
| Examples | Average major axial diameter ($\mu$m) | Geometrical standard deviation of major axial diameter (-) | Average minor axial diameter ($\mu$m) | Geometrical standard deviation of minor axial diameter (-) |
| Example 44 | 0.130 | 1.34 | 0.0189 | 1.33 |
| Example 45 | 0.143 | 1.33 | 0.0180 | 1.32 |
| Example 46 | 0.174 | 1.31 | 0.0216 | 1.33 |
| Example 47 | 0.200 | 1.31 | 0.0235 | 1.31 |
| Example 48 | 0.164 | 1.38 | 0.0192 | 1.34 |
| Example 49 | 0.126 | 1.35 | 0.0173 | 1.33 |
| Example 50 | 0.194 | 1.32 | 0.0239 | 1.32 |

TABLE 11-continued

| | Properties of acicular hematite particles washed with water after surface treatment | | | |
|---|---|---|---|---|
| Examples | Aspect ratio (-) | $S_{BET}$ ($m^2/g$) | $S_{TEM}$ ($m^2/g$) | $S_{BET}/S_{TEM}$ value (-) |
| Example 44 | 6.9:1 | 55.8 | 43.7 | 1.28 |
| Example 45 | 7.9:1 | 58.0 | 45.4 | 1.28 |
| Example 46 | 8.1:1 | 47.0 | 37.8 | 1.24 |
| Example 47 | 8.5:1 | 43.5 | 34.7 | 1.26 |
| Example 48 | 8.5:1 | 57.9 | 42.4 | 1.37 |
| Example 49 | 7.3:1 | 56.0 | 47.5 | 1.18 |
| Example 50 | 8.1:1 | 45.5 | 34.2 | 1.33 |

| | Properties of acicular hematite particles washed with water after surface treatment | | |
|---|---|---|---|
| Examples | Soluble sodium salt (calculated as Na) (ppm) | Soluble sulfate (calculated as $SO_4$) (ppm) | pH value (-) |
| Example 44 | 86 | 2 | 9.3 |
| Example 45 | 63 | 3 | 9.1 |
| Example 46 | 52 | 5 | 8.9 |
| Example 47 | 32 | 8 | 9.0 |
| Example 48 | 16 | 10 | 8.8 |
| Example 49 | 72 | 12 | 9.1 |
| Example 50 | 68 | 6 | 9.4 |

TABLE 12

| | Production of non-magnetic coating composition | | Non-magnetic coating composition Viscosity (cP) |
|---|---|---|---|
| Examples | Kind of acicular hematite particles | Weight ratio of particles to resin (-) | |
| Example 51 | Example 37 | 5.0 | 358 |
| Example 52 | Example 38 | 5.0 | 384 |
| Example 53 | Example 39 | 5.0 | 384 |
| Example 54 | Example 40 | 5.0 | 205 |
| Example 55 | Example 41 | 5.0 | 358 |
| Example 56 | Example 42 | 5.0 | 435 |
| Example 57 | Example 43 | 5.0 | 333 |
| Example 58 | Example 44 | 5.0 | 333 |
| Example 59 | Example 45 | 5.0 | 310 |
| Example 60 | Example 46 | 5.0 | 384 |
| Example 61 | Example 47 | 5.0 | 230 |
| Example 62 | Example 48 | 5.0 | 218 |
| Example 63 | Example 49 | 5.0 | 192 |
| Example 64 | Example 50 | 5.0 | 179 |

| | Properties of non-magnetic undercoat layer | | | |
|---|---|---|---|---|
| Examples | Thickness ($\mu$m) | Gloss (%) | Surface roughness Ra (nm) | Young's modulus (relative value) |
| Example 51 | 3.5 | 210 | 6.4 | 122 |
| Example 52 | 3.5 | 198 | 6.8 | 121 |
| Example 53 | 3.5 | 206 | 6.4 | 126 |
| Example 54 | 3.3 | 201 | 6.8 | 131 |
| Example 55 | 3.4 | 215 | 6.0 | 124 |
| Example 56 | 3.5 | 218 | 5.6 | 122 |
| Example 57 | 3.5 | 215 | 5.7 | 133 |
| Example 58 | 3.4 | 211 | 5.6 | 125 |
| Example 59 | 3.3 | 206 | 6.0 | 126 |
| Example 60 | 3.4 | 210 | 6.2 | 129 |
| Example 61 | 3.3 | 209 | 6.8 | 139 |
| Example 62 | 3.5 | 219 | 6.3 | 128 |

TABLE 12-continued

| Example 63 | 3.5 | 223 | 5.0 | 124 |
|---|---|---|---|---|
| Example 64 | 3.5 | 218 | 6.8 | 136 |

TABLE 13

| Comparative Examples and Reference Examples | Production of non-magnetic coating composition | | Non-magnetic coating composition Viscosity (cP) |
|---|---|---|---|
| | Kind of acicular hematite particles | Weight ratio of particles to resin (−) | |
| Comparative Example 14 | Comparative Example 1 | 5.0 | 8,320 |
| Comparative Example 15 | Comparative Example 3 | 5.0 | 10,880 |
| Comparative Example 16 | Comparative Example 7 | 5.0 | 435 |
| Comparative Example 17 | Comparative Example 8 | 5.0 | 563 |
| Comparative Example 18 | Comparative Example 9 | 5.0 | 5,760 |
| Comparative Example 19 | Comparative Example 10 | 5.0 | 230 |
| Comparative Example 20 | Comparative Example 11 | 5.0 | 384 |
| Comparative Example 21 | Comparative Example 12 | 5.0 | 435 |
| Comparative Example 22 | Comparative Example 13 | 5.0 | 410 |
| Reference Example 3 | Example 30 | 5.0 | 384 |
| Reference Example 4 | Example 31 | 5.0 | 410 |
| Reference Example 5 | Example 32 | 5.0 | 435 |
| Reference Example 6 | Example 33 | 5.0 | 205 |
| Reference Example 7 | Example 34 | 5.0 | 384 |
| Reference Example 8 | Example 35 | 5.0 | 358 |
| Reference Example 9 | Example 36 | 5.0 | 410 |
| Reference Example 10 | Reference Example 1 | 5.0 | 384 |
| Reference Example 11 | Reference Example 2 | 5.0 | 358 |

| Comparative Examples and Reference Examples | Properties of non-magnetic undercoat layer | | | |
|---|---|---|---|---|
| | Thickness (μm) | Gloss (%) | Surface roughness Ra (nm) | Young's modulus (relative value) |
| Comparative Example 14 | 3.6 | 128 | 21.6 | 108 |
| Comparative Example 15 | 3.8 | 86 | 42.6 | 96 |
| Comparative Example 16 | 3.5 | 141 | 19.8 | 109 |
| Comparative Example 17 | 3.5 | 176 | 12.4 | 113 |
| Comparative Example 18 | 3.6 | 121 | 27.6 | 105 |
| Comparative Example 19 | 3.5 | 159 | 16.6 | 109 |
| Comparative Example 20 | 3.4 | 186 | 9.6 | 116 |
| Comparative Example 21 | 3.5 | 188 | 9.3 | 118 |
| Comparative Example 22 | 3.5 | 176 | 13.1 | 115 |
| Reference Example 3 | 3.5 | 203 | 6.8 | 121 |
| Reference Example 4 | 3.4 | 193 | 7.0 | 122 |
| Reference Example 5 | 3.3 | 201 | 6.8 | 125 |
| Reference Example 6 | 3.4 | 196 | 7.6 | 135 |
| Reference Example 7 | 3.3 | 211 | 6.4 | 123 |
| Reference Example 8 | 3.5 | 216 | 5.8 | 121 |
| Reference Example 9 | 3.4 | 209 | 6.1 | 131 |
| Reference Example 10 | 3.5 | 204 | 6.8 | 121 |
| Reference Example 11 | 3.5 | 206 | 6.6 | 121 |

TABLE 14

| Kind of magnetic particles | Properties of acicular magnetic metal particles containing iron as main component | | | |
|---|---|---|---|---|
| | Average major axial diameter (μm) | Average minor axial diameter (μm) | Geometrical standard deviation of major axial diameter (−) | Aspect ratio (−) |
| Magnetic metal particles (a) | 0.110 | 0.0150 | 1.36 | 7.3:1 |
| Magnetic metal particles (b) | 0.098 | 0.0134 | 1.35 | 7.3:1 |
| Magnetic metal particles (c) | 0.101 | 0.0144 | 1.38 | 7.0:1 |
| Magnetic metal particles (d) | 0.125 | 0.0184 | 1.35 | 6.8:1 |
| Magnetic metal particles (e) | 0.127 | 0.0177 | 1.39 | 7.2:1 |
| Magnetic metal particles (f) | 0.105 | 0.0148 | 1.36 | 7.1:1 |

| Kind of magnetic particles | Properties of acicular magnetic metal particles containing iron as main component | | |
|---|---|---|---|
| | Coercive force (Hc) (Oe) | Saturation magnetization (emu/g) | pH value (−) |
| Magnetic metal particles (a) | 1,915 | 131.6 | 9.5 |
| Magnetic metal particles (b) | 1,938 | 130.5 | 10.1 |
| Magnetic metal particles (c) | 2,065 | 128.9 | 10.0 |
| Magnetic metal particles (d) | 1,896 | 130.8 | 9.8 |
| Magnetic metal particles (e) | 1,915 | 135.6 | 9.5 |
| Magnetic metal particles (f) | 1,680 | 128.3 | 9.9 |

| Kind of magnetic particles | Properties of acicular magnetic metal particles containing iron as main component Content of Al | | |
|---|---|---|---|
| | Central Portion (wt %) | Surface portion (wt %) | Surface coating layer (wt %) |
| Magnetic metal particles (a) | 2.61 | 1.36 | 0.01 |
| Magnetic metal particles (b) | 1.32 | 2.84 | 0.01 |
| Magnetic metal | 1.38 | 2.65 | 0.78 |

TABLE 14-continued

| | | | |
|---|---|---|---|
| particles (c) | | | |
| Magnetic metal particles (d) | 0.01 | 0.01 | 0.01 |
| Magnetic metal particles (e) | 0.01 | 0.01 | 0.01 |
| Magnetic metal particles (f) | 0.01 | 0.01 | 0.01 |

| Kind of magnetic particles | Properties of acicular magnetic metal particles containing iron as main component | |
|---|---|---|
| | Content of Nd (wt %) | Resin adsorption (%) |
| Magnetic metal particles (a) | 0.01 | 72.5 |
| Magnetic metal particles (b) | 0.36 | 80.1 |
| Magnetic metal particles (c) | 2.78 | 83.6 |
| Magnetic metal particles (d) | 0.01 | 57.6 |
| Magnetic metal particles (e) | 0.01 | 56.5 |
| Magnetic metal particles (f) | 0.01 | 58.1 |

TABLE 15

Production of magnetic recording medium

| Examples | Kind of non-magnetic substrate | Kind of magnetic particles | Weight ratio of particles to resin (—) |
|---|---|---|---|
| Example 65 | Example 51 | Particles used in Example 3 | 5.0 |
| Example 66 | Example 52 | Magnetic metal particles (e) | 5.0 |
| Example 67 | Example 53 | Magnetic metal particles (e) | 5.0 |
| Example 68 | Example 54 | Magnetic metal particles (e) | 5.0 |
| Example 69 | Example 55 | Magnetic metal particles (f) | 5.0 |
| Example 70 | Example 56 | Magnetic metal particles (f) | 5.0 |
| Example 71 | Example 57 | Magnetic metal particles (f) | 5.0 |
| Example 72 | Example 58 | Particles used in Example 3 | 5.0 |
| Example 73 | Example 59 | Magnetic metal particles (e) | 5.0 |
| Example 74 | Example 60 | Magnetic metal particles (e) | 5.0 |
| Example 75 | Example 61 | Magnetic metal particles (e) | 5.0 |
| Example 76 | Example 62 | Magnetic metal particles (f) | 5.0 |
| Example 77 | Example 63 | Magnetic metal particles (f) | 5.0 |
| Example 78 | Example 64 | Magnetic metal particles (f) | 5.0 |

Properties of magnetic recording medium

| Examples | Thickness of magnetic layer ($\mu$m) | Coercive force (Hc) (Oe) | Br/Bm value (—) | Gloss (%) |
|---|---|---|---|---|
| Example 65 | 1.1 | 1,975 | 0.87 | 225 |
| Example 66 | 1.1 | 1,986 | 0.87 | 219 |
| Example 67 | 1.1 | 1,990 | 0.88 | 221 |
| Example 68 | 1.0 | 1,982 | 0.88 | 215 |
| Example 69 | 1.1 | 1,781 | 0.88 | 238 |
| Example 70 | 1.0 | 1,785 | 0.88 | 241 |
| Example 71 | 1.1 | 1,780 | 0.89 | 231 |
| Example 72 | 1.0 | 1,978 | 0.88 | 231 |
| Example 73 | 1.1 | 1,980 | 0.87 | 230 |
| Example 74 | 1.0 | 1,983 | 0.87 | 228 |
| Example 75 | 1.1 | 1,991 | 0.88 | 233 |
| Example 76 | 1.0 | 1,780 | 0.89 | 240 |
| Example 77 | 1.1 | 1,778 | 0.89 | 243 |
| Example 78 | 1.0 | 1,785 | 0.89 | 246 |

Properties of magnetic recording medium

| Examples | Surface roughness Ra (nm) | Young's modulus (relative value) | Linear absorption coefficient ($\mu$m$^{-1}$) | Corrosion resistance Percentage of change in coercive force (%) | Percentage of change in Bm (%) |
|---|---|---|---|---|---|
| Example 65 | 6.2 | 124 | 1.22 | 4.6 | 4.2 |
| Example 66 | 7.0 | 126 | 1.24 | 3.8 | 4.2 |
| Example 67 | 6.6 | 125 | 1.25 | 3.2 | 3.9 |
| Example 68 | 6.8 | 126 | 1.27 | 2.8 | 3.1 |
| Example 69 | 6.2 | 127 | 1.24 | 3.1 | 2.8 |
| Example 70 | 6.0 | 126 | 1.24 | 4.1 | 4.9 |
| Example 71 | 6.2 | 128 | 1.23 | 3.9 | 3.5 |
| Example 72 | 5.8 | 123 | 1.26 | 2.6 | 2.8 |
| Example 73 | 6.0 | 126 | 1.24 | 1.6 | 1.3 |
| Example 74 | 6.5 | 130 | 1.23 | 2.1 | 1.5 |
| Example 75 | 5.6 | 143 | 1.28 | 1.6 | 3.2 |
| Example 76 | 6.2 | 130 | 1.23 | 2.6 | 1.6 |
| Example 77 | 5.8 | 126 | 1.22 | 1.1 | 2.8 |
| Example 78 | 5.6 | 136 | 1.26 | 1.3 | 2.6 |

TABLE 16

Production of magnetic recording medium

| Comparative Examples and Reference Examples | Kind of non-magnetic substrate | Kind of magnetic particles | Weight ratio of particles to resin (—) |
|---|---|---|---|
| Comparative Example 23 | Comparative Example 14 | Magnetic metal particles (e) | 5.0 |
| Comparative Example 24 | Comparative Example 15 | Magnetic metal particles (e) | 5.0 |
| Comparative Example 25 | Comparative Example 16 | Magnetic metal particles (e) | 5.0 |
| Comparative Example 26 | Comparative Example 17 | Magnetic metal particles (e) | 5.0 |
| Comparative Example 27 | Comparative Example 18 | Magnetic metal particles (e) | 5.0 |
| Comparative Example 28 | Comparative Example 19 | Magnetic metal particles (f) | 5.0 |
| Comparative Example 29 | Comparative Example 20 | Magnetic metal particles (f) | 5.0 |
| Comparative Example 30 | Comparative Example 21 | Magnetic metal particles (f) | 5.0 |
| Comparative Example 31 | Comparative Example 22 | Magnetic metal particles (f) | 5.0 |
| Reference Example 12 | Reference Example 3 | Magnetic metal particles (e) | 5.0 |
| Reference Example 13 | Reference Example 4 | Magnetic metal particles (e) | 5.0 |
| Reference Example 14 | Reference Example 5 | Magnetic metal particles (e) | 5.0 |
| Reference Example 15 | Reference Example 6 | Magnetic metal particles (e) | 5.0 |
| Reference Example 16 | Reference Example 7 | Magnetic metal particles (e) | 5.0 |

TABLE 16-continued

| | | | |
|---|---|---|---|
| Reference Example 17 | Reference Example 8 | Magnetic metal particles (f) | 5.0 |
| Reference Example 18 | Reference Example 9 | Magnetic metal particles (f) | 5.0 |
| Reference Example 19 | Reference Example 10 | Magnetic metal particles (f) | 5.0 |
| Reference Example 20 | Reference Example 11 | Magnetic metal particles (f) | 5.0 |

| | Properties of magnetic recording medium | | | |
|---|---|---|---|---|
| Comparative Examples and Reference Examples | Thickness of magnetic layer ($\mu$m) | Coercive force (Hc) (Oe) | Br/Bm value (-) | Gloss (%) |
| Comparative Example 23 | 1.3 | 1,958 | 0.74 | 136 |
| Comparative Example 24 | 1.2 | 1,941 | 0.78 | 121 |
| Comparative Example 25 | 1.1 | 1,975 | 0.83 | 171 |
| Comparative Example 26 | 1.0 | 1,969 | 0.84 | 186 |
| Comparative Example 27 | 1.3 | 1,953 | 0.76 | 158 |
| Comparative Example 28 | 1.1 | 1,775 | 0.82 | 183 |
| Comparative Example 29 | 1.1 | 1,768 | 0.85 | 194 |
| Comparative Example 30 | 1.0 | 1,732 | 0.85 | 193 |
| Comparative Example 31 | 1.1 | 1,763 | 0.84 | 180 |
| Reference Example 12 | 1.1 | 1,980 | 0.87 | 217 |
| Reference Example 13 | 1.1 | 1,983 | 0.87 | 212 |
| Reference Example 14 | 1.0 | 1,985 | 0.87 | 213 |
| Reference Example 15 | 1.1 | 1,982 | 0.87 | 210 |
| Reference Example 16 | 1.0 | 1,988 | 0.88 | 226 |
| Reference Example 17 | 1.1 | 1,780 | 0.88 | 226 |
| Reference Example 18 | 1.1 | 1,782 | 0.88 | 214 |
| Reference Example 19 | 1.0 | 1,775 | 0.88 | 211 |
| Reference Example 20 | 1.0 | 1,781 | 0.88 | 216 |

| | Properties of magnetic recording medium | | |
|---|---|---|---|
| Comparative Examples and Reference Examples | Surface roughness Ra (nm) | Young's modulus (relative value) | Linear absorption coefficient ($\mu$m$^{-1}$) |
| Comparative Example 23 | 18.8 | 116 | 1.03 |
| Comparative Example 24 | 26.5 | 100 | 1.10 |
| Comparative Example 25 | 14.4 | 113 | 1.18 |
| Comparative Example 26 | 10.2 | 116 | 1.16 |
| Comparative Example 27 | 16.6 | 109 | 1.06 |
| Comparative Example 28 | 11.2 | 114 | 1.12 |
| Comparative Example 29 | 8.2 | 119 | 1.19 |
| Comparative Example 30 | 8.4 | 119 | 1.16 |
| Comparative Example 31 | 10.2 | 117 | 1.13 |
| Reference Example 12 | 6.8 | 123 | 1.23 |
| Reference Example 13 | 6.8 | 125 | 1.24 |
| Reference Example 14 | 6.4 | 128 | 1.22 |
| Reference Example 15 | 7.2 | 136 | 1.28 |
| Reference Example 16 | 6.8 | 125 | 1.26 |
| Reference Example 17 | 6.0 | 124 | 1.24 |
| Reference Example 18 | 5.9 | 135 | 1.22 |
| Reference Example 19 | 6.3 | 124 | 1.23 |
| Reference Example 20 | 6.2 | 124 | 1.23 |

| | Properties of magnetic recording medium Corrosion resistance | |
|---|---|---|
| Comparative Examples and Reference Examples | Percentage of change in coercive force (%) | Percentage of change in Bm (%) |
| Comparative Example 23 | 46.3 | 36.5 |
| Comparative Example 24 | 53.6 | 32.1 |
| Comparative Example 25 | 46.0 | 36.8 |
| Comparative Example 26 | 39.3 | 31.5 |
| Comparative Example 27 | 39.8 | 29.6 |
| Comparative Example 28 | 41.6 | 32.0 |
| Comparative Example 29 | 23.8 | 21.8 |
| Comparative Example 30 | 19.6 | 17.8 |
| Comparative Example 31 | 23.9 | 25.6 |
| Reference Example 12 | 15.6 | 18.2 |
| Reference Example 13 | 18.2 | 17.6 |
| Reference Example 14 | 18.6 | 18.8 |
| Reference Example 15 | 14.8 | 16.1 |
| Reference Example 16 | 11.8 | 13.6 |
| Reference Example 17 | 15.1 | 16.8 |
| Reference Example 18 | 12.9 | 18.1 |
| Reference Example 19 | 12.1 | 14.6 |
| Reference Example 20 | 11.6 | 10.9 |

TABLE 17

| | Production of magnetic recording medium | | |
|---|---|---|---|
| Examples | Kind of non-magnetic substrate | Kind of magnetic particles | Weight ratio of particles to resin (-) |
| Example 79 | Example 51 | Particles used in Example 4 | 5.0 |
| Example 80 | Example 52 | Magnetic metal | 5.0 |

TABLE 17-continued

| Examples | | | |
|---|---|---|---|
| Example 81 | Example 53 | Magnetic metal particles (a) | 5.0 |
| Example 82 | Example 54 | Magnetic metal particles (b) | 5.0 |
| Example 83 | Example 55 | Magnetic metal particles (b) | 5.0 |
| Example 84 | Example 56 | Magnetic metal particles (c) | 5.0 |
| Example 85 | Example 57 | Magnetic metal particles (c) | 5.0 |
| Example 86 | Example 58 | Particles used in Example 4 | 5.0 |
| Example 87 | Example 59 | Magnetic metal particles (a) | 5.0 |
| Example 88 | Example 60 | Magnetic metal particles (a) | 5.0 |
| Example 89 | Example 61 | Magnetic metal particles (b) | 5.0 |
| Example 90 | Example 62 | Magnetic metal particles (b) | 5.0 |
| Example 91 | Example 63 | Magnetic metal particles (c) | 5.0 |
| Example 92 | Example 64 | Magnetic metal particles (c) | 5.0 |

Properties of magnetic recording medium

| Examples | Thickness of magnetic layer (μm) | Coercive force (Hc) (Oe) | Br/Bm value (—) | Gloss (%) |
|---|---|---|---|---|
| Example 79 | 1.1 | 1,976 | 0.87 | 226 |
| Example 80 | 1.0 | 1,981 | 0.87 | 221 |
| Example 81 | 1.1 | 1,986 | 0.87 | 223 |
| Example 82 | 1.0 | 2,000 | 0.87 | 214 |
| Example 83 | 1.0 | 1,997 | 0.88 | 235 |
| Example 84 | 1.1 | 2,138 | 0.88 | 240 |
| Example 85 | 1.0 | 2,145 | 0.88 | 233 |
| Example 86 | 1.1 | 1,978 | 0.88 | 230 |
| Example 87 | 1.1 | 1,990 | 0.88 | 235 |
| Example 88 | 1.0 | 1,984 | 0.88 | 226 |
| Example 89 | 1.0 | 1,998 | 0.89 | 234 |
| Example 90 | 1.0 | 2,006 | 0.89 | 241 |
| Example 91 | 1.1 | 2,135 | 0.90 | 245 |
| Example 92 | 1.0 | 2,141 | 0.89 | 245 |

Properties of magnetic recording medium

| Examples | Surface roughness Ra (nm) | Young's modulus (relative value) | Linear absorption coefficient (μm$^{-1}$) | Durability Running time (min) | Durability Scratch resistance |
|---|---|---|---|---|---|
| Example 79 | 6.0 | 126 | 1.23 | 29.8 | A |
| Example 80 | 6.8 | 128 | 1.24 | 22.6 | B |
| Example 81 | 6.4 | 128 | 1.25 | 23.2 | B |
| Example 82 | 6.8 | 130 | 1.27 | 26.5 | A |
| Example 83 | 6.4 | 131 | 1.26 | 23.8 | B |
| Example 84 | 6.0 | 131 | 1.25 | ≧30 | A |
| Example 85 | 6.3 | 130 | 1.24 | ≧30 | A |
| Example 86 | 6.1 | 127 | 1.24 | ≧30 | A |
| Example 87 | 6.0 | 130 | 1.25 | 27.2 | B |
| Example 88 | 6.8 | 132 | 1.25 | 28.8 | A |
| Example 89 | 6.2 | 135 | 1.27 | 29.6 | A |
| Example 90 | 5.8 | 136 | 1.27 | ≧30 | A |
| Example 91 | 5.7 | 133 | 1.25 | ≧30 | A |
| Example 92 | 5.7 | 133 | 1.24 | ≧30 | A |

Properties of magnetic recording medium Corrosion resistance

| Examples | Percentage of change in coercive force (%) | Percentage of change in B$_m$ (%) |
|---|---|---|
| Example 79 | 3.6 | 3.2 |
| Example 80 | 4.9 | 4.8 |
| Example 81 | 4.2 | 4.3 |
| Example 82 | 2.1 | 2.5 |
| Example 83 | 3.1 | 2.6 |
| Example 84 | 3.6 | 3.8 |
| Example 85 | 3.5 | 3.7 |
| Example 86 | 3.3 | 3.0 |
| Example 87 | 3.9 | 2.8 |
| Example 88 | 3.7 | 3.0 |
| Example 89 | 1.6 | 2.8 |
| Example 90 | 1.3 | 2.6 |
| Example 91 | 3.1 | 4.0 |
| Example 92 | 2.8 | 3.8 |

TABLE 18

Production of magnetic recording medium

| Comparative Examples and Reference Examples | Kind of non-magnetic substrate | Kind of magnetic particles | Weight ratio of particles to resin (—) |
|---|---|---|---|
| Comparative Example 32 | Comparative Example 14 | Magnetic metal particles (a) | 5.0 |
| Comparative Example 33 | Comparative Example 15 | Magnetic metal particles (a) | 5.0 |
| Comparative Example 34 | Comparative Example 16 | Magnetic metal particles (a) | 5.0 |
| Comparative Example 35 | Comparative Example 17 | Magnetic metal particles (a) | 5.0 |
| Comparative Example 36 | Comparative Example 18 | Magnetic metal particles (a) | 5.0 |
| Comparative Example 37 | Comparative Example 19 | Magnetic metal particles (d) | 5.0 |
| Comparative Example 38 | Comparative Example 20 | Magnetic metal particles (d) | 5.0 |
| Comparative Example 39 | Comparative Example 21 | Magnetic metal particles (d) | 5.0 |
| Comparative Example 40 | Comparative Example 22 | Magnetic metal particles (d) | 5.0 |
| Reference Example 21 | Reference Example 3 | Magnetic metal particles (a) | 5.0 |
| Reference Example 22 | Reference Example 4 | Magnetic metal particles (a) | 5.0 |
| Reference Example 23 | Reference Example 5 | Magnetic metal particles (a) | 5.0 |
| Reference Example 24 | Reference Example 6 | Magnetic metal particles (a) | 5.0 |
| Reference Example 25 | Reference Example 7 | Magnetic metal particles (a) | 5.0 |
| Reference Example 26 | Reference Example 8 | Magnetic metal particles (d) | 5.0 |
| Reference Example 27 | Reference Example 9 | Magnetic metal particles (d) | 5.0 |
| Reference Example 28 | Reference Example 10 | Magnetic metal particles (d) | 5.0 |
| Reference Example 29 | Reference Example 11 | Magnetic metal particles (d) | 5.0 |

Properties of magnetic recording medium

| Comparative Examples and Reference Examples | Thickness of magnetic layer (μm) | Coercive force (Hc) (Oe) | Br/Bm value (—) | Gloss (%) |
|---|---|---|---|---|

TABLE 18-continued

| | | | | |
|---|---|---|---|---|
| Comparative Example 32 | 1.2 | 1,957 | 0.78 | 135 |
| Comparative Example 33 | 1.3 | 1,961 | 0.76 | 118 |
| Comparative Example 34 | 1.1 | 1,968 | 0.82 | 173 |
| Comparative Example 35 | 1.1 | 1,963 | 0.84 | 182 |
| Comparative Example 36 | 1.2 | 1,954 | 0.78 | 161 |
| Comparative Example 37 | 1.1 | 1,863 | 0.84 | 178 |
| Comparative Example 38 | 1.0 | 1,871 | 0.85 | 190 |
| Comparative Example 39 | 1.1 | 1,878 | 0.85 | 189 |
| Comparative Example 40 | 1.0 | 1,876 | 0.83 | 182 |
| Reference Example 21 | 1.1 | 1,981 | 0.87 | 218 |
| Reference Example 22 | 1.2 | 1,986 | 0.87 | 213 |
| Reference Example 23 | 1.1 | 1,983 | 0.87 | 210 |
| Reference Example 24 | 1.2 | 1,988 | 0.87 | 205 |
| Reference Example 25 | 1.1 | 1,983 | 0.87 | 218 |
| Reference Example 26 | 1.1 | 1,910 | 0.87 | 220 |
| Reference Example 27 | 1.1 | 1,906 | 0.88 | 218 |
| Reference Example 28 | 1.0 | 1,897 | 0.88 | 213 |
| Reference Example 29 | 1.1 | 1,907 | 0.88 | 217 |

| Comparative Examples and Reference Examples | Properties of magnetic recording medium | | |
|---|---|---|---|
| | Surface roughness Ra (nm) | Young's modulus (relative value) | Linear absorption coefficient ($\mu m^{-1}$) |
| Comparative Example 32 | 24.3 | 113 | 1.04 |
| Comparative Example 33 | 38.5 | 96 | 1.09 |
| Comparative Example 34 | 19.8 | 112 | 1.16 |
| Comparative Example 35 | 12.6 | 113 | 1.14 |
| Comparative Example 36 | 21.9 | 110 | 1.06 |
| Comparative Example 37 | 12.5 | 113 | 1.09 |
| Comparative Example 38 | 10.7 | 116 | 1.15 |
| Comparative Example 39 | 11.0 | 119 | 1.17 |
| Comparative Example 40 | 13.1 | 119 | 1.13 |
| Reference Example 21 | 6.6 | 122 | 1.22 |
| Reference Example 22 | 7.0 | 124 | 1.24 |
| Reference Example 23 | 7.3 | 126 | 1.23 |
| Reference Example 24 | 7.6 | 133 | 1.27 |
| Reference Example 25 | 6.4 | 124 | 1.27 |
| Reference Example 26 | 6.1 | 123 | 1.25 |
| Reference Example 27 | 6.0 | 126 | 1.23 |
| Reference Example 28 | 6.4 | 125 | 1.25 |
| Reference Example 29 | 6.1 | 124 | 1.24 |

| Comparative Examples and Reference Examples | Properties of magnetic recording medium Durability | |
|---|---|---|
| | Running time (min) | Scratch resistance |
| Comparative Example 32 | 8.3 | D |
| Comparative Example 33 | 1.6 | D |
| Comparative Example 34 | 9.2 | D |
| Comparative Example 35 | 14.5 | C |
| Comparative Example 36 | 12.6 | C |
| Comparative Example 37 | 13.6 | C |
| Comparative Example 38 | 11.8 | D |
| Comparative Example 39 | 12.3 | C |
| Comparative Example 40 | 13.6 | C |
| Reference Example 21 | 22.9 | B |
| Reference Example 22 | 24.8 | A |
| Reference Example 23 | 24.2 | B |
| Reference Example 24 | 23.6 | B |
| Reference Example 25 | 25.2 | A |
| Reference Example 26 | 18.2 | B |
| Reference Example 27 | 20.1 | B |
| Reference Example 28 | 18.9 | B |
| Reference Example 29 | 20.6 | B |

| Comparative Examples and Reference Examples | Properties of magnetic recording medium Corrosion resistance | |
|---|---|---|
| | Percentage of change in coercive force (%) | Percentage of change in $B_m$ (%) |
| Comparative Example 32 | 38.2 | 32.6 |
| Comparative Example 33 | 41.2 | 28.1 |
| Comparative Example 34 | 36.5 | 29.2 |
| Comparative Example 35 | 31.3 | 26.5 |
| Comparative Example 36 | 32.1 | 21.3 |
| Comparative Example 37 | 36.5 | 16.8 |
| Comparative Example 38 | 17.9 | 17.8 |
| Comparative Example 39 | 16.5 | 21.6 |
| Comparative Example 40 | 19.8 | 17.3 |
| Reference Example 21 | 13.6 | 12.6 |
| Reference Example 22 | 17.8 | 16.5 |
| Reference Example 23 | 13.2 | 17.1 |
| Reference Example 24 | 12.6 | 15.6 |

TABLE 18-continued

| | | |
|---|---|---|
| Reference Example 25 | 10.9 | 11.6 |
| Reference Example 26 | 13.1 | 12.8 |
| Reference Example 27 | 12.2 | 12.4 |
| Reference Example 28 | 13.6 | 13.1 |
| Reference Example 29 | 10.8 | 10.4 |

TABLE 19

| | Production of acicular goethite particles | | Properties of acicular goethite particles | |
|---|---|---|---|---|
| Kind of Precursor | Production method | Kind of aluminum compound added | Average major axial diameter ($\mu$m) | Geometrical standard deviation of major axial diameter (—) |
| Precursor 7 | (B) | Aluminum sulfate | 0.185 | 1.31 |
| Precursor 8 | (C) | Aluminum acetate | 0.233 | 1.33 |
| Precursor 9 | (D) | Aluminum sulfate | 0.246 | 1.26 |
| Precursor 10 | (A) | Sodium aluminate | 0.218 | 1.31 |
| Precursor 11 | (E) | Aluminum sulfate | 0.150 | 1.34 |
| Precursor 12 | (F) | Aluminum sulfate | 0.268 | 1.31 |
| Precursor 13 | (A) | — | 0.333 | 1.42 |

| | Properties of acicular goethite particles | | | | |
|---|---|---|---|---|---|
| Kind of Precursor | Average minor axial diameter ($\mu$m) | Geometrical standard deviation of minor axial diameter (—) | Aspect ratio (—) | BET specific surface area (m$^2$/g) | Content of Al (wt %) |
| Precursor 7 | 0.0235 | 1.38 | 7.9:1 | 141.1 | 1.68 |
| Precursor 8 | 0.0281 | 1.37 | 8.3:1 | 96.1 | 0.82 |
| Precursor 9 | 0.0289 | 1.41 | 8.5:1 | 85.8 | 3.58 |
| Precursor 10 | 0.0228 | 1.38 | 9.6:1 | 73.8 | 1.65 |
| Precursor 11 | 0.0205 | 1.38 | 7.3:1 | 171.6 | 2.13 |
| Precursor 12 | 0.0331 | 1.37 | 8.1:1 | 60.6 | 0.46 |
| Precursor 13 | 0.0370 | 1.39 | 9.0:1 | 55.8 | — |

| | Properties of acicular goethite particles | | |
|---|---|---|---|
| Kind of Precursor | Soluble sodium salt (calculated as Na) (ppm) | Soluble sulfate (calculated as SO$_4$) (ppm) | pH value (—) |
| Precursor 7 | 1,378 | 902 | 6.3 |
| Precursor 8 | 889 | 774 | 6.5 |
| Precursor 9 | 726 | 1,251 | 6.2 |
| Precursor 10 | 583 | 645 | 7.9 |
| Precursor 11 | 1,020 | 1,009 | 6.0 |
| Precursor 12 | 1,406 | 503 | 5.3 |
| Precursor 13 | 552 | 618 | 7.2 |

TABLE 20

| Examples and Comparative Examples | Kind of acicular goethite particles | Anti-sintering treatment | | |
|---|---|---|---|---|
| | | Kind of sintering preventive | Calculated as | Amount (w %) |
| Example 93 | Particles used in Example 5 | Water glass #3 | SiO$_2$ | 0.5 |
| Example 94 | Precursor 7 | Water glass #3 Phosphoric acid | SiO$_2$ P | 1.0 1.0 |
| Example 95 | Precursor 8 | Phosphoric acid | P | 1.5 |
| Example 96 | Precursor 9 | Sodium hexa-metaphosphate | P | 2.0 |
| Example 97 | Precursor 10 | Water glass #3 | SiO$_2$ | 3.0 |
| Example 98 | Precursor 11 | Sodium hexa-metaphosphate | P | 1.5 |
| Example 99 | Precursor 12 | Water glass #3 Phosphoric acid | SiO$_2$ P | 2.0 1.0 |
| Comparative Example 41 | Particles used in Example 5 | — | — | — |
| Comparative Example 42 | Particles used in Example 5 | — | — | — |
| Comparative Example 43 | Particles used in Example 5 | Water glass #3 | SiO$_2$ | 1.5 |
| Comparative Example 44 | Particles used in Example 5 | Phosphoric acid | P | 1.5 |
| Comparative Example 45 | Particles used in Example 5 | Phosphoric acid | P | 1.0 |
| Comparative Example 46 | Precursor 13 | Water glass #3 | SiO$_2$ | 1.0 |

| Examples and Comparative Examples | Heat-dehydration | |
|---|---|---|
| | Temperature (° C.) | Time (min) |
| Example 93 | 340 | 30 |
| Example 94 | 350 | 60 |
| Example 95 | 330 | 60 |
| Example 96 | 330 | 60 |
| Example 97 | 340 | 45 |
| Example 98 | 300 | 120 |
| Example 99 | 360 | 30 |
| Comparative Example 41 | 320 | 60 |
| Comparative Example 42 | 330 | 45 |
| Comparative Example 43 | 340 | 30 |
| Comparative Example 44 | — | — |
| Comparative Example 45 | 340 | 30 |
| Comparative Example 46 | 320 | 60 |

TABLE 21

Properties of low-density acicular hematite particles

| Examples and Comparative Examples | Average major axial diameter (μm) | Geometrical standard deviation of major axial diameter (-) | Average minor axial diameter (μm) | Geometrical standard deviation of minor axial diameter (-) |
|---|---|---|---|---|
| Example 93 | 0.144 | 1.35 | 0.0194 | 1.38 |
| Example 94 | 0.150 | 1.36 | 0.0191 | 1.38 |
| Example 95 | 0.195 | 1.29 | 0.0240 | 1.37 |
| Example 96 | 0.215 | 1.33 | 0.0250 | 1.41 |
| Example 97 | 0.171 | 1.33 | 0.0193 | 1.38 |
| Example 98 | 0.120 | 1.36 | 0.0168 | 1.38 |
| Example 99 | 0.234 | 1.33 | 0.0285 | 1.37 |
| Comparative Example 41 | 0.142 | 1.36 | 0.0193 | 1.38 |
| Comparative Example 42 | 0.137 | 1.37 | 0.0198 | 1.38 |
| Comparative Example 43 | 0.140 | 1.36 | 0.0193 | 1.38 |
| Comparative Example 44 | — | — | — | — |
| Comparative Example 45 | 0.143 | 1.37 | 0.0190 | 1.38 |
| Comparative Example 46 | 0.256 | 1.42 | 0.0331 | 1.39 |

Properties of low-density acicular hematite particles

| Examples and Comparative Examples | Aspect ratio (-) | Content of Al (wt %) | $S_{BET}$ (m²/g) | $S_{TEM}$ (m²/g) | $S_{BET}/S_{TEM}$ value (-) |
|---|---|---|---|---|---|
| Example 93 | 7.4:1 | 1.23 | 153.8 | 42.3 | 3.63 |
| Example 94 | 7.9:1 | 1.82 | 149.0 | 42.8 | 3.48 |
| Example 95 | 8.1:1 | 0.90 | 115.3 | 34.0 | 3.39 |
| Example 96 | 8.6:1 | 3.90 | 111.5 | 32.6 | 3.42 |
| Example 97 | 8.9:1 | 1.83 | 95.9 | 42.1 | 2.28 |
| Example 98 | 7.1:1 | 2.35 | 180.6 | 49.0 | 3.69 |
| Example 99 | 8.2:1 | 0.51 | 81.2 | 28.6 | 2.84 |
| Comparative Example 41 | 7.4:1 | 1.23 | 148.3 | 42.6 | 3.48 |
| Comparative Example 42 | 6.9:1 | 1.24 | 136.8 | 41.7 | 3.28 |
| Comparative Example 43 | 7.3:1 | 1.23 | 151.2 | 42.6 | 3.55 |
| Comparative Example 44 | — | — | — | — | — |
| Comparative Example 45 | 7.5:1 | 1.22 | 158.6 | 43.2 | 3.67 |
| Comparative Example 46 | 7.7:1 | — | 78.8 | 24.7 | 3.18 |

Properties of low-density acicular hematite particles

| Ex. and Com. Ex. | Amount of sintering preventive Calculated as | Amount of sintering preventive Content (wt %) | Soluble sodium salt (calculated as Na) (ppm) | Soluble sulfate (calculated as SO₄) (ppm) | pH value (-) | Resin adsorption (%) |
|---|---|---|---|---|---|---|
| Ex. 93 | SiO₂ | 0.55 | 1,705 | 964 | 6.3 | — |
| Ex. 94 | SiO₂ P | 1.07 1.07 | 2,108 | 1,332 | 6.2 | — |
| Ex. 95 | P | 1.68 | 1,811 | 1,290 | 6.4 | — |
| Ex. 96 | P | 2.27 | 1,493 | 1,688 | 6.1 | — |
| Ex. 97 | SiO₂ | 3.27 | 1,276 | 919 | 7.3 | — |
| Ex. 98 | P | 1.67 | 1,929 | 1,456 | 5.9 | — |
| Ex. 99 | SiO₂ P | 2.21 1.11 | 2,352 | 827 | 5.8 | — |
| Com. Ex. 41 | — | — | 1,695 | 953 | 6.3 | 46.8 |
| Com. Ex. 42 | — | — | 1,714 | 987 | 6.4 | — |
| Com. Ex. 43 | SiO₂ | 1.65 | 1,742 | 1,001 | 6.2 | 40.6 |
| Com. Ex. 44 | P | 1.50 | 987 | 685 | 6.5 | — |
| Com. Ex. 45 | P | 1.09 | 1,671 | 972 | 6.3 | — |
| Com. Ex. 46 | SiO₂ | 1.10 | 1,198 | 1,045 | 6.9 | — |

TABLE 22

| Examples and Comparative Examples | Kind of low-density acicular hematite particles | Heat-treatment for high densification Temperature (°C) | Heat-treatment for high densification Time (min) |
|---|---|---|---|
| Example 100 | Example 93 | 630 | 60 |
| Example 101 | Example 94 | 650 | 60 |
| Example 102 | Example 95 | 680 | 30 |
| Example 103 | Example 96 | 640 | 75 |
| Example 104 | Example 97 | 680 | 30 |
| Example 105 | Example 98 | 660 | 30 |
| Example 106 | Example 99 | 710 | 20 |
| Comparative Example 47 | Comparative Example 42 | 680 | 30 |
| Comparative Example 48 | Comparative Example 44 | 680 | 30 |
| Comparative Example 49 | Comparative Example 45 | 450 | 30 |
| Comparative Example 50 | Comparative Example 46 | 850 | 30 |
| Comparative Example 51 | Comparative Example 46 | 670 | 30 |

TABLE 23

Properties of high-density acicular hematite particles

| Examples and Comparative Examples | Average major axial diameter (μm) | Geometrical standard deviation of major axial diameter (-) | Average minor axial diameter (μm) | Geometrical standard deviation of minor axial diameter (-) |
|---|---|---|---|---|
| Example 100 | 0.138 | 1.35 | 0.0193 | 1.38 |
| Example 101 | 0.151 | 1.36 | 0.0198 | 1.39 |
| Example 102 | 0.195 | 1.31 | 0.0245 | 1.37 |
| Example 103 | 0.213 | 1.34 | 0.0253 | 1.42 |
| Example 104 | 0.168 | 1.34 | 0.0196 | 1.38 |
| Example 105 | 0.120 | 1.35 | 0.0170 | 1.38 |
| Example 106 | 0.230 | 1.34 | 0.0287 | 1.38 |
| Comparative Example 47 | 0.068 | 1.86 | 0.0333 | 1.65 |
| Comparative Example 48 | 0.128 | 1.65 | 0.0226 | 1.38 |
| Comparative Example 49 | 0.142 | 1.37 | 0.0193 | 1.38 |
| Comparative Example 50 | 0.110 | 1.68 | 0.0260 | 1.39 |
| Comparative Example 51 | 0.234 | 1.44 | 0.0295 | 1.39 |

Properties of high-density acicular hematite particles

| Examples and Comparative Examples | Aspect ratio (-) | Content of Al (wt %) | $S_{BET}$ (m²/g) | $S_{TEM}$ (m²/g) | $S_{BET}/S_{TEM}$ value (-) |
|---|---|---|---|---|---|
| Example 100 | 7.2:1 | 1.23 | 51.4 | 42.6 | 1.21 |
| Example 101 | 7.6:1 | 1.82 | 52.6 | 41.4 | 1.27 |
| Example 102 | 8.0:1 | 0.90 | 43.1 | 33.4 | 1.29 |

TABLE 23-continued

| | | | | | |
|---|---|---|---|---|---|
| Example 103 | 8.4:1 | 3.91 | 41.2 | 32.2 | 1.28 |
| Example 104 | 8.6:1 | 1.83 | 55.2 | 41.5 | 1.33 |
| Example 105 | 7.1:1 | 2.35 | 56.1 | 48.5 | 1.16 |
| Example 106 | 8.0:1 | 0.51 | 41.0 | 28.5 | 1.44 |
| Comparative Example 47 | 2.0:1 | 1.24 | 13.8 | 28.8 | 0.48 |
| Comparative Example 48 | 5.7:1 | 1.23 | 25.6 | 37.0 | 0.69 |
| Comparative Example 49 | 7.4:1 | 1.23 | 100.8 | 42.6 | 2.37 |
| Comparative Example 50 | 4.2:1 | — | 26.8 | 33.1 | 0.81 |
| Comparative Example 51 | 7.9:1 | — | 42.5 | 27.7 | 1.53 |

Properties of high-density acicular hematite particles

| | Amount of sintering preventive | | Soluble sodium salt (calculated as Na) (ppm) | Soluble sulfate (calculated as $SO_4$) (ppm) | pH value (-) | Resin adsorption (%) |
|---|---|---|---|---|---|---|
| Ex. and Com. Ex. | Calculated as | Content (wt %) | | | | |
| Ex. 100 | $SiO_2$ | 0.55 | 2,516 | 2,788 | 5.3 | — |
| Ex. 101 | $SiO_2$ P | 1.07 1.06 | 3,009 | 3,072 | 5.2 | — |
| Ex. 102 | P | 1.66 | 2,641 | 2,904 | 5.3 | — |
| Ex. 103 | P | 2.25 | 2,038 | 3,456 | 5.0 | — |
| Ex. 104 | $SiO_2$ | 3.29 | 1,515 | 2,622 | 6.2 | — |
| Ex. 105 | P | 1.68 | 2,463 | 3,291 | 4.9 | — |
| Ex. 106 | $SiO_2$ P | 2.23 1.10 | 3,652 | 2,543 | 4.8 | — |
| Com. Ex. 47 | — | — | 2,588 | 2,862 | 5.3 | 21.8 |
| Com. Ex. 48 | P | 1.66 | 2,832 | 2,904 | 5.3 | 36.8 |
| Com. Ex. 49 | P | 1.09 | 2,613 | 3,008 | 5.4 | 51.3 |
| Com. Ex. 50 | $SiO_2$ | 1.10 | 1,582 | 2,936 | 5.3 | 36.8 |
| Com. Ex. 51 | $SiO_2$ | 1.10 | 1,654 | 2,890 | 5.8 | 37.8 |

TABLE 24

| Examples and Comparative Examples | Kind of high-density acicular hematite particles | Wet-pulverization | |
|---|---|---|---|
| | | Use or non-use | Residue on sieve (wt %) |
| Example 107 | Example 100 | used | 0 |
| Example 108 | Example 101 | used | 0 |
| Example 109 | Example 102 | used | 0 |
| Example 110 | Example 103 | used | 0 |
| Example 111 | Example 104 | used | 0 |
| Example 112 | Example 105 | used | 0 |
| Example 113 | Example 106 | used | 0 |
| Comparative Example 52 | Particles used in Example 5 | used | 0 |
| Comparative Example 53 | Comparative Example 51 | used | 0 |

| Examples and Comparative Examples | Acid-dissolving treatment | | | |
|---|---|---|---|---|
| | Kind of acid | Concentration (N) | Temperature (°C.) | Time (Hr) | pH value (-) |
| Example 107 | Sulfuric acid | 1.5 | 85 | 5.0 | 0.55 |
| Example 108 | Sulfuric acid | 1.4 | 90 | 6.0 | 0.61 |

TABLE 24-continued

| | | | | | |
|---|---|---|---|---|---|
| Example 109 | Sulfuric acid | 1.8 | 85 | 7.0 | 0.48 |
| Example 110 | Sulfuric acid | 1.6 | 75 | 5.0 | 0.50 |
| Example 111 | Sulfuric acid | 1.3 | 75 | 2.5 | 0.71 |
| Example 112 | Sulfuric acid | 1.5 | 80 | 2.0 | 0.68 |
| Example 113 | Sulfuric acid | 2.0 | 90 | 7.0 | 0.36 |
| Comparative Example 52 | Sulfuric acid | 3.0E-05 | 80 | 5.5 | 4.7 |
| Comparative Example 53 | Sulfuric acid | 4.0E-04 | 80 | 8.0 | 3.4 |

TABLE 25

Properties of acicular hematite particles washed with water after acid-dissolving treatment

| Examples and Comparative Examples | Average major axial diameter (μm) | Geometrical standard deviation of major axial diameter (-) | Average minor axial diameter (μm) | Geometrical standard deviation of minor axial diameter (-) |
|---|---|---|---|---|
| Example 107 | 0.132 | 1.34 | 0.0187 | 1.33 |
| Example 108 | 0.142 | 1.35 | 0.0179 | 1.34 |
| Example 109 | 0.173 | 1.31 | 0.0218 | 1.33 |
| Example 110 | 0.195 | 1.33 | 0.0231 | 1.34 |
| Example 111 | 0.163 | 1.33 | 0.0195 | 1.32 |
| Example 112 | 0.121 | 1.35 | 0.0165 | 1.32 |
| Example 113 | 0.195 | 1.33 | 0.0227 | 1.33 |
| Comparative Example 52 | 0.138 | 1.35 | 0.0194 | 1.38 |
| Comparative Example 53 | 0.234 | 1.44 | 0.0296 | 1.39 |

Properties of acicular hematite particles washed with water after acid-dissolving treatment

| Examples and Comparative Examples | Aspect ratio (-) | Amount dissolved (wt %) | Content of Al (wt %) |
|---|---|---|---|
| Example 107 | 7.1:1 | 25.8 | 1.22 |
| Example 108 | 7.9:1 | 31.2 | 1.83 |
| Example 109 | 7.9:1 | 39.8 | 0.91 |
| Example 110 | 8.4:1 | 21.3 | 3.92 |
| Example 111 | 8.4:1 | 11.6 | 1.85 |
| Example 112 | 7.3:1 | 18.2 | 2.36 |
| Example 113 | 8.6:1 | 42.8 | 0.52 |
| Comparative Example 52 | 7.1:1 | 0.3 | 1.23 |
| Comparative Example 53 | 7.9:1 | 1.0 | — |

Properties of acicular hematite particles washed with water after acid-dissolving treatment

| Examples and Comparative Examples | $S_{BET}$ (m²/g) | $S_{TEM}$ (m²/g) | $S_{BET}/S_{TEM}$ value (-) |
|---|---|---|---|
| Example 107 | 56.1 | 44.0 | 1.27 |
| Example 108 | 57.6 | 45.7 | 1.26 |
| Example 109 | 48.2 | 37.5 | 1.29 |
| Example 110 | 45.6 | 35.3 | 1.29 |
| Example 111 | 58.1 | 41.8 | 1.39 |
| Example 112 | 61.2 | 49.8 | 1.23 |
| Example 113 | 47.1 | 35.9 | 1.31 |

TABLE 25-continued

| | | | |
|---|---|---|---|
| Comparative Example 52 | 50.8 | 42.4 | 1.20 |
| Comparative Example 53 | 40.6 | 27.6 | 1.47 |

Properties of acicular hematite particles washed with water after acid-dissolving treatment

| Ex. and Com. Ex. | Amount of sintering preventive Calculated as | Amount of sintering preventive Content (wt %) | Soluble sodium salt (calculated as Na) (ppm) | Soluble sulfate (calculated as SO$_4$) (ppm) | pH value (-) | Resin adsorption (%) |
|---|---|---|---|---|---|---|
| Ex. 107 | SiO$_2$ | 0.54 | 118 | 343 | 5.0 | 68.6 |
| Ex. 108 | SiO$_2$ P | 1.07 1.05 | 141 | 410 | 5.2 | 68.3 |
| Ex. 109 | P | 1.67 | 124 | 368 | 5.1 | 66.8 |
| Ex. 110 | P | 2.26 | 89 | 532 | 4.9 | 67.1 |
| Ex. 111 | SiO$_2$ | 3.30 | 72 | 295 | 5.3 | 71.2 |
| Ex. 112 | P | 1.68 | 103 | 491 | 5.1 | 70.6 |
| Ex. 113 | SiO$_2$ P | 2.24 1.11 | 152 | 206 | 5.0 | 66.9 |
| Com. Ex. 52 | SiO$_2$ | 0.58 | 107 | 314 | 5.3 | 61.2 |
| Com. Ex. 53 | SiO$_2$ | 1.11 | 96 | 357 | 5.2 | 54.3 |

TABLE 26

| Examples and Reference Examples | Kind of high-density acicular hematite particles | Heat-treatment in aqueous alkali solution pH value (-) | Heat-treatment in aqueous alkali solution Temperature (°C.) | Heat-treatment in aqueous alkali solution Time (min) |
|---|---|---|---|---|
| Example 114 | Example 107 | 13.6 | 90 | 180 |
| Example 115 | Example 108 | 13.5 | 95 | 180 |
| Example 116 | Example 109 | 13.2 | 85 | 240 |
| Example 117 | Example 110 | 13.4 | 85 | 180 |
| Example 118 | Example 111 | 13.5 | 80 | 300 |
| Example 119 | Example 112 | 13.3 | 95 | 120 |
| Example 120 | Example 113 | 13.2 | 90 | 240 |
| Reference Example 30 | Example 107 | 9.3 | 90 | 180 |
| Reference Example 31 | Example 107 | 13.1 | 43 | 180 |

TABLE 27

Properties of acicular hematite particles washed with water after heat-treatment in aqueous alkali solution

| Examples and Reference Examples | Average major axial diameter (μm) | Geometrical standard deviation of major axial diameter (-) | Average minor axial diameter (μm) | Geometrical standard deviation of minor axial diameter (-) |
|---|---|---|---|---|
| Example 114 | 0.132 | 1.34 | 0.0188 | 1.33 |
| Example 115 | 0.142 | 1.33 | 0.0179 | 1.34 |
| Example 116 | 0.173 | 1.31 | 0.0217 | 1.32 |
| Example 117 | 0.195 | 1.31 | 0.0231 | 1.34 |
| Example 118 | 0.163 | 1.38 | 0.0195 | 1.31 |
| Example 119 | 0.121 | 1.35 | 0.0166 | 1.32 |
| Example 120 | 0.195 | 1.32 | 0.0227 | 1.33 |
| Reference Example 30 | 0.132 | 1.34 | 0.0188 | 1.38 |
| Reference Example 31 | 0.132 | 1.34 | 0.0188 | 1.39 |

Properties of acicular hematite particles washed with water after heat-treatment in aqueous alkali solution

| Examples and Reference Examples | Aspect ratio (-) | Content of Al (wt %) | $S_{BET}$ (m$^2$/g) | $S_{TEM}$ (m$^2$/g) | $S_{BET}/S_{TEM}$ value (-) |
|---|---|---|---|---|---|
| Example 114 | 7.0:1 | 1.22 | 57.0 | 43.8 | 1.30 |
| Example 115 | 7.9:1 | 1.83 | 57.3 | 45.7 | 1.25 |
| Example 116 | 8.0:1 | 0.91 | 49.6 | 37.7 | 1.32 |
| Example 117 | 8.4:1 | 3.92 | 46.3 | 35.3 | 1.31 |
| Example 118 | 8.4:1 | 1.85 | 59.6 | 41.8 | 1.43 |
| Example 119 | 7.3:1 | 2.36 | 62.0 | 49.5 | 1.25 |
| Example 120 | 8.6:1 | 0.52 | 47.1 | 35.9 | 1.31 |
| Reference Example 30 | 7.0:1 | 1.22 | 57.1 | 43.8 | 1.30 |
| Reference Example 31 | 7.0:1 | 1.22 | 57.3 | 43.8 | 1.31 |

Properties of acicular hematite particles washed with water after heat-treatment in aqueous alkali solution

| Ex. and Com. Ex. | Amount of sintering preventive Calculated as | Amount of sintering preventive Content (wt %) | Soluble sodium salt (calculated as Na) (ppm) | Soluble sulfate (calculated as SO$_4$) (ppm) | pH value (-) | Resin adsorption (%) |
|---|---|---|---|---|---|---|
| Ex. 114 | SiO$_2$ | 0.44 | 96 | 7 | 9.2 | 70.8 |
| Ex. 115 | SiO$_2$ P | 0.77 0.32 | 101 | 10 | 9.1 | 71.6 |
| Ex. 116 | P | 0.48 | 72 | 6 | 9.1 | 72.1 |
| Ex. 117 | P | 0.61 | 56 | 21 | 8.9 | 73.2 |
| Ex. 118 | SiO$_2$ | 2.25 | 52 | 6 | 8.9 | 74.1 |
| Ex. 119 | P | 0.50 | 92 | 16 | 9.3 | 74.2 |
| Ex. 120 | SiO$_2$ P | 1.68 0.34 | 110 | 3 | 9.6 | 70.6 |
| Ref. Ex. 30 | SiO$_2$ | 0.43 | 136 | 293 | 7.3 | 66.4 |
| Ref. Ex. 31 | SiO$_2$ | 0.44 | 156 | 216 | 7.7 | 65.8 |

TABLE 28

| Examples | Kind of acicular hematite particles treated in aqueous alkaline solution | Surface treatment Kind of surface treatment material | Surface treatment Amount added (calculated as Al or SiO$_2$) (wt %) |
|---|---|---|---|
| Example 121 | Example 114 | Sodium aluminate | 1.0 |
| Example 122 | Example 115 | Water glass #3 | 1.0 |
| Example 123 | Example 116 | Aluminum sulfate Water glass #3 | 1.5 0.5 |
| Example 124 | Example 117 | Aluminum acetate | 4.0 |
| Example 125 | Example 118 | Sodium aluminate Colloidal silica | 2.0 0.5 |
| Example 126 | Example 119 | Colloidal silica | 2.0 |

TABLE 28-continued

| Example 127 | Example 120 | Sodium aluminate | 15.0 |
|---|---|---|---|

| | | Coating material | |
|---|---|---|---|
| Examples | Kind*[1] | Calculated as | Coating amount (calculated as Al or SiO$_2$) (wt %) |
| Example 121 | A | Al | 0.99 |
| Example 122 | S | SiO$_2$ | 0.98 |
| Example 123 | A | Al | 1.47 |
| | S | SiO$_2$ | 0.49 |
| Example 124 | A | Al | 3.85 |
| Example 125 | A | Al | 1.96 |
| | S | SiO$_2$ | 0.49 |
| Example 126 | S | SiO$_2$ | 1.96 |
| Example 127 | A | Al | 13.00 |

Note *[1]: "A" represents a hydroxide of aluminum.
"S" represents an oxide of silicon.

TABLE 29

Properties of acicular hematite particles washed with water after surface-treatment

| Examples | Average major axial diameter (μm) | Geometrical standard deviation of major axial diameter (-) | Average minor axial diameter (μm) | Geometrical standard deviation of minor axial diameter (-) |
|---|---|---|---|---|
| Example 121 | 0.131 | 1.34 | 0.0188 | 1.33 |
| Example 122 | 0.142 | 1.35 | 0.0179 | 1.34 |
| Example 123 | 0.173 | 1.31 | 0.0217 | 1.32 |
| Example 124 | 0.195 | 1.33 | 0.0232 | 1.34 |
| Example 125 | 0.163 | 1.33 | 0.0195 | 1.31 |
| Example 126 | 0.121 | 1.35 | 0.0166 | 1.32 |
| Example 127 | 0.195 | 1.33 | 0.0227 | 1.33 |

Properties of acicular hematite particles washed with water after surface-treatment

| Examples | Aspect ratio (-) | Content of Al*[2] (wt %) | S$_{BET}$ (m$^2$/g) | S$_{TEM}$ (m$^2$/g) | S$_{BET}$/S$_{TEM}$ value (-) |
|---|---|---|---|---|---|
| Example 121 | 7.0:1 | 1.22 | 57.3 | 43.9 | 1.31 |
| Example 122 | 7.9:1 | 1.83 | 58.1 | 45.7 | 1.27 |
| Example 123 | 8.0:1 | 0.91 | 48.9 | 37.7 | 1.30 |
| Example 124 | 8.4:1 | 3.92 | 46.9 | 35.1 | 1.34 |
| Example 125 | 8.4:1 | 1.85 | 61.2 | 41.8 | 1.46 |
| Example 126 | 7.3:1 | 2.36 | 63.6 | 49.5 | 1.28 |
| Example 127 | 8.6:1 | 0.52 | 47.4 | 35.9 | 1.32 |

Properties of acicular hematite particles washed with water after surface-treatment

| Examples | Amount of sintering preventive Calculated as | Amount of sintering preventive Content (wt %) | Soluble sodium salt (calculated as Na) (ppm) | Soluble sulfate (Calculated as SO$_4$) (ppm) | pH value (-) | Resin adsorption (%) |
|---|---|---|---|---|---|---|
| Example 121 | SiO$_2$ | 0.44 | 91 | 1 | 9.4 | 78.2 |
| Example 122 | SiO$_2$ | 0.77 | 78 | 5 | 9.2 | 81.2 |
| | P | 0.32 | | | | |
| Example 123 | P | 0.48 | 63 | 6 | 9.1 | 83.6 |
| Example 124 | P | 0.61 | 71 | 2 | 9.0 | 84.1 |
| Example 125 | SiO$_2$ | 2.25 | 58 | 8 | 8.9 | 80.6 |
| Example 126 | P | 0.50 | 62 | 3 | 9.0 | 79.8 |
| Example 127 | SiO$_2$ | 1.68 | 65 | 1 | 9.2 | 81.6 |
| | P | 0.34 | | | | |

Note*[2]: Al content excluding amount of Al in surface-coating layer.

TABLE 30

| | Production of non-magnetic coating composition | | Non-magnetic coating composition Viscosity (cP) |
|---|---|---|---|
| Examples | Kind of acicular hematite particles | Weight ratio of particles to resin (-) | |
| Example 128 | Example 114 | 5.0 | 333 |
| Example 129 | Example 115 | 5.0 | 358 |
| Example 130 | Example 116 | 5.0 | 333 |
| Example 131 | Example 117 | 5.0 | 284 |
| Example 132 | Example 118 | 5.0 | 230 |
| Example 133 | Example 119 | 5.0 | 410 |
| Example 134 | Example 120 | 5.0 | 384 |
| Example 135 | Example 121 | 5.0 | 333 |
| Example 136 | Example 122 | 5.0 | 284 |
| Example 137 | Example 123 | 5.0 | 333 |
| Example 138 | Example 124 | 5.0 | 207 |
| Example 139 | Example 125 | 5.0 | 230 |
| Example 140 | Example 126 | 5.0 | 284 |
| Example 141 | Example 127 | 5.0 | 207 |

Properties of non-magnetic undercoat layer

| Examples | Thickness (μm) | Gloss (%) | Surface roughness Ra (nm) | Young's modulus (relative value) |
|---|---|---|---|---|
| Example 128 | 3.5 | 212 | 6.2 | 123 |
| Example 129 | 3.4 | 201 | 6.4 | 123 |
| Example 130 | 3.4 | 205 | 6.4 | 128 |
| Example 131 | 3.5 | 203 | 6.4 | 130 |
| Example 132 | 3.4 | 218 | 5.4 | 128 |
| Example 133 | 3.3 | 220 | 5.8 | 125 |
| Example 134 | 3.4 | 216 | 5.7 | 134 |
| Example 135 | 3.5 | 213 | 5.8 | 127 |
| Example 136 | 3.5 | 210 | 6.0 | 127 |
| Example 137 | 3.5 | 213 | 6.1 | 130 |
| Example 138 | 3.5 | 216 | 5.8 | 136 |
| Example 139 | 3.4 | 223 | 5.0 | 129 |
| Example 140 | 3.3 | 221 | 5.6 | 125 |
| Example 141 | 3.5 | 220 | 5.0 | 136 |

TABLE 31

| Comparative Examples and Reference Examples | Production of non-magnetic coating composition Kind of acicular hematite particles | Weight ratio of particles to resin (-) | Non-magnetic coating composition Viscosity (cP) |
|---|---|---|---|
| Comparative Example 54 | Comparative Example 41 | 5.0 | 7,680 |
| Comparative Example 55 | Comparative Example 43 | 5.0 | 10,240 |
| Comparative Example 56 | Comparative Example 47 | 5.0 | 384 |
| Comparative Example 57 | Comparative Example 48 | 5.0 | 640 |
| Comparative Example 58 | Comparative Example 49 | 5.0 | 5,632 |

TABLE 31-continued

| | | | |
|---|---|---|---|
| Comparative Example 59 | Comparative Example 50 | 5.0 | 230 |
| Comparative Example 60 | Comparative Example 51 | 5.0 | 410 |
| Comparative Example 61 | Comparative Example 52 | 5.0 | 384 |
| Comparative Example 62 | Comparative Example 53 | 5.0 | 435 |
| Reference Example 32 | Example 107 | 5.0 | 384 |
| Reference Example 33 | Example 108 | 5.0 | 410 |
| Reference Example 34 | Example 109 | 5.0 | 410 |
| Reference Example 35 | Example 110 | 5.0 | 281 |
| Reference Example 36 | Example 111 | 5.0 | 281 |
| Reference Example 37 | Example 112 | 5.0 | 410 |
| Reference Example 38 | Example 113 | 5.0 | 384 |
| Reference Example 39 | Reference Example 30 | 5.0 | 384 |
| Reference Example 40 | Reference Example 31 | 5.0 | 320 |

| Comparative Examples and Reference Examples | Properties of nonmagnetic undercoat layer | | | |
|---|---|---|---|---|
| | Thickness (μm) | Gloss (%) | Surface roughness Ra (nm) | Young's modulus (relative value) |
| Comparative Example 54 | 3.5 | 126 | 20.6 | 106 |
| Comparative Example 55 | 3.7 | 88 | 38.9 | 99 |
| Comparative Example 56 | 3.5 | 142 | 20.2 | 110 |
| Comparative Example 57 | 3.5 | 173 | 12.3 | 111 |
| Comparative Example 58 | 3.6 | 126 | 26.5 | 106 |
| Comparative Example 59 | 3.5 | 160 | 18.2 | 106 |
| Comparative Example 60 | 3.5 | 183 | 9.9 | 114 |
| Comparative Example 61 | 3.5 | 189 | 9.2 | 116 |
| Comparative Example 62 | 3.5 | 175 | 13.6 | 116 |
| Reference Example 32 | 3.5 | 200 | 7.2 | 123 |
| Reference Example 33 | 3.4 | 195 | 7.6 | 121 |
| Reference Example 34 | 3.5 | 198 | 6.8 | 120 |
| Reference Example 35 | 3.4 | 196 | 7.4 | 132 |
| Reference Example 36 | 3.5 | 211 | 6.4 | 126 |
| Reference Example 37 | 3.5 | 211 | 6.0 | 124 |
| Reference Example 38 | 3.4 | 211 | 6.3 | 131 |
| Reference Example 39 | 3.5 | 210 | 6.8 | 121 |
| Reference Example 40 | 3.4 | 206 | 6.8 | 124 |

TABLE 32

| Production of magnetic recording medium | | | |
|---|---|---|---|
| Examples | Kind of nonmagnetic substrate | Kind of magnetic particles | Weight ratio of particles to resin (–) |
| Example 142 | Example 128 | Particles used in Example 7 | 5.0 |
| Example 143 | Example 129 | Magnetic metal particles (a) | 5.0 |
| Example 144 | Example 130 | Magnetic metal particles (a) | 5.0 |
| Example 145 | Example 131 | Magnetic metal particles (b) | 5.0 |
| Example 146 | Example 132 | Magnetic metal particles (b) | 5.0 |
| Example 147 | Example 133 | Magnetic metal particles (c) | 5.0 |
| Example 148 | Example 134 | Magnetic metal particles (c) | 5.0 |
| Example 149 | Example 135 | Particles used in Example 7 | 5.0 |
| Example 150 | Example 136 | Magnetic metal particles (a) | 5.0 |
| Example 151 | Example 137 | Magnetic metal particles (a) | 5.0 |
| Example 152 | Example 138 | Magnetic metal particles (b) | 5.0 |
| Example 153 | Example 139 | Magnetic metal particles (b) | 5.0 |
| Example 154 | Example 140 | Magnetic metal particles (c) | 5.0 |
| Example 155 | Example 141 | Magnetic metal particles (c) | 5.0 |

| Properties of magnetic recording medium | | | | |
|---|---|---|---|---|
| Examples | Thickness of magnetic layer (μm) | Coercive force (Hc) (Oe) | Br/Bm value (–) | Gloss (%) |
| Example 142 | 1.0 | 1,979 | 0.87 | 230 |
| Example 143 | 1.0 | 1,984 | 0.87 | 226 |
| Example 144 | 1.0 | 1,990 | 0.88 | 226 |
| Example 145 | 1.0 | 2,005 | 0.87 | 220 |
| Example 146 | 1.0 | 1,994 | 0.87 | 243 |
| Example 147 | 1.1 | 2,141 | 0.88 | 245 |
| Example 148 | 1.1 | 2,146 | 0.88 | 238 |
| Example 149 | 1.1 | 1,981 | 0.88 | 231 |
| Example 150 | 1.0 | 1,994 | 0.88 | 236 |
| Example 151 | 1.0 | 1,980 | 0.89 | 230 |
| Example 152 | 1.1 | 2,001 | 0.90 | 237 |
| Example 153 | 1.0 | 2,010 | 0.89 | 245 |
| Example 154 | 1.0 | 2,141 | 0.90 | 241 |
| Example 155 | 1.0 | 2,138 | 0.90 | 243 |

| Properties of magnetic recording medium | | | | |
|---|---|---|---|---|
| Examples | Surface roughness Ra (nm) | Young's modulus (relative value) | Linear absorption coefficient (μm$^{-1}$) | Durability Running time (min) | Scratch resistance |
| Example 142 | 5.8 | 127 | 1.22 | 29.6 | A |
| Example 143 | 6.4 | 129 | 1.24 | 24.8 | B |
| Example 144 | 6.2 | 128 | 1.26 | 24.8 | B |
| Example 145 | 6.4 | 131 | 1.28 | 27.7 | A |
| Example 146 | 6.0 | 132 | 1.27 | 28.9 | A |
| Example 147 | 5.8 | 131 | 1.24 | ≧30 | A |
| Example 148 | 6.1 | 132 | 1.25 | ≧30 | A |
| Example 149 | 5.8 | 128 | 1.25 | ≧30 | A |
| Example 150 | 5.5 | 132 | 1.25 | ≧30 | A |

TABLE 32-continued

| Example 151 | 6.1 | 133 | 1.26 | ≧30 | A |
|---|---|---|---|---|---|
| Example 152 | 6.0 | 136 | 1.28 | ≧30 | A |
| Example 153 | 5.3 | 137 | 1.26 | ≧30 | A |
| Example 154 | 5.8 | 135 | 1.25 | ≧30 | A |
| Example 155 | 5.9 | 133 | 1.25 | ≧30 | A |

| | Properties of magnetic recording medium Corrosion resistance | |
|---|---|---|
| Examples | Percentage of change in coercive force (%) | Percentage of change in $B_m$ (%) |
| Example 142 | 3.1 | 2.8 |
| Example 143 | 4.2 | 4.6 |
| Example 144 | 4.6 | 3.1 |
| Example 145 | 2.6 | 2.1 |
| Example 146 | 3.5 | 1.8 |
| Example 147 | 3.2 | 3.4 |
| Example 148 | 3.4 | 3.8 |
| Example 149 | 3.4 | 2.6 |
| Example 150 | 4.1 | 1.6 |
| Example 151 | 4.6 | 4.1 |
| Example 152 | 1.8 | 3.8 |
| Example 153 | 0.8 | 0.6 |
| Example 154 | 2.6 | 2.8 |
| Example 155 | 2.6 | 1.6 |

TABLE 33

| | Production of magnetic recording medium | | |
|---|---|---|---|
| Comparative Examples and Reference Examples | Kind of non-magnetic substrate | Kind of magnetic particles | Weight ratio of particles to resin (-) |
| Comparative Example 63 | Comparative Example 54 | Magnetic metal particles (a) | 5.0 |
| Comparative Example 64 | Comparative Example 55 | Magnetic metal particles (a) | 5.0 |
| Comparative Example 65 | Comparative Example 56 | Magnetic metal particles (a) | 5.0 |
| Comparative Example 66 | Comparative Example 57 | Magnetic metal particles (a) | 5.0 |
| Comparative Example 67 | Comparative Example 58 | Magnetic metal particles (a) | 5.0 |
| Comparative Example 68 | Comparative Example 59 | Magnetic metal particles (d) | 5.0 |
| Comparative Example 69 | Comparative Example 60 | Magnetic metal particles (d) | 5.0 |
| Comparative Example 70 | Comparative Example 61 | Magnetic metal particles (d) | 5.0 |
| Comparative Example 71 | Comparative Example 62 | Magnetic metal particles (d) | 5.0 |
| Reference Example 41 | Reference Example 32 | Magnetic metal particles (a) | 5.0 |
| Reference Example 42 | Reference Example 33 | Magnetic metal particles (a) | 5.0 |
| Reference Example 43 | Reference Example 34 | Magnetic metal particles (a) | 5.0 |
| Reference Example 44 | Reference Example 35 | Magnetic metal particles (a) | 5.0 |
| Reference Example 45 | Reference Example 36 | Magnetic metal particles (a) | 5.0 |
| Reference Example 46 | Reference Example 37 | Magnetic metal particles (d) | 5.0 |
| Reference Example 47 | Reference Example 38 | Magnetic metal particles (d) | 5.0 |
| Reference Example 48 | Reference Example 39 | Magnetic metal particles (d) | 5.0 |
| Reference Example 49 | Reference Example 40 | Magnetic metal particles (d) | 5.0 |

TABLE 33-continued

| | Properties of magnetic recording medium | | | |
|---|---|---|---|---|
| Comparative Examples and Reference Examples | Thickness of magnetic layer (μm) | Coercive force (Hc) (Oe) | Br/Bm value (-) | Gloss (%) |
| Comparative Example 63 | 1.2 | 1,957 | 0.78 | 135 |
| Comparative Example 64 | 1.3 | 1,961 | 0.76 | 118 |
| Comparative Example 65 | 1.1 | 1,968 | 0.82 | 173 |
| Comparative Example 66 | 1.1 | 1,963 | 0.84 | 182 |
| Comparative Example 67 | 1.2 | 1,954 | 0.78 | 161 |
| Comparative Example 68 | 1.1 | 1,863 | 0.84 | 178 |
| Comparative Example 69 | 1.0 | 1,871 | 0.85 | 190 |
| Comparative Example 70 | 1.1 | 1,878 | 0.85 | 189 |
| Comparative Example 71 | 1.0 | 1,876 | 0.83 | 182 |
| Reference Example 41 | 1.1 | 1,986 | 0.87 | 217 |
| Reference Example 42 | 1.1 | 1,991 | 0.87 | 214 |
| Reference Example 43 | 1.1 | 1,984 | 0.87 | 212 |
| Reference Example 44 | 1.1 | 1,989 | 0.87 | 210 |
| Reference Example 45 | 1.1 | 1,986 | 0.87 | 213 |
| Reference Example 46 | 1.2 | 1,909 | 0.88 | 218 |
| Reference Example 47 | 1.1 | 1,910 | 0.88 | 220 |
| Reference Example 48 | 1.1 | 1,891 | 0.88 | 216 |
| Reference Example 49 | 1.1 | 1,900 | 0.88 | 220 |

| | Properties of magnetic recording medium | | | | |
|---|---|---|---|---|---|
| Comparative Examples and Reference Examples | Surface roughness Ra (nm) | Young's modulus (relative value) | Linear absorption coefficient (μm$^{-1}$) | Durability Running time (min) | Scratch resistance |
| Comparative Example 63 | 24.3 | 113 | 1.04 | 8.3 | D |
| Comparative Example 64 | 38.5 | 96 | 1.09 | 1.6 | D |
| Comparative Example 65 | 19.8 | 112 | 1.16 | 9.2 | D |
| Comparative Example 66 | 12.6 | 113 | 1.14 | 14.5 | C |
| Comparative Example 67 | 21.9 | 110 | 1.06 | 12.6 | C |
| Comparative Example 68 | 12.5 | 113 | 1.09 | 13.6 | C |
| Comparative Example 69 | 10.7 | 116 | 1.15 | 11.8 | D |
| Comparative Example 70 | 11.0 | 119 | 1.17 | 12.3 | C |
| Comparative Example 71 | 13.1 | 119 | 1.13 | 13.6 | C |
| Reference Example 41 | 6.8 | 123 | 1.21 | 23.8 | B |
| Reference Example 42 | 6.8 | 123 | 1.22 | 24.2 | B |
| Reference Example 43 | 7.2 | 128 | 1.22 | 24.4 | B |

TABLE 33-continued

| | | | | | |
|---|---|---|---|---|---|
| Reference Example 44 | 7.2 | 130 | 1.24 | 23.4 | B |
| Reference Example 45 | 6.8 | 126 | 1.25 | 25.6 | A |
| Reference Example 46 | 6.2 | 125 | 1.24 | 22.3 | B |
| Reference Example 47 | 6.0 | 125 | 1.24 | 23.9 | B |
| Reference Example 48 | 6.2 | 125 | 1.25 | 24.2 | B |
| Reference Example 49 | 6.0 | 125 | 1.25 | 24.8 | B |

| Comparative Examples and Reference Examples | Properties of magnetic recording medium Corrosion resistance | |
|---|---|---|
| | Percentage of change in coercive force (%) | Percentage of change in $B_m$ (%) |
| Comparative Example 63 | 38.2 | 32.6 |
| Comparative Example 64 | 41.2 | 28.1 |
| Comparative Example 65 | 36.5 | 29.2 |
| Comparative Example 66 | 31.3 | 26.5 |
| Comparative Example 67 | 32.1 | 21.3 |
| Comparative Example 68 | 36.5 | 16.8 |
| Comparative Example 69 | 17.9 | 17.8 |
| Comparative Example 70 | 16.5 | 21.6 |
| Comparative Example 71 | 19.8 | 17.3 |
| Reference Example 41 | 11.8 | 11.6 |
| Reference Example 42 | 15.8 | 16.8 |
| Reference Example 43 | 11.6 | 18.6 |
| Reference Example 44 | 10.8 | 13.2 |
| Reference Example 45 | 10.1 | 10.9 |
| Reference Example 46 | 13.2 | 14.1 |
| Reference Example 47 | 11.8 | 13.1 |
| Reference Example 48 | 14.1 | 12.8 |
| Reference Example 49 | 12.0 | 10.9 |

TABLE 34

| | Properties of acicular goethite particles | | | |
|---|---|---|---|---|
| Kind of Precursor | Shape | Average major axial diameter ($\mu$m) | Geometrical standard deviation of major axial diameter (-) | |
| Goethite particles 1 | Spindle-shaped | 0.0593 | 1.56 | |
| Goethite particles 2 | Acicular | 0.0932 | 1.53 | |

| | Properties of acicular goethite particles | | |
|---|---|---|---|
| Kind of Precursor | Average minor axial diameter ($\mu$m) | Geometrical standard deviation of minor axial diameter (-) | Aspect ratio (-) |
| Goethite particles 1 | 0.0096 | 1.37 | 6.2:1 |
| Goethite particles 2 | 0.0126 | 1.39 | 7.4:1 |

| | Properties of acicular goethite particles | | | |
|---|---|---|---|---|
| Kind of Precursor | BET specific surface area ($m^2$/g) | Soluble sodium salt (calculated as Na) (ppm) | Soluble sulfate (calculated as $SO_4$) (ppm) | pH value (-) |
| Goethite particles 1 | 231.3 | 563 | 412 | 5.8 |
| Goethite particles 2 | 186.8 | 1,126 | 368 | 7.8 |

TABLE 35

| | Properties of acicular goethite particles subjected to anti-sintering treatment | | |
|---|---|---|---|
| Precursor | Kind of Precursor | Average major axial diameter ($\mu$m) | Geometrical standard deviation of major axial diameter (-) |
| Goethite particles 3 | Particles obtained in Example 8 | 0.0813 | 1.53 |
| Goethite particles 4 | Goethite particles 1 | 0.0593 | 1.56 |
| Goethite particles 5 | Goethite particles 2 | 0.0931 | 1.53 |

| | Properties of acicular goethite particles subjected to anti-sintering treatment | | |
|---|---|---|---|
| Precursor | Average minor axial diameter ($\mu$m) | Geometrical standard deviation of minor axial diameter (-) | Aspect ratio (-) |
| Goethite particles 3 | 0.0110 | 1.37 | 7.4:1 |
| Goethite particles 4 | 0.0096 | 1.37 | 6.2:1 |
| Goethite particles 5 | 0.0128 | 1.39 | 7.3:1 |

| | Properties of acicular goethite particles subjected to anti-sintering treatment | | |
|---|---|---|---|
| | BET specific surface area | Sintering preventive | |
| Precursor | ($m^2$/g) | Calculated as | Amount (wt %) |
| Goethite particles 3 | 190.8 | P | 1.08 |
| Goethite particles 4 | 228.6 | P | 1.64 |
| Goethite particles 5 | 185.2 | $SiO_2$ | 1.09 |

| | Properties of acicular goethite particles subjected to anti-sintering treatment | |
|---|---|---|
| | Soluble sodium salt | Soluble sulfate |

TABLE 35-continued

| Precursor | (calculated as Na) (ppm) | (Calculated as SO$_4$) (ppm) | pH value (-) |
|---|---|---|---|
| Goethite particles 3 | 813 | 412 | 7.6 |
| Goethite particles 4 | 612 | 515 | 6.1 |
| Goethite particles 5 | 1,326 | 412 | 8.0 |

TABLE 36

| | | Conditions of heat-treatment | | |
|---|---|---|---|---|
| Goethite particles | Kind of Precursor | Atmosphere | Temperature (° C.) | Time (min) |
| Goethite particles 6 | Goethite particles 3 | Air | 150 | 30 |
| Goethite particles 7 | Goethite particles 4 | Air | 180 | 30 |
| Goethite particles 8 | Goethite particles 5 | Air | 120 | 20 |
| Goethite particles 9 | Goethite particles 4 | Air | 80 | 30 |

TABLE 37

Properties of acicular goethite particles heat-treated

| Kind of goethite particles | Average major axial diameter ($\mu$m) | Geometrical standard deviation of major axial diameter (-) | Average minor axial diameter ($\mu$m) | Geometrical standard deviation of minor axial diameter (-) |
|---|---|---|---|---|
| Goethite particles 6 | 0.0812 | 1.38 | 0.0109 | 1.16 |
| Goethite particles 7 | 0.0591 | 1.43 | 0.0098 | 1.21 |
| Goethite particles 8 | 0.0930 | 1.36 | 0.0128 | 1.25 |
| Goethite particles 9 | 0.0590 | 1.53 | 0.0099 | 1.37 |

Properties of acicular goethite particles heat-treated

| Kind of goethite particles | Aspect ratio (-) | BET specific surface area (m$^2$/g) | Sintering preventive Calculated as | Sintering preventive Amount (wt %) |
|---|---|---|---|---|
| Goethite particles 6 | 7.4:1 | 191.2 | P | 1.18 |
| Goethite particles 7 | 6.0:1 | 227.6 | P | 1.82 |
| Goethite particles 8 | 7.3:1 | 184.8 | SiO$_2$ | 1.20 |
| Goethite particles 9 | 6.0:1 | 225.1 | P | 1.80 |

Properties of acicular goethite particles heat-treated

| Kind of goethite | Soluble sodium salt (calculated as Na) (ppm) | Soluble sulfate (calculated as SO$_4$) (ppm) | pH value (-) |
|---|---|---|---|
| Goethite particles 6 | 883 | 446 | 7.5 |
| Goethite particles 7 | 710 | 532 | 6.0 |
| Goethite particles 8 | 1,410 | 483 | 7.9 |
| Goethite particles 9 | 681 | 518 | 6.1 |

TABLE 38

| Kind of particles to be treated | Kind of goethite particles | Conditions of heat-dehydration treatment Atmosphere | Temperature (° C.) | Time (min) |
|---|---|---|---|---|
| Hematite particles 1 | Goethite particles 6 | Air | 320 | 20 |
| Hematite particles 2 | Goethite particles 7 | Air | 340 | 30 |
| Hematite particles 3 | Goethite particles 8 | Air | 350 | 20 |
| Hematite particles 4 | Goethite particles 4 | Air | 340 | 20 |

TABLE 39

Properties of low-density acicular hematite particles

| Kind of particles to be treated | Average major axial diameter ($\mu$m) | Geometrical standard deviation of major axial diameter (-) | Average minor axial diameter ($\mu$m) | Geometrical standard deviation of minor axial diameter (-) |
|---|---|---|---|---|
| Hematite particles 1 | 0.0731 | 1.37 | 0.0113 | 1.16 |
| Hematite particles 2 | 0.0533 | 1.43 | 0.0103 | 1.20 |
| Hematite particles 3 | 0.0841 | 1.36 | 0.0131 | 1.25 |
| Hematite particles 4 | 0.0531 | 1.56 | 0.0104 | 1.37 |

Properties of low-density acicular hematite particles

| Kind of particles to be treated | Aspect ratio (-) | S$_{BET}$ (m$^2$/g) | S$_{TEM}$ (m$^2$/g) | S$_{BET}$/S$_{TEM}$ value (-) |
|---|---|---|---|---|
| Hematite particles 1 | 6.5:1 | 226.5 | 73.3 | 3.09 |
| Hematite particles 2 | 5.2:1 | 263.8 | 81.9 | 3.22 |
| Hematite particles 3 | 6.4:1 | 216.8 | 63.3 | 3.43 |
| Hematite particles 4 | 5.1:1 | 226.6 | 81.2 | 2.79 |

Properties of low-density acicular hematite particles

| Kind of particles | Sintering preventive | Soluble sodium salt (calculated as | Soluble sulfate (calculated as | pH |
|---|---|---|---|---|

TABLE 39-continued

| to be treated | Calculated as | Amount (wt %) | Na) (ppm) | SO$_4$) (ppm) | value (-) |
|---|---|---|---|---|---|
| Hematite particles 1 | P | 1.18 | 1,625 | 913 | 7.4 |
| Hematite particles 2 | P | 1.81 | 1,321 | 615 | 6.0 |
| Hematite particles 3 | SiO$_2$ | 1.20 | 1,821 | 516 | 7.6 |
| Hematite particles 4 | P | 1.79 | 1,326 | 712 | 6.3 |

TABLE 40

| Kind of particles to be treated | Kind of particles to be treated | Conditions of high-temperature heat-treatment | | |
|---|---|---|---|---|
| | | Atmosphere | Temperature (° C.) | Time (min) |
| Hematite particles 5 | Hematite particles 1 | Air | 680 | 30 |
| Hematite particles 6 | Hematite particles 2 | Air | 630 | 40 |
| Hematite particles 7 | Hematite particles 3 | Air | 600 | 40 |
| Hematite particles 8 | Goethite particles 7 | Air | 650 | 20 |
| Hematite particles 9 | Goethite particles 1 | Air | 700 | 30 |
| Hematite particles 10 | Goethite particles 9 | Air | 630 | 30 |
| Hematite particles 11 | Hematite particles 4 | Air | 680 | 30 |
| Hematite particles 12 | Hematite particles 3 | Air | 450 | 30 |
| Hematite particles 13 | Hematite particles 3 | Air | 900 | 30 |

TABLE 41

Properties of high-density acicular hematite particles

| Kind of particles to be treated | Average major axial diameter (μm) | Geometrical standard deviation of major axial diameter (-) | Average minor axial diameter (μm) | Geometrical standard deviation of minor axial diameter (-) |
|---|---|---|---|---|
| Hematite particles 5 | 0.0730 | 1.37 | 0.0114 | 1.16 |
| Hematite particles 6 | 0.0531 | 1.43 | 0.0103 | 1.20 |
| Hematite particles 7 | 0.0840 | 1.36 | 0.0130 | 1.25 |
| Hematite particles 8 | 0.0583 | 1.40 | 0.0108 | 1.27 |
| Hematite particles 9 | 0.0432 | 1.61 | 0.0156 | 1.39 |
| Hematite particles 10 | 0.0456 | 1.59 | 0.0152 | 1.39 |
| Hematite particles 11 | 0.0528 | 1.56 | 0.0107 | 1.37 |
| Hematite particles 12 | 0.0841 | 1.35 | 0.0132 | 1.28 |
| Hematite particles 13 | 0.0613 | 1.59 | 0.0232 | 1.38 |

Properties of high-density acicular hematite particles

| Kind of particles | Aspect ratio (-) | S$_{BET}$ (m$^2$/g) | S$_{TEM}$ (m$^2$/g) | S$_{BET}$/S$_{TEM}$ value (-) |
|---|---|---|---|---|
| Hematite particles 5 | 6.4:1 | 81.2 | 72.7 | 1.12 |
| Hematite particles 6 | 5.2:1 | 91.6 | 81.9 | 1.12 |
| Hematite particles 7 | 6.5:1 | 71.6 | 63.8 | 1.12 |
| Hematite particles 8 | 5.4:1 | 84.6 | 77.8 | 1.09 |
| Hematite particles 9 | 2.8:1 | 58.2 | 58.2 | 1.00 |
| Hematite particles 10 | 3.0:1 | 72.3 | 59.0 | 1.22 |
| Hematite particles 11 | 4.9:1 | 65.6 | 79.2 | 0.83 |
| Hematite particles 12 | 6.4:1 | 186.2 | 62.8 | 2.96 |
| Hematite particles 13 | 2.6:1 | 36.8 | 39.4 | 0.93 |

Properties of high-density acicular hematite particles

| Kind of particles to be treated | Sintering preventive Calculated as | Amount (wt %) | Soluble sodium salt (calculated as Na) (ppm) | Soluble sulfate (calculated as SO$_4$) (ppm) | pH value (-) |
|---|---|---|---|---|---|
| Hematite particles 5 | P | 1.18 | 2,863 | 2,162 | 6.9 |
| Hematite particles 6 | P | 1.81 | 2,068 | 1,865 | 5.9 |
| Hematite particles 7 | SiO$_2$ | 1.20 | 2,365 | 3,100 | 6.0 |
| Hematite particles 8 | P | 1.82 | 1,563 | 2,016 | 5.6 |
| Hematite particles 9 | P | 1.79 | 2,880 | 2,266 | 6.8 |
| Hematite particles 10 | P | 1.81 | 1,865 | 1,265 | 5.8 |
| Hematite particles 11 | P | 1.79 | 2,653 | 2,565 | 5.9 |
| Hematite particles 12 | SiO$_2$ | 1.20 | 1,865 | 2,011 | 5.6 |
| Hematite particles 13 | SiO$_2$ | 1.21 | 1,780 | 2,025 | 5.6 |

TABLE 42

| Examples and Reference Examples | Kind of particles to be treated | Heat-treatment in aqueous alkali solution | | |
|---|---|---|---|---|
| | | pH value (-) | Temperature (° C.) | Time (min) |
| Example 156 | Hematite particles 5 | 13.7 | 85 | 210 |
| Example 157 | Hematite particles 6 | 13.4 | 95 | 120 |
| Example 158 | Hematite particles 7 | 13.8 | 90 | 240 |
| Example 159 | Hematite particles 8 | 13.1 | 98 | 180 |
| Reference Example 50 | Hematite particles 5 | 8.9 | 80 | 180 |
| Reference Example 51 | Hematite particles 5 | 13.5 | 40 | 180 |

TABLE 43

Properties of high-density acicular hematite particles washed with water after heat-treatment in aqueous alkali solution

| Examples and Reference Examples | Average major axial diameter ($\mu$m) | Geometrical standard deviation of major axial diameter (-) | Average minor axial diameter ($\mu$m) | Geometrical standard deviation of minor axial diameter (-) |
|---|---|---|---|---|
| Example 156 | 0.0731 | 1.36 | 0.0114 | 1.16 |
| Example 157 | 0.0532 | 1.42 | 0.0102 | 1.21 |
| Example 158 | 0.0840 | 1.36 | 0.0129 | 1.26 |
| Example 159 | 0.0583 | 1.39 | 0.0108 | 1.27 |
| Reference Example 50 | 0.0730 | 1.37 | 0.0114 | 1.17 |
| Reference Example 51 | 0.0730 | 1.37 | 0.0114 | 1.17 |

Properties of high-density acicular hematite particles washed with water after heat-treatment in aqueous alkali solution

| Examples and Reference Examples | Aspect ratio (-) | $S_{BET}$ (m$^2$/g) | $S_{TEM}$ (m$^2$/g) | $S_{BET}/S_{TEM}$ value (-) |
|---|---|---|---|---|
| Example 156 | 6.4:1 | 81.2 | 72.7 | 1.13 |
| Example 157 | 5.2:1 | 92.6 | 82.6 | 1.12 |
| Example 158 | 6.5:1 | 72.1 | 64.2 | 1.12 |
| Example 159 | 5.4:1 | 84.8 | 77.8 | 1.09 |
| Reference Example 50 | 6.4:1 | 82.6 | 72.7 | 1.14 |
| Reference Example 51 | 6.4:1 | 81.9 | 72.7 | 1.13 |

Properties of high-density acicular hematite particles washed with water after heat-treatment in aqueous alkali solution

| Examples and Reference Examples | Sintering preventive Calculated as | Sintering preventive Amount (wt %) | Soluble sodium salt (calculated as Na) (ppm) | Soluble sulfate (calculated as SO$_4$) (ppm) | pH value (-) |
|---|---|---|---|---|---|
| Example 156 | P | 0.56 | 86 | 12 | 9.1 |
| Example 157 | P | 0.93 | 73 | 6 | 9.2 |
| Example 158 | SiO$_2$ | 1.16 | 125 | 38 | 9.3 |
| Example 159 | P | 0.91 | 113 | 21 | 9.3 |
| Reference Example 50 | P | 1.18 | 436 | 216 | 7.6 |
| Reference Example 51 | P | 1.18 | 365 | 182 | 7.7 |

TABLE 44

| Examples | Kind of particles to be treated | Concentration of water suspension (g/liter) |
|---|---|---|
| Example 160 | Example 156 | 45 |
| Example 161 | Example 157 | 45 |
| Example 162 | Example 158 | 45 |
| Example 163 | Example 159 | 45 |

TABLE 44-continued

Coating treatment with aluminum compound or silicon compound

| Examples | pH value before addition (-) | Kind of additives | Amount added (calculated as Al or SiO$_2$) (wt %) | Final pH value (-) |
|---|---|---|---|---|
| Example 160 | 4.0 | Aluminum acetate | 3.0 | 7.1 |
| Example 161 | 10.0 | Water glass #3 | 1.0 | 6.9 |
| Example 162 | 10.3 | Sodium aluminate | 5.0 | 7.5 |
| Example 163 | 10.2 | Sodium aluminate<br>Water glass #3 | 2.0<br>0.5 | 7.0 |

TABLE 45

Properties of acicular hematite particles after surface-coating treatment

| Examples | Average major axial diameter ($\mu$m) | Geometrical standard deviation of major axial diameter (-) | Average minor axial diameter ($\mu$m) | Geometrical standard deviation of minor axial diameter (-) |
|---|---|---|---|---|
| Example 160 | 0.0731 | 1.36 | 0.0114 | 1.17 |
| Example 161 | 0.0531 | 1.42 | 0.0102 | 1.20 |
| Example 162 | 0.0840 | 1.36 | 0.0129 | 1.26 |
| Example 163 | 0.0582 | 1.39 | 0.0108 | 1.27 |

Properties of acicular hematite particles after surface-coating treatment

| Examples | Aspect ratio (-) | $S_{BET}$ (m$^2$/g) | $S_{TEM}$ (m$^2$/g) | $S_{BET}/S_{TEM}$ value (-) |
|---|---|---|---|---|
| Example 160 | 6.4:1 | 83.1 | 72.7 | 1.14 |
| Example 161 | 5.2:1 | 92.8 | 82.7 | 1.12 |
| Example 162 | 6.5:1 | 74.1 | 64.2 | 1.15 |
| Example 163 | 5.4:1 | 86.0 | 77.8 | 1.10 |

Properties of acicular hematite particles after surface-coating treatment

| Examples | Sintering preventive Calculated as | Sintering preventive Amount (wt %) | Surface-coating amount of hydroxide of aluminum (calculated as Al) (wt %) | Surface-coating amount of oxide of silicon (calculated as SiO$_2$) (wt %) |
|---|---|---|---|---|
| Example 160 | P | 0.54 | 2.93 | — |
| Example 161 | P | 0.92 | — | 0.99 |
| Example 162 | SiO$_2$ | 1.08 | 4.72 | — |

TABLE 45-continued

| Example 163 | P | 0.89 | 1.95 | 0.50 |

| | Properties of acicular hematite particles after surface-coating treatment | | |
|---|---|---|---|
| Examples | Soluble sodium salt (calculated as Na) (ppm) | Soluble sulfate (calculated as SO$_4$) (ppm) | pH value (–) |
| Example 160 | 52 | 8 | 9.2 |
| Example 161 | 61 | 16 | 9.1 |
| Example 162 | 78 | 23 | 9.1 |
| Example 163 | 96 | 18 | 9.3 |

TABLE 46

| | Production of non-magnetic coating composition | | Non-magnetic coating composition Viscosity (cP) |
|---|---|---|---|
| Examples, Comparative Examples and Reference Examples | Kind of non-magnetic particles | Weight ratio of particles to resin (–) | |
| Example 164 | Example 155 | 5.0 | 512 |
| Example 165 | Example 156 | 5.0 | 435 |
| Example 166 | Example 157 | 5.0 | 410 |
| Example 167 | Example 158 | 5.0 | 384 |
| Example 168 | Example 159 | 5.0 | 307 |
| Example 169 | Example 160 | 5.0 | 358 |
| Example 170 | Example 161 | 5.0 | 461 |
| Example 171 | Example 162 | 5.0 | 384 |
| Comparative Example 72 | Hematite particles 9 | 5.0 | 717 |
| Comparative Example 73 | Hematite particles 10 | 5.0 | 614 |
| Comparative Example 74 | Hematite particles 11 | 5.0 | 563 |
| Comparative Example 75 | Hematite particles 12 | 5.0 | 14,410 |
| Comparative Example 76 | Hematite particles 13 | 5.0 | 307 |
| Reference Example 52 | Reference Example 50 | 5.0 | 563 |
| Reference Example 53 | Reference Example 51 | 5.0 | 589 |

| Examples, Comparative Examples and Reference Examples | Properties of non-magnetic undercoat layer | | | |
|---|---|---|---|---|
| | Thickness (μm) | Gloss (%) | Surface roughness Ra (nm) | Young's modulus (relative value) |
| Example 164 | 0.35 | 215 | 6.0 | 136 |
| Example 165 | 0.35 | 221 | 5.6 | 133 |
| Example 166 | 0.35 | 213 | 6.2 | 138 |
| Example 167 | 0.34 | 206 | 6.8 | 133 |
| Example 168 | 0.35 | 216 | 6.1 | 138 |
| Example 169 | 0.35 | 228 | 5.8 | 135 |
| Example 170 | 0.34 | 215 | 6.3 | 139 |
| Example 171 | 0.36 | 210 | 6.5 | 135 |
| Comparative Example 72 | 0.35 | 153 | 21.6 | 108 |
| Comparative Example 73 | 0.36 | 158 | 18.9 | 113 |*

TABLE 46-continued

| Comparative Example 74 | 0.35 | 168 | 16.8 | 119 |
| Comparative Example 75 | 0.37 | 102 | 32.1 | 90 |
| Comparative Example 76 | 0.34 | 173 | 16.2 | 81 |
| Reference Example 52 | 0.35 | 194 | 8.6 | 128 |
| Reference Example 53 | 0.35 | 191 | 8.8 | 128 |

TABLE 47

| | Production of magnetic recording medium | | |
|---|---|---|---|
| Examples, Comparative Examples and Reference Examples | Kind of non-magnetic substrate | Kind of magnetic particles | Weight ratio of particles to resin (–) |
| Example 172 | Example 164 | Magnetic metal particles (d) | 5.0 |
| Example 173 | Example 165 | Magnetic metal particles (d) | 5.0 |
| Example 174 | Example 168 | Magnetic metal particles (d) | 5.0 |
| Example 175 | Example 169 | Magnetic metal particles (d) | 5.0 |
| Example 176 | Example 164 | Magnetic metal particles (a) | 5.0 |
| Example 177 | Example 165 | Magnetic metal particles (b) | 5.0 |
| Example 178 | Example 166 | Magnetic metal particles (c) | 5.0 |
| Example 179 | Example 167 | Magnetic metal particles (c) | 5.0 |
| Example 180 | Example 168 | Magnetic metal particles (a) | 5.0 |
| Example 181 | Example 169 | Magnetic metal particles (b) | 5.0 |
| Example 182 | Example 170 | Magnetic metal particles (c) | 5.0 |
| Example 183 | Example 171 | Magnetic metal particles (c) | 5.0 |
| Comparative Example 77 | Comparative Example 72 | Magnetic metal particles (d) | 5.0 |
| Comparative Example 78 | Comparative Example 73 | Magnetic metal particles (d) | 5.0 |
| Comparative Example 79 | Comparative Example 74 | Magnetic metal particles (d) | 5.0 |
| Comparative Example 80 | Comparative Example 75 | Magnetic metal particles (d) | 5.0 |
| Comparative Example 81 | Comparative Example 76 | Magnetic metal particles (d) | 5.0 |
| Reference Example 54 | Reference Example 52 | Magnetic metal particles (d) | 5.0 |
| Reference Example 55 | Reference Example 53 | Magnetic metal particles (d) | 5.0 |

| Examples, Comparative Examples and Reference Examples | Properties of magnetic recording medium | | | |
|---|---|---|---|---|
| | Thickness of coating film (μm) | Coercive force (Hc) (Oe) | Br/Bm value (–) | Gloss (%) |
| Example 172 | 1.0 | 1,963 | 0.87 | 219 |
| Example 173 | 1.1 | 1,958 | 0.87 | 218 |
| Example 174 | 1.0 | 1,968 | 0.88 | 223 |
| Example 175 | 1.0 | 1,960 | 0.87 | 225 |
| Example 176 | 1.0 | 1,972 | 0.88 | 228 |
| Example 177 | 1.1 | 1,996 | 0.88 | 224 |
| Example 178 | 1.0 | 2,136 | 0.89 | 226 |
| Example 179 | 1.1 | 2,134 | 0.89 | 221 |

TABLE 47-continued

| | | | | |
|---|---|---|---|---|
| Example 180 | 1.0 | 1,986 | 0.89 | 233 |
| Example 181 | 1.0 | 2,001 | 0.89 | 235 |
| Example 182 | 1.0 | 2,127 | 0.90 | 238 |
| Example 183 | 1.1 | 2,130 | 0.89 | 221 |
| Comparative Example 77 | 1.2 | 1,956 | 0.78 | 163 |
| Comparative Example 78 | 1.2 | 1,958 | 0.76 | 173 |
| Comparative Example 79 | 1.1 | 1,965 | 0.82 | 178 |
| Comparative Example 80 | 1.1 | 1,959 | 0.80 | 168 |
| Comparative Example 81 | 1.1 | 1,961 | 0.78 | 156 |
| Reference Example 54 | 1.1 | 1,976 | 0.86 | 213 |
| Reference Example 55 | 1.0 | 1,980 | 0.86 | 210 |

| | Properties of magnetic recording medium | | | | |
|---|---|---|---|---|---|
| Examples, Comparative Examples and Reference Examples | Surface rough- ness Ra (nm) | Young's modulus (relative value) | Linear absorp- tion coeffi- cient ($\mu m^{-1}$) | Durability Running time (min) | Scratch resistance |
| Example 172 | 6.2 | 136 | 1.28 | 21.3 | B |
| Example 173 | 6.2 | 136 | 1.27 | 21.6 | B |
| Example 174 | 5.9 | 138 | 1.30 | 22.5 | A |
| Example 175 | 5.8 | 137 | 1.31 | 22.4 | A |
| Example 176 | 6.1 | 137 | 1.28 | 29.6 | A |
| Example 177 | 5.7 | 135 | 1.27 | 28.9 | A |
| Example 178 | 5.7 | 138 | 1.31 | ≧30 | A |
| Example 179 | 6.2 | 135 | 1.29 | 27.1 | B |
| Example 180 | 5.7 | 139 | 1.29 | ≧30 | A |
| Example 181 | 5.6 | 136 | 1.32 | ≧30 | A |
| Example 182 | 5.5 | 140 | 1.27 | ≧30 | A |
| Example 183 | 6.1 | 138 | 1.26 | ≧30 | A |
| Comparative Example 77 | 19.8 | 118 | 1.01 | 11.6 | D |
| Comparative Example 78 | 14.6 | 116 | 1.03 | 12.6 | D |
| Comparative Example 79 | 13.2 | 115 | 1.09 | 14.5 | D |
| Comparative Example 80 | 15.1 | 116 | 1.11 | 11.6 | D |
| Comparative Example 81 | 18.6 | 118 | 1.12 | 9.6 | D |
| Reference Example 54 | 7.4 | 129 | 1.18 | 18.6 | C |
| Reference Example 55 | 7.8 | 129 | 1.16 | 19.3 | C |

| Examples, Comparative Examples and Reference Examples | Properties of magnetic recording medium Corrosion resistance | |
|---|---|---|
| | Percentage of change in coercive force (%) | Percentage of change in $B_m$ (%) |
| Example 172 | 4.5 | 4.3 |
| Example 173 | 3.8 | 3.6 |
| Example 174 | 4.0 | 2.8 |
| Example 175 | 4.2 | 3.8 |
| Example 176 | 4.1 | 1.6 |
| Example 177 | 3.6 | 0.8 |
| Example 178 | 2.1 | 0.6 |
| Example 179 | 1.8 | 0.9 |
| Example 180 | 2.6 | 2.1 |
| Example 181 | 4.6 | 1.8 |
| Example 182 | 1.6 | 2.1 |
| Example 183 | 3.1 | 4.2 |
| Comparative Example 77 | 38.6 | 26.8 |
| Comparative Example 78 | 43.0 | 26.5 |
| Comparative Example 79 | 28.3 | 32.5 |
| Comparative Example 80 | 31.6 | 28.2 |
| Comparative Example 81 | 21.3 | 19.6 |
| Reference Example 54 | 17.8 | 18.2 |
| Reference Example 55 | 16.5 | 16.8 |

TABLE 48

| | Properties of acicular goethite particles | | |
|---|---|---|---|
| Kind of Precursor | Shape | Average major axial diameter ($\mu m$) | Geometrical standard deviation of major axial diameter (−) |
| Goethite particles 10 | Spindle-shaped | 0.0586 | 1.53 |
| Goethite particles 11 | Acicular | 0.0893 | 1.52 |

| | Properties of acicular goethite particles | | |
|---|---|---|---|
| Kind of Precursor | Average minor axial diameter ($\mu m$) | Geometrical standard deviation of minor axial diameter (−) | Aspect ratio (−) |
| Goethite particles 10 | 0.0084 | 1.41 | 7.0:1 |
| Goethite particles 11 | 0.0118 | 1.42 | 7.6:1 |

| | Properties of acicular goethite particles | | | | |
|---|---|---|---|---|---|
| Kind of Precursor | BET specific surface area ($m^2/g$) | Content of Al (wt %) | Soluble sodium salt (calcu- lated as Na) (ppm) | Soluble sulfate (calcu- lated as $SO_4$) (ppm) | pH value (−) |
| Goethite particles 10 | 242.6 | 2.86 | 412 | 381 | 5.9 |
| Goethite particles 11 | 190.6 | 1.32 | 832 | 265 | 7.6 |

TABLE 49

| | | Properties of acicular goethite particles subjected to anti-sintering treatment | |
|---|---|---|---|
| Kind of Precursor | Kind of Precursor | Average major axial diameter ($\mu m$) | Geometrical standard deviation of major axial diameter (−) |
| Goethite particles 12 | Goethite particles used in Example 12 | 0.0808 | 1.52 |
| Goethite | Goethite | 0.0586 | 1.53 |

TABLE 49-continued

| | particles 10 | | |
|---|---|---|---|
| particles 13 Goethite particles 14 | Goethite particles 11 | 0.0893 | 1.52 |

Properties of acicular goethite particles subjected to anti-sintering treatment

| Kind of Precursor | Average minor axial diameter (μm) | Geometrical standard deviation of minor axial diameter (-) | Aspect ratio (-) |
|---|---|---|---|
| Goethite particles 12 | 0.0113 | 1.41 | 7.2:1 |
| Goethite particles 13 | 0.0084 | 1.41 | 7.0:1 |
| Goethite particles 14 | 0.0118 | 1.42 | 7.6:1 |

Properties of acicular goethite particles subjected to anti-sintering treatment

| Kind of Precursor | BET specific surface area (m²/g) | Sintering preventive Calculated as | Amount (wt %) |
|---|---|---|---|
| Goethite particles 12 | 200.6 | P | 1.16 |
| Goethite particles 13 | 240.6 | P | 1.59 |
| Goethite particles 14 | 189.8 | SiO₂ | 1.11 |

Properties of acicular goethite particles subjected to anti-sintering treatment

| Starting particles | Content of Al (wt %) | Soluble sodium salt (calculated as Na) (ppm) | Soluble sulfate (calculated as SO₄) (ppm) | pH value (-) |
|---|---|---|---|---|
| Goethite particles 12 | 3.36 | 765 | 362 | 7.6 |
| Goethite particles 13 | 2.85 | 532 | 412 | 5.8 |
| Goethite particles 14 | 1.31 | 963 | 282 | 7.6 |

TABLE 50

| Kind of goethite particles | Kind of precursor | Conditions of heat treatment | | |
|---|---|---|---|---|
| | | Atmosphere | Temperature (°C.) | Time (min) |
| Goethite particles 15 | Goethite particles 12 | Air | 130 | 40 |
| Goethite particles 16 | Goethite particles 13 | Air | 150 | 30 |
| Goethite particles 17 | Goethite particles 14 | Air | 180 | 20 |
| Goethite particles 18 | Goethite particles 13 | Air | 80 | 30 |

TABLE 51

Properties of acicular goethite particles heat-treated

| Kind of goethite particles | Average major axial diameter (μm) | Geometrical standard deviation of major axial diameter (-) | Average minor axial diameter (μm) | Geometrical standard deviation of minor axial diameter (-) |
|---|---|---|---|---|
| Goethite particles 15 | 0.0808 | 0.37 | 0.0112 | 1.26 |
| Goethite particles 16 | 0.0586 | 1.38 | 0.0084 | 1.27 |
| Goethite particles 17 | 0.0893 | 1.36 | 0.0117 | 1.29 |
| Goethite particles 18 | 0.0586 | 1.52 | 0.0084 | 1.41 |

Properties of acicular goethite particles heat-treated

| Kind of goethite particles | Aspect ratio (-) | BET specific surface area (m²/g) | Sintering preventive Calculated as | Content (wt %) |
|---|---|---|---|---|
| Goethite particles 15 | 7.2:1 | 201.8 | P | 1.17 |
| Goethite particles 16 | 7.0:1 | 239.4 | P | 1.59 |
| Goethite particles 17 | 7.6:1 | 190.1 | SiO₂ | 1.12 |
| Goethite particles 18 | 7.0:1 | 239.8 | P | 1.59 |

Properties of acicular goethite particles heat-treated

| Kind of goethite particles | Content of Al (wt %) | Soluble sodium salt (calculated as Na) (ppm) | Soluble sulfate (calculated as SO₄) (ppm) | pH value (-) |
|---|---|---|---|---|
| Goethite particles 15 | 3.36 | 681 | 293 | 7.1 |
| Goethite particles 16 | 2.86 | 543 | 421 | 5.9 |
| Goethite particles 17 | 1.31 | 1,128 | 462 | 7.6 |
| Goethite particles 18 | 2.85 | 652 | 413 | 5.9 |

TABLE 52

| Kind of particles to be treated | Kind of goethite particles | Conditions of heat-dehydration treatment | | |
|---|---|---|---|---|
| | | Atmosphere | Temperature (°C.) | Time (min) |
| Hematite particles 14 | Goethite particles 15 | Air | 330 | 30 |
| Hematite particles 15 | Goethite particles 16 | Air | 350 | 30 |
| Hematite particles 16 | Goethite particles 17 | Air | 370 | 25 |
| Hematite particles 17 | Goethite particles 18 | Air | 340 | 30 |

TABLE 53

Properties of low-density acicular hematite particles

| Kind of particles to be treated | Average major axial diameter ($\mu$m) | Geometrical standard deviation of major axial diameter (–) | Average minor axial diameter ($\mu$m) | Geometrical standard deviation of minor axial diameter (–) |
|---|---|---|---|---|
| Hematite particles 14 | 0.0727 | 1.37 | 0.0110 | 1.27 |
| Hematite particles 15 | 0.0533 | 1.38 | 0.0085 | 1.27 |
| Hematite particles 16 | 0.0822 | 1.36 | 0.0116 | 1.29 |
| Hematite particles 17 | 0.0539 | 1.52 | 0.0086 | 1.42 |

Properties of low-density acicular hematite particles

| Kind of particles to be treated | Aspect ratio (–) | $S_{BET}$ (m$^2$/g) | $S_{TEM}$ (m$^2$/g) | $S_{BET}/S_{TEM}$ value (–) |
|---|---|---|---|---|
| Hematite particles 14 | 6.6:1 | 218.6 | 75.2 | 2.91 |
| Hematite particles 15 | 6.3:1 | 251.2 | 97.7 | 2.57 |
| Hematite particles 16 | 7.1:1 | 209.6 | 71.0 | 2.95 |
| Hematite particles 17 | 6.3:1 | 246.8 | 96.6 | 2.56 |

Properties of low-density acicular hematite particles

| Kind of particles to be treated | Sintering preventive Calculated as | Amount (wt %) | Content of Al (wt %) |
|---|---|---|---|
| Hematite particles 14 | P | 1.30 | 3.73 |
| Hematite particles 15 | P | 1.74 | 3.18 |
| Hematite particles 16 | SiO$_2$ | 1.24 | 1.45 |
| Hematite particles 17 | P | 1.75 | 3.17 |

Properties of low-density acicular hematite particles

| Kind of particles to be treated | Soluble sodium salt (calculated as Na) (ppm) | Soluble sulfate (calculated as SO$_4$) (ppm) | pH value (–) |
|---|---|---|---|
| Hematite particles 14 | 1,321 | 721 | 7.2 |
| Hematite particles 15 | 1,165 | 583 | 5.5 |
| Hematite particles 16 | 1,811 | 412 | 7.8 |
| Hematite particles 17 | 1,011 | 562 | 6.1 |

TABLE 54

| Kind of hematite particles | Kind of particles to be treated | Conditions of heat-treatment Atmosphere | Temperature (°C.) | Time (min) |
|---|---|---|---|---|
| Hematite particles 18 | Hematite particles 14 | Air | 670 | 20 |
| Hematite particles 19 | Hematite particles 15 | Air | 630 | 30 |
| Hematite particles 20 | Hematite particles 16 | Air | 610 | 40 |
| Hematite particles 21 | Goethite particles 16 | Air | 640 | 30 |
| Hematite particles 22 | Goethite particles 17 | Air | 650 | 30 |
| Hematite particles 23 | Goethite particles 18 | Air | 650 | 30 |
| Hematite particles 24 | Hematite particles 17 | Air | 650 | 30 |
| Hematite particles 25 | Hematite particles 16 | Air | 440 | 30 |
| Hematite particles 26 | Hematite particles 16 | Air | 910 | 30 |

TABLE 55

Properties of high-density acicular hematite particles

| Kind of hematite particles | Average major axial diameter ($\mu$m) | Geometrical standard deviation of major axial diameter (–) | Average minor axial diameter ($\mu$m) | Geometrical standard deviation of minor axial diameter (–) |
|---|---|---|---|---|
| Hematite particles 18 | 0.0726 | 1.37 | 0.0111 | 1.28 |
| Hematite particles 19 | 0.0532 | 1.39 | 0.0086 | 1.27 |
| Hematite particles 20 | 0.0821 | 1.36 | 0.0117 | 1.29 |
| Hematite particles 21 | 0.0521 | 1.38 | 0.0087 | 1.29 |
| Hematite particles 22 | 0.0412 | 1.63 | 0.0150 | 1.44 |
| Hematite particles 23 | 0.0521 | 1.61 | 0.0091 | 1.41 |
| Hematite particles 24 | 0.0538 | 1.53 | 0.0087 | 1.42 |
| Hematite particles 25 | 0.0822 | 1.36 | 0.0116 | 1.29 |
| Hematite particles 26 | 0.0642 | 1.58 | 0.0213 | 1.43 |

Properties of high-density acicular hematite particles

| Kind of hematite particles | Aspect ratio (–) | $S_{BET}$ (m$^2$/g) | $S_{TEM}$ (m$^2$/g) | $S_{BET}/S_{TEM}$ value (–) |
|---|---|---|---|---|
| Hematite particles 18 | 6.5:1 | 84.6 | 74.6 | 1.13 |
| Hematite particles 19 | 6.2:1 | 95.6 | 96.7 | 0.99 |
| Hematite particles 20 | 7.0:1 | 73.2 | 70.4 | 1.04 |
| Hematite | 6.0:1 | 91.8 | 95.8 | 0.96 |

TABLE 55-continued

| Kind of hematite particles | | | | |
|---|---|---|---|---|
| Hematite particles 21 | | | | |
| Hematite particles 22 | 2.7:1 | 38.3 | 60.6 | 0.63 |
| Hematite particles 23 | 5.7:1 | 63.6 | 91.9 | 0.69 |
| Hematite particles 24 | 6.2:1 | 73.8 | 95.6 | 0.77 |
| Hematite particles 25 | 7.1:1 | 189.9 | 71.0 | 2.67 |
| Hematite particles 26 | 3.0:1 | 39.6 | 42.1 | 0.94 |

| | Properties of high-density acicular hematite particles | | |
|---|---|---|---|
| Kind of hematite particles | Sintering preventive | | Content of Al (wt %) |
| | Calculated as | Amount (wt %) | |
| Hematite particles 18 | P | 1.30 | 3.73 |
| Hematite particles 19 | P | 1.75 | 3.18 |
| Hematite particles 20 | SiO$_2$ | 1.24 | 1.45 |
| Hematite particles 21 | P | 1.76 | 3.18 |
| Hematite particles 22 | — | — | 3.19 |
| Hematite particles 23 | P | 1.76 | 3.18 |
| Hematite particles 24 | P | 1.75 | 3.17 |
| Hematite particles 25 | SiO$_2$ | 1.24 | 1.45 |
| Hematite particles 26 | SiO$_2$ | 1.24 | 1.46 |

| | Properties of high-density acicular hematite particles | | | |
|---|---|---|---|---|
| Kind of hematite particles | Resin adsorption (%) | Soluble sodium salt (calculated as Na) (ppm) | Soluble sulfate (calculated as SO$_4$) (ppm) | pH value (–) |
| Hematite particles 18 | 74.6 | 2,221 | 1,652 | 6.9 |
| Hematite particles 19 | 73.2 | 2,102 | 1,632 | 6.3 |
| Hematite particles 20 | 71.3 | 1,821 | 2,236 | 5.6 |
| Hematite particles 21 | 72.6 | 1,321 | 1,821 | 5.3 |
| Hematite particles 22 | 61.6 | 2,016 | 1,621 | 6.3 |
| Hematite particles 23 | 67.1 | 1,211 | 821 | 5.9 |
| Hematite particles 24 | 68.3 | 2,182 | 2,265 | 5.5 |
| Hematite particles 25 | 67.2 | 1,683 | 1,821 | 5.3 |
| Hematite particles 26 | 62.1 | 1,321 | 1,865 | 5.7 |

TABLE 56

| Examples and Reference Examples | Kind of particles to be treated | Heat treatment in aqueous alkali solution | | |
|---|---|---|---|---|
| | | pH value (–) | Temperature (° C.) | Time (min) |
| Example 184 | Hematite particles 18 | 13.1 | 90 | 180 |
| Example 185 | Hematite particles 19 | 13.5 | 95 | 120 |
| Example 186 | Hematite particles 20 | 13.6 | 98 | 150 |
| Example 187 | Hematite particles 21 | 13.8 | 85 | 240 |
| Reference Example 56 | Hematite particles 18 | 8.2 | 85 | 180 |
| Reference Example 57 | Hematite particles 18 | 13.4 | 40 | 180 |

TABLE 57

| Examples and Reference Examples | Properties of high-density acicular hematite particles heat-treated in aqueous alkali solution | | | |
|---|---|---|---|---|
| | Average major axial diameter (μm) | Geometrical standard deviation of major axial diameter (–) | Average minor axial diameter (μm) | Geometrical standard deviation of minor axial diameter (–) |
| Example 184 | 0.0725 | 1.36 | 0.0110 | 1.28 |
| Example 185 | 0.0531 | 1.38 | 0.0086 | 1.27 |
| Example 186 | 0.0821 | 1.35 | 0.0117 | 1.29 |
| Example 187 | 0.0520 | 1.37 | 0.0088 | 1.29 |
| Reference Example 56 | 0.0726 | 1.37 | 0.0111 | 1.28 |
| Reference Example 57 | 0.0726 | 1.37 | 0.0111 | 1.28 |

| Examples and Reference Examples | Properties of high-density acicular hematite particles heat-treated in aqueous alkali solution | | | |
|---|---|---|---|---|
| | Aspect ratio (–) | S$_{BET}$ (m$^2$/g) | S$_{TEM}$ (m$^2$/g) | S$_{BET}$/S$_{TEM}$ value (–) |
| Example 184 | 6.6:1 | 85.1 | 75.2 | 1.13 |
| Example 185 | 6.2:1 | 96.1 | 96.7 | 0.99 |
| Example 186 | 7.0:1 | 74.1 | 70.4 | 1.05 |
| Example 187 | 5.9:1 | 90.6 | 94.8 | 0.96 |
| Reference Example 56 | 6.5:1 | 83.2 | 74.6 | 1.12 |
| Reference Example 57 | 6.5:1 | 84.6 | 74.6 | 1.13 |

| Examples and Reference Examples | Properties of high-density acicular hematite particles heat-treated in aqueous alkali solution | | |
|---|---|---|---|
| | Sintering preventive | | Content of Al (wt %) |
| | Calculated as | Amount (wt %) | |
| Example 184 | P | 0.64 | 3.72 |
| Example 185 | P | 0.83 | 3.16 |
| Example 186 | SiO$_2$ | 1.01 | 1.44 |
| Example 187 | P | 0.80 | 3.16 |
| Reference Example 56 | P | 1.30 | 3.73 |
| Reference Example 57 | P | 1.31 | 3.76 |

TABLE 57-continued

Properties of high-density acicular hematite particles heat-treated in aqueous alkali solution

| Examples and Reference Examples | Resin adsorption (%) | Soluble sodium salt (calculated as Na) (ppm) | Soluble sulfate (calculated as $SO_4$) (ppm) | pH value (–) |
|---|---|---|---|---|
| Example 184 | 75.3 | 72 | 18 | 9.3 |
| Example 185 | 76.8 | 112 | 10 | 9.1 |
| Example 186 | 78.2 | 56 | 23 | 9.2 |
| Example 187 | 77.8 | 81 | 29 | 8.9 |
| Reference Example 56 | 61.8 | 396 | 192 | 7.3 |
| Reference Example 57 | 64.1 | 410 | 190 | 7.4 |

TABLE 58

| Examples | Kind of particles to be treated | Concentration of water suspension (g/liter) |
|---|---|---|
| Example 188 | Example 184 | 45 |
| Example 189 | Example 185 | 45 |
| Example 190 | Example 186 | 45 |
| Example 191 | Example 187 | 45 |

Coating treatment with aluminum compound or silicon compound

| Examples | pH value before addition (–) | Kind of additives | Aluminum compound or silicon compound — Amount added (calculated as Al or $SiO_2$) (wt %) | Final pH value (–) |
|---|---|---|---|---|
| Example 188 | 4.0 | Aluminum acetate | 3.0 | 7.0 |
| Example 189 | 10.0 | Water glass #3 | 1.0 | 6.9 |
| Example 190 | 10.3 | Sodium aluminate | 5.0 | 7.2 |
| Example 191 | 10.1 | Sodium aluminate Water glass #3 | 2.0 0.5 | 7.0 |

TABLE 59

Properties of acicular hematite particles after surface-coating treatment

| Examples | Average major axial diameter (μm) | Geometrical standard deviation of major axial diameter (–) | Average minor axial diameter (μm) | Geometrical standard deviation of minor axial diameter (–) |
|---|---|---|---|---|
| Example 188 | 0.0725 | 1.36 | 0.0111 | 1.28 |
| Example 189 | 0.0531 | 1.38 | 0.0086 | 1.26 |
| Example 190 | 0.0820 | 1.36 | 0.0117 | 1.28 |
| Example 191 | 0.0523 | 1.38 | 0.0087 | 1.29 |

Properties of acicular hematite particles after surface-coating treatment

| Examples | Aspect ratio (–) | $S_{BET}$ ($m^2/g$) | $S_{TEM}$ ($m^2/g$) | $S_{BET}/S_{TEM}$ value (–) |
|---|---|---|---|---|
| Example 188 | 6.5:1 | 85.6 | 74.6 | 1.15 |
| Example 189 | 6.2:1 | 97.1 | 96.7 | 1.00 |
| Example 190 | 7.0:1 | 75.1 | 70.4 | 1.07 |
| Example 191 | 6.0:1 | 92.9 | 95.8 | 0.97 |

Properties of acicular hematite particles after surface-coating treatment

| Examples | Sintering preventive — Calculated as | Sintering preventive — Amount (wt %) | Content of Al (wt %) |
|---|---|---|---|
| Example 188 | P | 0.62 | 3.71 |
| Example 189 | P | 0.80 | 3.15 |
| Example 190 | $SiO_2$ | 1.00 | 1.41 |
| Example 191 | P | 0.78 | 3.14 |

Properties of acicular hematite particles after surface-coating treatment

| Examples | Surface-coating amount of hydroxide of aluminum (calculated as Al) (wt %) | Surface-coating amount of oxide of silicon (calculated as $SiO_2$) (wt %) | Resin adsorption (%) |
|---|---|---|---|
| Example 188 | 2.93 | — | 81.6 |
| Example 189 | — | 0.99 | 83.2 |
| Example 190 | 4.71 | — | 84.1 |
| Example 191 | 1.96 | 0.49 | 81.8 |

Properties of acicular hematite particles after surface-coating treatment

| Examples | Soluble sodium salt (calculated as Na) (ppm) | Soluble sulfate (calculated as $SO_4$) (ppm) | pH value (–) |
|---|---|---|---|
| Example 188 | 78 | 13 | 9.1 |
| Example 189 | 56 | 8 | 9.0 |
| Example 190 | 82 | 12 | 9.0 |
| Example 191 | 52 | 26 | 9.2 |

TABLE 60

| Examples, Comparative Examples and Reference Examples | Production of non-magnetic coating composition | | Non-magnetic coating composition Viscosity (cP) |
|---|---|---|---|
| | Kind of acicular hematite particles | Weight ratio of particles to resin (−) | |
| Example 192 | Example 184 | 5.0 | 384 |
| Example 193 | Example 185 | 5.0 | 358 |
| Example 194 | Example 186 | 5.0 | 364 |
| Example 195 | Example 187 | 5.0 | 435 |
| Example 196 | Example 188 | 5.0 | 512 |
| Example 197 | Example 189 | 5.0 | 461 |
| Example 198 | Example 190 | 5.0 | 307 |
| Example 199 | Example 191 | 5.0 | 410 |
| Comparative Example 82 | Hematite particles 22 | 5.0 | 870 |
| Comparative Example 83 | Hematite particles 23 | 5.0 | 794 |
| Comparative Example 84 | Hematite particles 24 | 5.0 | 717 |
| Comparative Example 85 | Hematite particles 25 | 5.0 | 11,240 |
| Comparative Example 86 | Hematite particles 26 | 5.0 | 307 |
| Reference Example 58 | Reference Example 56 | 5.0 | 461 |
| Reference Example 59 | Reference Example 57 | 5.0 | 502 |

| Examples, Comparative Examples and Reference Examples | Properties of non-magnetic undercoat layer | | | |
|---|---|---|---|---|
| | Thickness (μm) | Gloss (%) | Surface roughness Ra (nm) | Young's modulus (relative value) |
| Example 192 | 0.35 | 218 | 6.1 | 136 |
| Example 193 | 0.35 | 225 | 5.7 | 133 |
| Example 194 | 0.35 | 218 | 6.0 | 138 |
| Example 195 | 0.35 | 211 | 6.4 | 134 |
| Example 196 | 0.35 | 218 | 6.0 | 137 |
| Example 197 | 0.35 | 225 | 5.6 | 136 |
| Example 198 | 0.35 | 216 | 6.1 | 137 |
| Example 199 | 0.35 | 214 | 6.3 | 135 |
| Comparative Example 82 | 0.35 | 154 | 20.1 | 110 |
| Comparative Example 83 | 0.35 | 161 | 17.8 | 111 |
| Comparative Example 84 | 0.35 | 164 | 17.2 | 116 |
| Comparative Example 85 | 0.37 | 113 | 28.3 | 98 |
| Comparative Example 86 | 0.35 | 176 | 15.4 | 79 |
| Reference Example 58 | 0.35 | 198 | 8.2 | 128 |
| Reference Example 59 | 0.36 | 196 | 8.5 | 128 |

TABLE 61

| Examples, Comparative Examples and Reference Examples | Production of magnetic recording medium | | |
|---|---|---|---|
| | Kind of non-magnetic substrate, | Kind of magnetic particles | Weight ratio of particles to resin (−) |
| Example 200 | Example 192 | Magnetic metal particles (d) | 5.0 |
| Example 201 | Example 195 | Magnetic metal particles (d) | 5.0 |
| Example 202 | Example 196 | Magnetic metal particles (d) | 5.0 |
| Example 203 | Example 191 | Magnetic metal particles (d) | 5.0 |
| Example 204 | Example 192 | Magnetic metal particles (a) | 5.0 |
| Example 205 | Example 193 | Magnetic metal particles (b) | 5.0 |
| Example 206 | Example 194 | Magnetic metal particles (c) | 5.0 |
| Example 207 | Example 195 | Magnetic metal particles (c) | 5.0 |
| Example 208 | Example 196 | Magnetic metal particles (a) | 5.0 |
| Example 209 | Example 197 | Magnetic metal particles (b) | 5.0 |
| Example 210 | Example 198 | Magnetic metal particles (c) | 5.0 |
| Example 211 | Example 199 | Magnetic metal particles (c) | 5.0 |
| Comparative Example 87 | Comparative Example 82 | Magnetic metal particles (d) | 5.0 |
| Comparative Example 88 | Comparative Example 83 | Magnetic metal particles (d) | 5.0 |
| Comparative Example 89 | Comparative Example 84 | Magnetic metal particles (d) | 5.0 |
| Comparative Example 90 | Comparative Example 85 | Magnetic metal particles (d) | 5.0 |
| Comparative Example 91 | Comparative Example 86 | Magnetic metal particles (d) | 5.0 |
| Reference Example 60 | Reference Example 58 | Magnetic metal particles (d) | 5.0 |
| Reference Example 61 | Reference Example 59 | Magnetic metal particles (d) | 5.0 |

| Examples, Comparative Examples and Reference Examples | Properties of magnetic recording medium | | | |
|---|---|---|---|---|
| | Thickness of magnetic layer (μm) | Coercive force (Hc) (Oe) | Br/Bm value (−) | Gloss (%) |
| Example 200 | 1.0 | 1,968 | 0.87 | 223 |
| Example 201 | 1.0 | 1,971 | 0.87 | 221 |
| Example 202 | 1.0 | 1,965 | 0.88 | 226 |
| Example 203 | 1.1 | 1,962 | 0.89 | 228 |
| Example 204 | 1.0 | 1,981 | 0.89 | 235 |
| Example 205 | 1.0 | 1,999 | 0.87 | 230 |
| Example 206 | 1.0 | 2,130 | 0.87 | 226 |
| Example 207 | 1.1 | 2,133 | 0.88 | 233 |
| Example 208 | 1.0 | 1,983 | 0.88 | 241 |
| Example 209 | 1.1 | 2,001 | 0.89 | 238 |
| Example 210 | 1.0 | 2,129 | 0.89 | 248 |
| Example 211 | 1.0 | 2,125 | 0.90 | 229 |
| Comparative Example 87 | 1.1 | 1,960 | 0.76 | 168 |
| Comparative Example 88 | 1.0 | 1,963 | 0.75 | 175 |
| Comparative Example 89 | 1.1 | 1,968 | 0.81 | 176 |
| Comparative Example 90 | 1.1 | 1,963 | 0.79 | 171 |
| Comparative Example 91 | 1.0 | 1,965 | 0.78 | 152 |
| Reference Example 60 | 1.1 | 1,978 | 0.86 | 214 |
| Reference Example 61 | 1.1 | 1,983 | 0.86 | 211 |

| Examples, Comparative Examples and Reference Examples | Properties of magnetic recording medium | | | | |
|---|---|---|---|---|---|
| | Surface roughness Ra (nm) | Young's modulus (relative value) | Linear absorption coefficient (μm$^{-1}$) | Durability | |
| | | | | Running time (min) | Scratch resistance |

TABLE 61-continued

| | | | | | |
|---|---|---|---|---|---|
| Example 200 | 6.4 | 137 | 1.26 | 27.1 | A |
| Example 201 | 6.3 | 136 | 1.27 | 27.3 | B |
| Example 202 | 6.0 | 138 | 1.28 | 28.1 | A |
| Example 203 | 5.8 | 137 | 1.28 | 28.5 | A |
| Example 204 | 6.0 | 137 | 1.29 | ≧30 | A |
| Example 205 | 6.2 | 135 | 1.29 | 29.6 | B |
| Example 206 | 6.3 | 138 | 1.31 | ≧30 | A |
| Example 207 | 6.0 | 135 | 1.28 | 28.6 | B |
| Example 208 | 5.8 | 139 | 1.27 | ≧30 | A |
| Example 209 | 5.6 | 136 | 1.31 | ≧30 | A |
| Example 210 | 5.2 | 141 | 1.27 | ≧30 | A |
| Example 211 | 5.9 | 136 | 1.28 | ≧30 | A |
| Comparative Example 87 | 18.4 | 110 | 1.03 | 12.6 | D |
| Comparative Example 88 | 13.6 | 115 | 1.05 | 13.1 | D |
| Comparative Example 89 | 12.9 | 119 | 1.10 | 13.6 | D |
| Comparative Example 90 | 15.0 | 93 | 1.10 | 12.3 | D |
| Comparative Example 91 | 18.4 | 83 | 1.03 | 10.6 | D |
| Reference Example 60 | 7.8 | 129 | 1.17 | 19.2 | C |
| Reference Example 61 | 7.6 | 129 | 1.17 | 18.6 | C |

| Examples, Comparative Examples and Reference Examples | Properties of magnetic recording medium Corrosion resistance | |
|---|---|---|
| | Percentage of change in coercive force (%) | Percentage of change in $B_m$ (%) |
| Example 200 | 4.1 | 3.9 |
| Example 201 | 3.8 | 4.4 |
| Example 202 | 4.0 | 2.6 |
| Example 203 | 3.6 | 3.1 |
| Example 204 | 3.1 | 2.1 |
| Example 205 | 2.6 | 1.6 |
| Example 206 | 1.6 | 1.8 |
| Example 207 | 2.1 | 1.8 |
| Example 208 | 2.6 | 2.3 |
| Example 209 | 1.8 | 3.6 |
| Example 210 | 0.6 | 0.4 |
| Example 211 | 3.2 | 0.9 |
| Comparative Example 87 | 31.2 | 28.1 |
| Comparative Example 88 | 26.5 | 26.5 |
| Comparative Example 89 | 31.2 | 23.1 |
| Comparative Example 90 | 41.3 | 32.6 |
| Comparative Example 91 | 26.5 | 31.2 |
| Reference Example 60 | 16.1 | 17.0 |
| Reference Example 61 | 15.6 | 16.0 |

What is claimed is:

1. Acicular hematite particles comprising an average major axis diameter of 0.004 to 0.295 μm, a geometrical standard deviation of minor axis diameter of not more than 1.35 and a pH value of not less than 8, and containing not more than 300 ppm of soluble sodium salt, calculated as Na and not more than 150 ppm of soluble sulfate, calculated as $SO_4$.

2. Acicular hematite particles according to claim 1, which further comprise a coat formed on at least a part of the surface of said acicular hematite particle, comprising at least one compound selected from the group consisting of hydroxides of aluminum, oxides of aluminum, hydroxides of silicon and oxides of silicon in amount of 0.05 to 50% by weight, calculated as Al or $SiO_2$, based on the weight of said acicular hematite particles.

3. Acicular hematite particles according to claim 1, which further comprise aluminum existing in the particle in an amount of 0.05 to 50% by weight, calculated as Al, based on the weight of said acicular hematite particles.

4. Acicular hematite particles according to claim 3, which further comprise a resin adsorptivity of not less than 65%.

5. Acicular hematite particles according to claim 3, which further comprise a coat formed on at least a part of the surface of said acicular hematite particle, comprising at least one compound selected from the group consisting of hydroxides of aluminum, oxides of aluminum, hydroxides of silicon and oxides of silicon in amount of 0.05 to 50% by weight, calculated as Al or $SiO_2$, based on the weight of said acicular hematite particles.

6. Acicular hematite particles according to claim 1, which further comprise a geometrical standard deviation of major axis diameter of not more than 1.50 and a BET specific surface area of 35.9 to 180 $m^2/g$.

7. Acicular hematite particles according to claim 1, which further comprise an aspect ratio (average major axis diameter/average minor axis diameter) of 2:1 to 20:1, and a ratio value of a BET specific surface area $S_{BET}$ to a specific surface area $S_{TEM}$ of 0.5 to 2.5 (the specific surface area $S_{TEM}$ being calculated from the major axis diameter and the minor axis diameter which were measured from the particles in an electron micrograph of the acicular hematite particles).

8. Acicular hematite particles according to claim 1, which further comprise a geometrical standard deviation of major axis diameter of not more than 1.50, a geometrical standard deviation of minor axis diameter of not more than 1.30, a BET specific surface area of 40 to 150 $m^2/g$ and an average major axis diameter of 0.01 to 0.2 μm.

9. A magnetic recording medium comprising:
a non-magnetic base film;
a non-magnetic undercoat layer formed on said non-magnetic base film, comprising a binder resin and acicular hematite particles having an average major axis diameter of 0.004 to 0.295 μm, a geometrical standard deviation of minor axis diameter of not more than 1.35 and a pH value of not less than 8, and containing not more than 300 ppm of soluble sodium salt, calculated as Na and not more than 150 ppm of soluble sulfate, calculated as $SO_4$; and
a magnetic coating film comprising a binder resin and magnetic acicular metal particles containing iron as a main component.

10. A magnetic recording medium according to claim 9, wherein said acicular hematite particles have a coat formed on at least a part of the surface of said acicular hematite particle and comprising at least one compound selected from the group consisting of hydroxides of aluminum, oxides of aluminum, hydroxides of silicon and oxides of silicon in an amount of 5 to 50% by weight based on the total weight of the acicular hematite particles.

11. A magnetic recording medium according to claim 9, wherein said acicular hematite particles contain aluminum existing in the particle in an amount of 0.05 to 50% by weight, calculated as Al, based on the weight of said acicular hematite particles.

12. Magnetic recording medium according to claim 11, wherein said acicular hematite particles have a resin adsorptivity of not less than 65%.

13. A magnetic recording medium according to claim 11, wherein said acicular hematite particles have a coat formed on at least a part of the surface of said acicular hematite particle and comprising at least one compound selected from the group consisting of hydroxides of aluminum, oxides of aluminum, hydroxides of silicon and oxides of silicon in an amount of 5 to 50% by weight based on the total weight of the acicular hematite particles.

14. A magnetic recording medium according to claim 11, which further comprises a gloss of coating film of 194 to 300%, a surface roughness Ra of coating film of not more than 9.6 nm, a linear absorption of coating film of 1.10 to 2.00 $\mu m^{-1}$, and a running durability of not less than 22 minutes.

15. A magnetic recording medium according to claim 9, wherein said acicular hematite particles have a geometrical standard deviation of major axis diameter of not more than 1.50 and a BET specific surface area of 35.9 to 180 $m^2/g$.

16. A magnetic recording medium according to claim 9, wherein said acicular hematite particles have a geometrical standard deviation of major axis diameter of not more than 1.50, a geometrical standard deviation of minor axis diameter of not more than 1.30, a BET specific surface area of 40 to 150 $m^2/g$ and an average major axis diameter of 0.01 to 0.2 $\mu m$.

17. A magnetic recording medium according to claim 16, which further comprises a gloss of coating film of 196 to 300%, a surface roughness Ra of coating film of not more than 9.4 nm, and a linear absorption of coating film of 1.10 to 2.00 $\mu m^{-1}$.

18. A magnetic recording medium according to claim 9, wherein said magnetic acicular metal particles containing iron as a main component contain aluminum in an amount of 0.05 to 10% by weight, calculated as Al, based on the weight of said magnetic acicular metal particles containing iron as a main component.

19. A magnetic recording medium according to claim 18, which further comprises a gloss of coating film of 194 to 300%, a surface roughness Ra of coating film of not more than 9.6 nm, a linear absorption of coating film of 1.10 to 2.00 $\mu m^{-1}$, and a running durability of not less than 24 minutes.

20. A magnetic recording medium according to claim 9, which further comprises a gloss of coating film of 192 to 300%, a surface roughness Ra of coating film of not more than 9.8 nm, and a linear absorption of coating film of 1.10 to 2.00 $\mu m^{-1}$.

21. A magnetic recording medium according to claim 9, which further comprises the change in the coercive force of not more than 10.0% and the change in the saturation magnetic flux density of not more than 10.0%.

22. A non-magnetic substrate comprising:

a non-magnetic base film; and a non-magnetic undercoat layer formed on said non-magnetic base film, comprising a binder resin and acicular hematite particles having an average major axis diameter of 0.004 to 0.295 $\mu m$, a geometrical standard deviation of minor axis diameter of not more than 1.35 and a pH value of not less than 8, and containing not more than 300 ppm of soluble sodium salt, calculated as Na and not more than 150 ppm of soluble sulfate, calculated as $SO_4$.

23. A non-magnetic substrate according to claim 22, wherein said acicular hematite particles have a coat formed on at least a part of the surface of said acicular hematite particle and comprising at least one compound selected from the group consisting of hydroxides of aluminum, oxides of aluminum, hydroxides of silicon and oxides of silicon in an amount of 5 to 50% by weight based on the total weight of the acicular hematite particles.

24. A non-magnetic substrate according to claim 22, wherein said acicular hematite particles contain aluminum existing within the particle in an amount of 0.05 to 50% by weight, calculated as Al, based on the weight of said acicular hematite particles.

25. A non-magnetic substrate according to claim 24, wherein said acicular hematite particles have a coat formed on at least a part of the surface of said acicular hematite particle and comprising at least one compound selected from the group consisting of hydroxides of aluminum, oxides of aluminum, hydroxides of silicon and oxides of silicon in an amount of 5 to 50% by weight based on the total weight of the acicular hematite particles.

26. A non-magnetic substrate according to claim 24, which further comprises a gloss of coating film of 191 to 300% and a surface roughness Ra of coating film of 0.5 to 9.3 nm.

27. A non-magnetic substrate according to claim 22, wherein said acicular hematite particles further have a geometrical standard deviation of major axis diameter of not more than 1.50 and a BET specific surface area of 35.9 to 180 $m^2/g$.

28. A non-magnetic substrate according to claim 22, wherein said acicular hematite particles have a geometrical standard deviation of major axis diameter of not more than 1.50, a geometrical standard deviation of minor axis diameter of not more than 1.30, a BET specific surface area of 40 to 150 $m^2/g$ and an average major axis diameter of 0.01 to 0.2 $\mu m$.

29. A non-magnetic substrate according to claim 28, which further comprises a gloss of coating film of 193 to 300% and a surface roughness Ra of coating film of 0.5 to 9.0 nm.

30. A non-magnetic substrate according to claim 22, which further comprises a gloss of coating film of 189 to 300% and a surface roughness Ra of coating film of 0.5 to 9.6 nm.

* * * * *